(12) United States Patent
Padovani et al.

(10) Patent No.: US 9,292,790 B2
(45) Date of Patent: Mar. 22, 2016

(54) PIECEWISE LINEAR NEURON MODELING

(71) Applicant: QUALCOMM Incorporated, San Diego, CA (US)

(72) Inventors: Roberto Padovani, San Diego, CA (US); Young Cheul Yoon, San Diego, CA (US); Naga Bhushan, San Diego, CA (US)

(73) Assignee: QUALCOM INCORPORATED, San Diego, CA (US)

( * ) Notice: Subject to any disclaimer, the term of this patent is extended or adjusted under 35 U.S.C. 154(b) by 168 days.

(21) Appl. No.: 14/070,652

(22) Filed: Nov. 4, 2013

(65) Prior Publication Data

US 2014/0143190 A1    May 22, 2014

Related U.S. Application Data

(60) Provisional application No. 61/728,360, filed on Nov. 20, 2012, provisional application No. 61/734,716, filed on Dec. 7, 2012, provisional application No. 61/740,633, filed on Dec. 21, 2012, provisional application No. 61/756,889, filed on Jan. 25, 2013.

(51) Int. Cl.
*G06F 15/18* (2006.01)
*G06E 1/00* (2006.01)
*G06E 3/00* (2006.01)
*G06G 7/00* (2006.01)
(Continued)

(52) U.S. Cl.
CPC . *G06N 3/08* (2013.01); *G06N 3/049* (2013.01)

(58) Field of Classification Search
None
See application file for complete search history.

(56) References Cited

U.S. PATENT DOCUMENTS

| 5,140,670 A | 8/1992 | Chua et al. |
| 5,682,465 A | 10/1997 | Kil et al. |

(Continued)

FOREIGN PATENT DOCUMENTS

| CN | 101546389 A | 9/2009 |
| CN | 101782743 A | 7/2010 |

(Continued)

OTHER PUBLICATIONS

Improved Feed-Forward Command Governor strategies for discrete-time time-invariant linear systems Casavola, A.; Garone, E.; Tedesco, F. Decision and Control and European Control Conference (CDC-ECC), 2011 50th IEEE Conference on Year: 2011 pp. 495-500, DOI: 10.1109/CDC.2011.6160846 IEEE Conference Publications.*

(Continued)

*Primary Examiner* — Michael B Holmes
(74) *Attorney, Agent, or Firm* — Patterson & Sheridan, L.L.P.

(57) ABSTRACT

Methods and apparatus for piecewise linear neuron modeling and implementing artificial neurons in an artificial nervous system based on linearized neuron models. One example method for operating an artificial neuron generally includes determining that a first state of the artificial neuron is within a first region; determining a second state of the artificial neuron based at least in part on a first set of linear equations, wherein the first set of linear equations is based at least in part on a first set of parameters corresponding to the first region; determining that the second state of the artificial neuron is within a second region; and determining a third state of the artificial neuron based at least in part on a second set of linear equations, wherein the second set of linear equations is based at least in part on a second set of parameters corresponding to the second region.

64 Claims, 25 Drawing Sheets

(51) Int. Cl.
G06N 3/02 (2006.01)
G06N 3/08 (2006.01)
G06N 3/04 (2006.01)

(56) References Cited

U.S. PATENT DOCUMENTS

| | | | |
|---|---|---|---|
| 5,796,925 | A | 8/1998 | Deville |
| 6,823,322 | B2 | 11/2004 | Olszewski |
| 7,047,225 | B2 | 5/2006 | Poon |
| 2014/0143190 | A1* | 5/2014 | Padovani ............... G06N 3/049 706/15 |
| 2014/0143191 | A1* | 5/2014 | Padovani ............... G06N 3/049 706/15 |
| 2014/0143194 | A1* | 5/2014 | Yoon ...................... G06N 3/049 706/25 |

FOREIGN PATENT DOCUMENTS

| | | |
|---|---|---|
| EP | 1172763 A2 | 1/2002 |
| GB | 2236608 A | 4/1991 |
| GB | 2317981 B | 9/2000 |
| TW | 201020939 A | 6/2010 |
| TW | I337259 B | 2/2011 |
| TW | 201128542 A | 8/2011 |
| TW | 201145057 A | 12/2011 |
| TW | 201220258 A | 5/2012 |
| WO | WO-2011146147 A1 | 11/2011 |

OTHER PUBLICATIONS

Fixed final-time near optimal regulation of nonlinear discrete-time systems in affine form using output feedback Qiming Zhao; Hao Xu; Jagannathan, S. American Control Conference (ACC), 2014 Year: 2014 pp. 4643-4648, DOI: 10.1109/ACC.2014.6858756 IEEE Conference Publications.*
Robust state and input simultaneous estimation for discrete-time linear time-varying uncertain systems Fuqiang You; Fuli Wang; Zhizhong Mao; Shouping Guan Control and Decision Conference (CCDC), 2011 Chinese Year: 2011 pp. 2884-2887, DOI: 10.1109/CCDC.2011.5968745 IEEE Conference Publications.*
Estimation and dynamic updating of time-varying signals with sparse variations Asif, M.Salman; Charles, Adam; Romberg, J.; Rozell, Christopher Acoustics, Speech and Signal Processing (ICASSP), 2011 IEEE International Conference on Year: 2011 pp. 3908-3911, DOI: 10.1109/ICASSP.2011.5947206 IEEE Conference Publications.*
Coombes, S., et al., "Nonsmooth dynamics in spiking neuron models," Physica D: Nonlinear Phenomena, vol. 241, issue 22, Nov. 15, 2012, pp. 2042-2057.
International Search Report and Written Opinion—PCT/US2013/068528—ISA/EPO—Feb. 3, 2014.
Rast, A., et al., "Concurrent heterogeneous neural model simulation on real-time neuromimetic hardware", Neural Networks, vol. 24, No. 9, Jul. 2, 2011, pp. 961-978, XP028298415, DOI: 10.1016/j.neunet.2011.06.014.
Soleimani, H., et al., "Biologically inspired spiking neurons: Piecewise linear models and digital implementation", IEEE Transactions on Circuits and Systems I: Regular Papers, vol. 59, No. 12, Aug. 14, 2012, pp. 2991-3004, XP011473718, DOI: 10.1109/TCSI.2012.2206463.
Tonnelier, A., et al., "Some generalizations of integrate-and-fire models", Scientiae Mathematicae Japonicae Online, vol. 8, No. 14, 2003, pp. 509-516, XP055098449, ISSN: 1346-0447.
Yamashita, Y., et al., "Bifurcation analysis of inhibitory responses of a PWC spiking neuron model", Nonlinear Theory and Its Applications (NOLTA), IEICE, vol. 3, No. 4, Oct. 1, 2012, pp. 557-572, XP055098447, DOI: 10.1587/nolta.3.557.
Dimuro, et al., "A Constrained Backpropagation Approach to Solving Partial Differential Equations in Non-stationary Environments", Proceedings of International Joint Conference on Neural Networks, Atlanta, Georgia, USA, Jun. 14-19, 2009, pp. 685-689.
Hartono, P., "Ensemble of perceptrons with confidence measure for piecewise linear decomposition", International Joint Conference on Neural Networks (IJCNN), 2011, pp. 648-653.
Mishra, et al., "Implementation of a digital neuron with nonlinear activation function using piecewise linear approximation technique", International Conference on ICM, Microelectronics 2007, 4pgs.
Tonnelier A., et al., "Piecewise linear differential equations and integrate-and-fire neurons: Insights from two-dimensional membrane models", Physical Review E 67, 021908, 2003, 16 pages.
Rotter S., et al., "Exact Digital Simulation of Time-invariant Linear Systems with Applications to Neuronal Modeling," Biological Cybernetics, vol. 81, pp. 381-402, 1999.
Taiwan Search Report—TW102140364—TIPO—Dec. 16, 2015.

* cited by examiner

PIECEWISE LINEAR NEURON MODELING

CLAIM OF PRIORITY UNDER 35 U.S.C. §119

This application claims benefit of U.S. Provisional Patent Application Ser. No. 61/728,360, filed Nov. 20, 2012 and entitled "Piecewise Linear Neuron Modeling," U.S. Provisional Patent Application Ser. No. 61/734,716, filed Dec. 7, 2012 and entitled "Piecewise Linear Neuron Modeling," U.S. Provisional Patent Application Ser. No. 61/740,633, filed Dec. 21, 2012 and entitled "Piecewise Linear Neuron Modeling," and U.S. Provisional Patent Application Ser. No. 61/756,889, filed Jan. 25, 2013 and entitled "Piecewise Linear Neuron Modeling," all of which are herein incorporated by reference in their entireties.

BACKGROUND

1. Field

Certain aspects of the present disclosure generally relate to artificial nervous systems and, more particularly, to approximating at least a portion of a nonlinear function of a neuron model as a piecewise linear function and to using the resulting linearized neuron model in one or more artificial neurons.

2. Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure generally relate to approximating at least a portion of a nonlinear function of a neuron model as a piecewise linear function. Methods and apparatus for implementing the resulting linearized neuron model in one or more artificial neurons, for example, are also provided. Certain aspects of the present disclosure generally relate to a common and flexible architecture for the implementation of the dynamics of neuron models. The design goals include low complexity, accurate modeling of the dynamics, and the ability to implement any neuron model (of one, two, or more dimensions). The piecewise linear approximations provide a simple way to change neuron models within such an architecture, simply by substituting different parameters associated with various neuron models.

Certain aspects of the present disclosure provide a method for operating an artificial neuron. The method generally includes determining that a first state of the artificial neuron is within a first region; determining a second state of the artificial neuron based at least in part on a first set of linear equations, wherein the first set of linear equations is based at least in part on a first set of parameters corresponding to the first region; determining that the second state of the artificial neuron is within a second region; and determining a third state of the artificial neuron based at least in part on a second set of linear equations, wherein the second set of linear equations is based at least in part on a second set of parameters corresponding to the second region.

Certain aspects of the present disclosure provide an apparatus for operating an artificial neuron. The apparatus generally includes a processing system and a memory coupled to the processing system. The processing system is generally configured to determine that a first state of the artificial neuron is within a first region; to determine a second state of the artificial neuron based at least in part on a first set of linear equations, wherein the first set of linear equations is based at least in part on a first set of parameters corresponding to the first region; to determine that the second state of the artificial neuron is within a second region; and to determine a third state of the artificial neuron based at least in part on a second set of linear equations, wherein the second set of linear equations is based at least in part on a second set of parameters corresponding to the second region.

Certain aspects of the present disclosure provide an apparatus for operating an artificial neuron. The apparatus generally includes means for determining that a first state of the artificial neuron is within a first region; means for determining a second state of the artificial neuron based at least in part on a first set of linear equations, wherein the first set of linear equations is based at least in part on a first set of parameters corresponding to the first region; means for determining that the second state of the artificial neuron is within a second region; and means for determining a third state of the artificial neuron based at least in part on a second set of linear equations, wherein the second set of linear equations is based at least in part on a second set of parameters corresponding to the second region.

Certain aspects of the present disclosure provide a computer program product for operating an artificial neuron. The computer program product generally includes a computer-readable medium (e.g., a storage device) having instructions executable to determine that a first state of the artificial neuron is within a first region; to determine a second state of the artificial neuron based at least in part on a first set of linear equations, wherein the first set of linear equations is based at least in part on a first set of parameters corresponding to the first region; to determine that the second state of the artificial neuron is within a second region; and to determine a third state of the artificial neuron based at least in part on a second set of linear equations, wherein the second set of linear equations is based at least in part on a second set of parameters corresponding to the second region.

Certain aspects of the present disclosure provide a method for implementing a combination of a plurality of neuron models in a system of neural processing units. The method generally includes loading parameters for a first neuron model selected from the plurality of neuron models into a first neural processing unit, determining a first state of the first neural processing unit based at least in part on the parameters for the first neuron model, and determining a second state of the first neural processing unit based at least in part on the parameters for the first neuron model and on the first state.

Certain aspects of the present disclosure provide an apparatus for implementing a combination of a plurality of neuron models in a system of neural processing units. The apparatus generally includes a processing system and a memory coupled to the processing system. The processing system is typically configured to load parameters for a first neuron model selected from the plurality of neuron models into a first neural processing unit, to determine a first state of the first neural processing unit based at least in part on the parameters for the first neuron model, and to determine a second state of the first neural processing unit based at least in part on the parameters for the first neuron model and on the first state.

Certain aspects of the present disclosure provide an apparatus for implementing a combination of a plurality of neuron models in a system of neural processing units. The apparatus generally includes means for loading parameters for a first neuron model selected from the plurality of neuron models into a first neural processing unit, means for determining a first state of the first neural processing unit based at least in part on the parameters for the first neuron model, and means for determining a second state of the first neural processing unit based at least in part on the parameters for the first neuron model and on the first state.

Certain aspects of the present disclosure provide a computer program product for implementing a combination of a plurality of neuron models in a system of neural processing units. The computer program product generally includes a (non-transitory) computer-readable medium having instructions executable to load parameters for a first neuron model selected from the plurality of neuron models into a first neural processing unit, to determine a first state of the first neural processing unit based at least in part on the parameters for the first neuron model, and to determine a second state of the first neural processing unit based at least in part on the parameters for the first neuron model and on the first state.

Certain aspects of the present disclosure provide a method for operating an artificial neuron. The method generally includes determining that a first state of the artificial neuron is within a first region; determining a second state of the artificial neuron based at least in part on a first set of linear equations, wherein the first set of linear equations is based at least in part on a first set of parameters corresponding to the first region; determining that the second state of the artificial neuron is within a second region, wherein at least one of the first region or the second region is defined by two or more dimensions; and determining a third state of the artificial neuron based at least in part on a second set of linear equations, wherein the second set of linear equations is based at least in part on a second set of parameters corresponding to the second region.

Certain aspects of the present disclosure provide an apparatus for operating an artificial neuron. The apparatus generally includes a processing system and a memory coupled to the processing system. The processing system is generally configured to determine that a first state of the artificial neuron is within a first region; to determine a second state of the artificial neuron based at least in part on a first set of linear equations, wherein the first set of linear equations is based at least in part on a first set of parameters corresponding to the first region; to determine that the second state of the artificial neuron is within a second region, wherein at least one of the first region or the second region is defined by two or more dimensions; and to determine a third state of the artificial neuron based at least in part on a second set of linear equations, wherein the second set of linear equations is based at least in part on a second set of parameters corresponding to the second region.

Certain aspects of the present disclosure provide an apparatus for operating an artificial neuron. The apparatus generally includes means for determining that a first state of the artificial neuron is within a first region; means for determining a second state of the artificial neuron based at least in part on a first set of linear equations, wherein the first set of linear equations is based at least in part on a first set of parameters corresponding to the first region; means for determining that the second state of the artificial neuron is within a second region, wherein at least one of the first region or the second region is defined by two or more dimensions; and means for determining a third state of the artificial neuron based at least in part on a second set of linear equations, wherein the second set of linear equations is based at least in part on a second set of parameters corresponding to the second region.

Certain aspects of the present disclosure provide a computer program product for operating an artificial neuron. The computer program product generally includes a computer-readable medium (e.g., a storage device or other non-transitory medium) having instructions executable to determine that a first state of the artificial neuron is within a first region; to determine a second state of the artificial neuron based at least in part on a first set of linear equations, wherein the first set of linear equations is based at least in part on a first set of parameters corresponding to the first region; to determine that the second state of the artificial neuron is within a second region, wherein at least one of the first region or the second region is defined by two or more dimensions; and to determine a third state of the artificial neuron based at least in part on a second set of linear equations, wherein the second set of linear equations is based at least in part on a second set of parameters corresponding to the second region.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
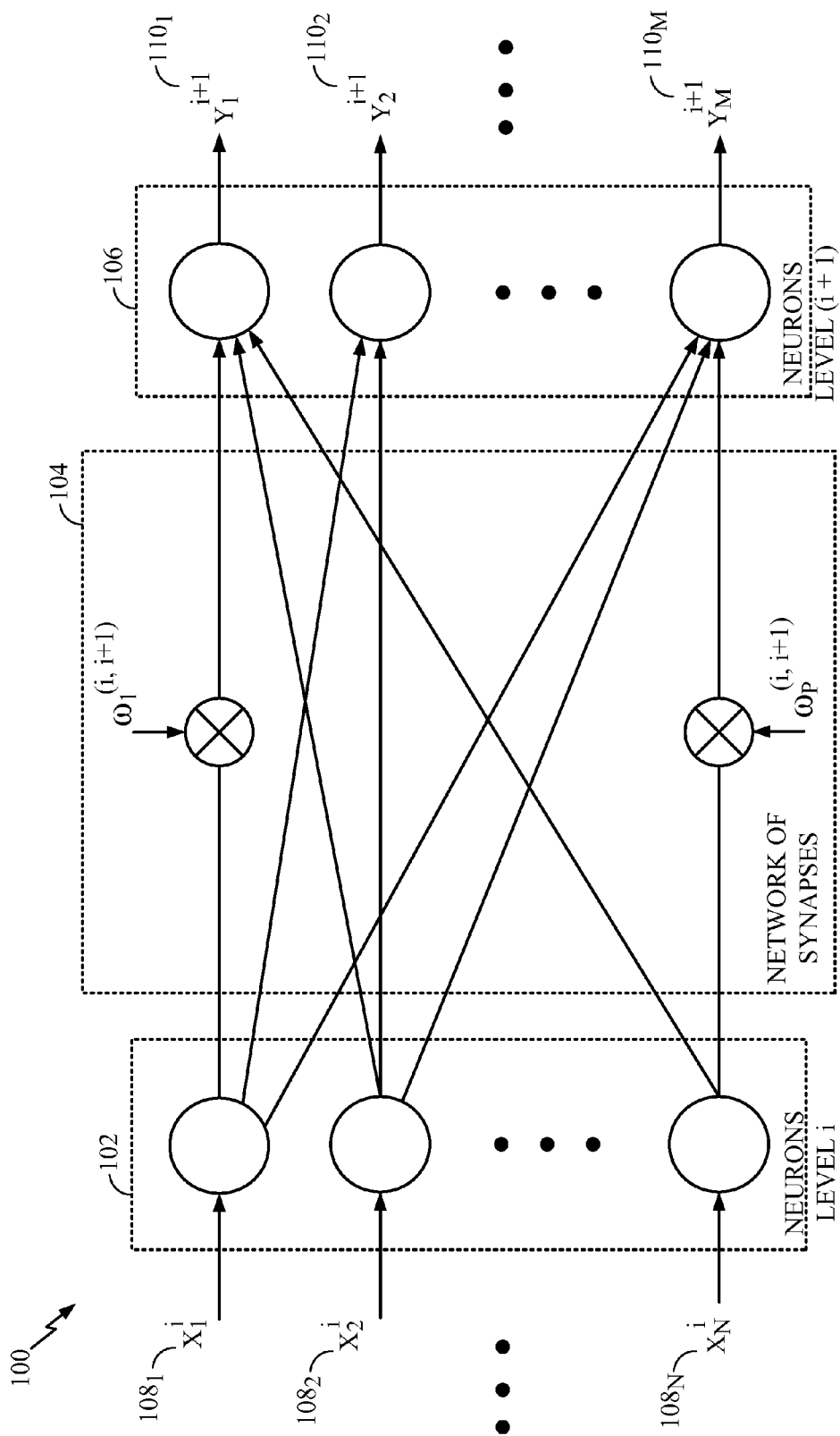
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
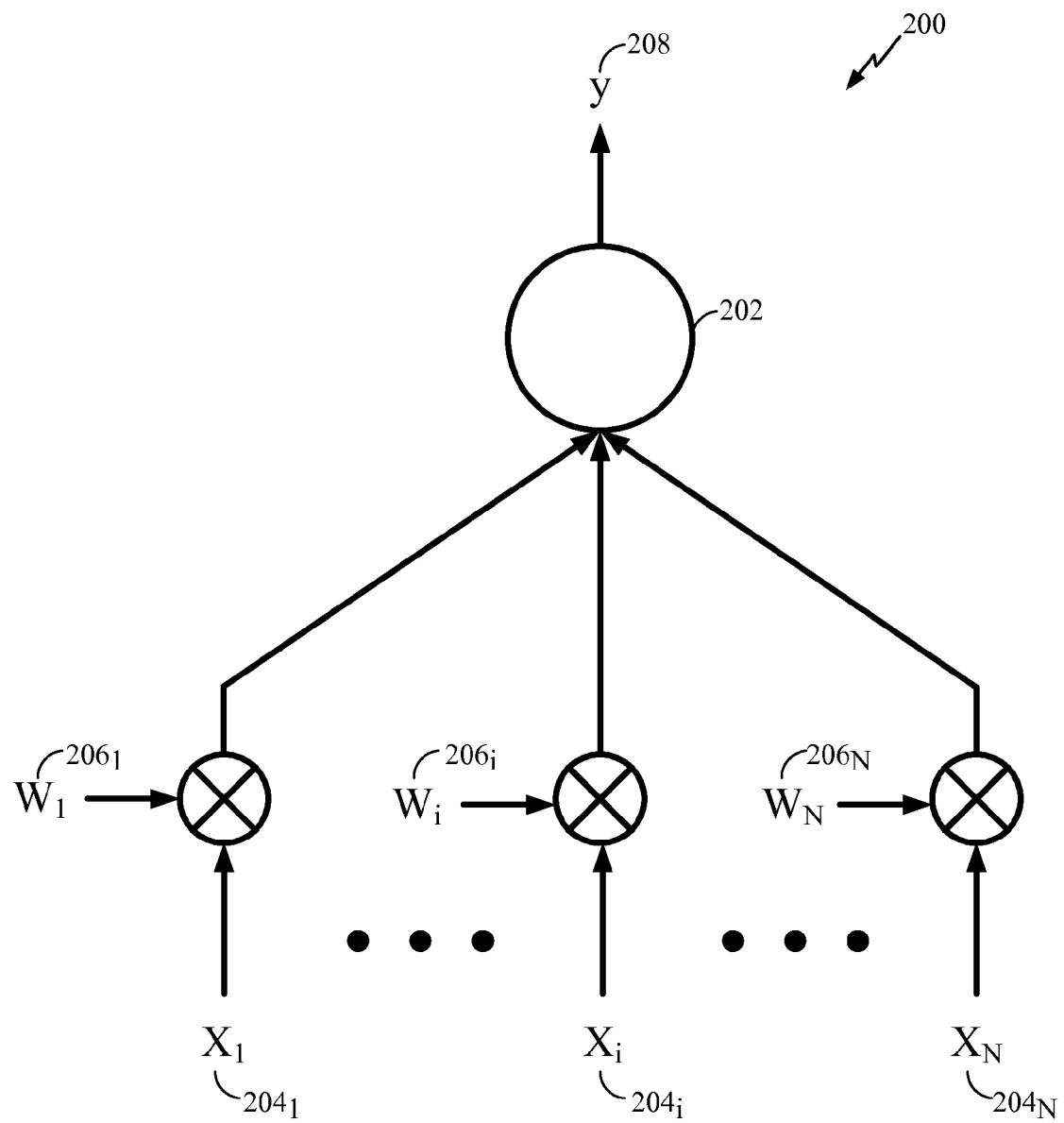
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$–$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$–$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by wires with synaptic circuits. The processing unit 202, its input and output connections may also be emulated by a software code. The processing unit 202 may also be emulated by an electric circuit, whereas its input and output connections may be emulated by a software code. In an aspect, the processing unit 202 in the computational network may comprise an analog electrical circuit. In another aspect, the processing unit 202 may comprise a digital electrical circuit.

In yet another aspect, the processing unit 202 may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output,), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{t/k_-}, & t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
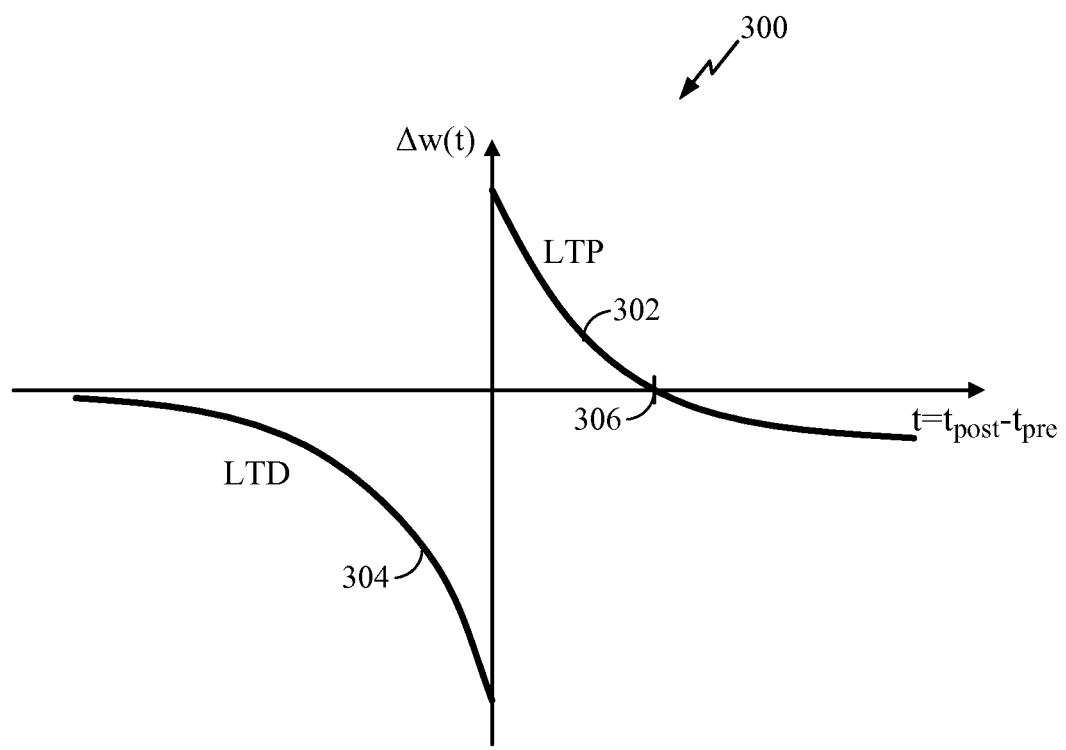
FIG. 3 illustrates an example spike-timing dependent plasticity (STDP) curve in accordance with certain aspects of the present disclosure.

FIG. 3 illustrates an example graph diagram 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset µ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input is in the form of a frame of a particular duration comprising spikes or pulses), the offset value µ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset µ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the subthreshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the subthreshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
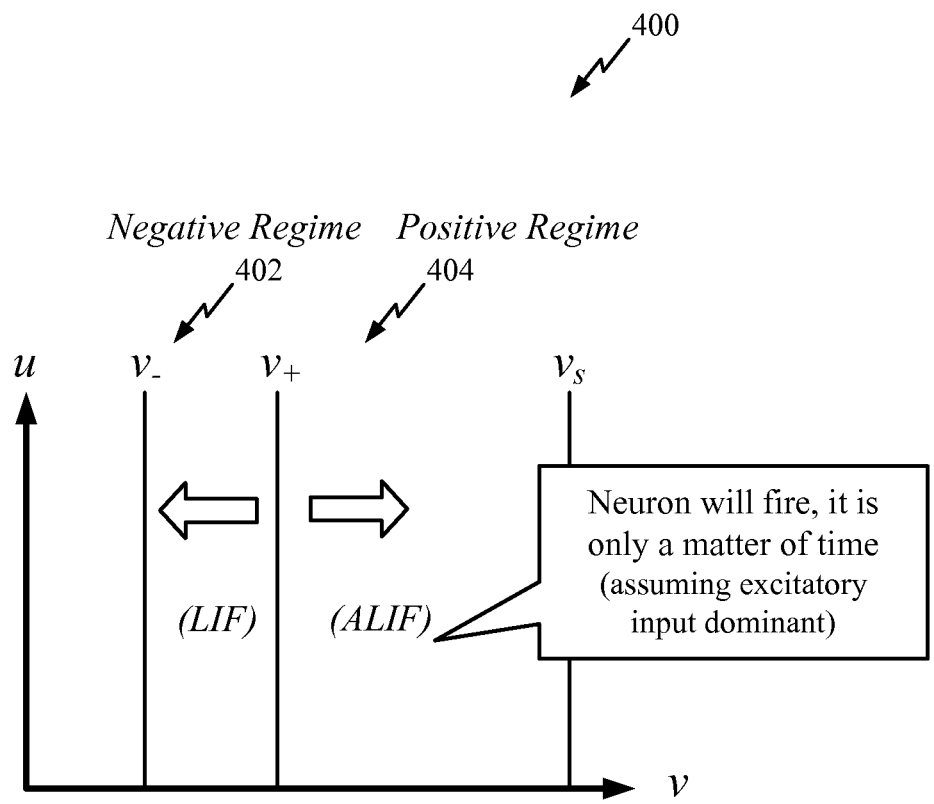
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other subthreshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent $\tau_+$ and will generally be positive, as will be $\tau_u$.

The dynamics of the two state elements may be coupled at events by transformations offsetting the states from their null-clines, where the transformation variables are $$q_\rho = -_\rho \beta u - v_\rho \quad (7)$$

$$r = \delta(v+\epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_s$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are $$v(t + \Delta t) = (v(t) + q_\rho)e^{\frac{\Delta t}{\tau_\rho}} - q_\rho \quad (11)$$

$$u(t + \Delta t) = (u(t) + r)e^{\frac{\Delta t}{\tau_u}} - r \quad (12)$$

Therefore, the model state may be updated only upon events such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \quad (13)$$

If a spike is defined as occurring at the time the voltage state v reaches $v_s$, then the closed-form solution for the amount of time, or relative delay, until a spike occurs as measured from the time that the voltage is at a given state v is $$\Delta t_S = \begin{cases} \tau_+ \log \frac{v_S + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime $\rho$ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one composed of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Example Piecewise Linear Neuron Modeling

Mathematical models for the dynamics of a neuron have been sought and studied for decades. A variety of neuron models have been proposed, varying in complexity and the accuracy with which the models match their biological counterparts. Fundamentally, all neuron models attempt to capture the nonlinear behavior of a cell membrane voltage due to the interactions of a large variety of ion channels and have a common starting point, namely the mathematical description provided by the breakthrough work of Hodgkin-Huxley in the 1950s.

Over the years, neuroscientists have converged, in large part, towards two-dimensional neuron models, which appear to provide a good tradeoff between the ability of duplicating the measured behavior of the biological cells they seek to model and the ease and speed with which they can be analyzed and simulated. The most common two-dimensional models, all formulated via a pair of differential equations, are described below.

However, conventional neuron model implementations lack flexibility. Typically, implementation of a neuron model for an artificial neuron, for example, is predicated on selecting a particular neuron model beforehand. The downside to this approach is the difficulty of implementing a completely different or even a slightly modified neuron model.

Certain aspects of the present disclosure take advantage of the fact that the differential equations for various dynamical neuron models may be considered as equivalent, but for the nonlinear function F(v) trying to capture the nonlinear behavior of the cell membrane voltage, as described above. With this realization, one approach includes linearizing, at finite quantization intervals, the nonlinear functions in the differential equations used to model the dynamics of the neurons to provide a piecewise linear approximation. Advantages of such an approach include the ability to derive solutions to the dynamics in either continuous time or discrete time with relative ease and a general mathematical framework whereby any neuron model can be analyzed and simulated. These solutions provide parameters corresponding to each quantization interval for a given neuron model, such that implementation of a different neuron model for certain aspects of the present disclosure may involve a simple substitution of the parameters.

Certain aspects of the present disclosure apply this piecewise linearization approach to a functional that includes the synaptic current. This more generalized approach leads to a system matrix which is a function, among other variables, of the time-varying synaptic conductance. The present disclosure first investigates some approximate solutions to the resulting piecewise linear time-varying system. Next, the present disclosure investigates a piecewise linear time-invariant (LTI) system obtained from the previous time-varying system by approximating the time-varying conductance by a constant over a given time interval. This more precise approach, with a functional that includes the synaptic current, leads to system matrices with a large dynamic range to be covered by the quantization process and therefore to relatively large memory demands to store various pre-calculated matrices. The benefit of this approach is a more accurate approximation of the true dynamics of the original nonlinear time-varying system. An approach to alleviate the memory demands by computing the relevant matrices, rather than storing them, over a portion of the dynamic range is also presented.

Certain aspects of the present disclosure provide a means to realize a common architecture that supports any one-dimensional, two-dimensional, or higher dimensioned neuron models. With this flexible architecture, any of various suitable neuron models may be executed and substituted as desired. For example, the neuron model may include at least one of an Izhikevich simple model, an exponential-integrate-and-fire (EIF) model, a FitzHugh-Nagumo model, a quartic model, or a Hunzinger Cold model as described above and in U.S. patent application Ser. No. 13/483,811, entitled "Dynamical Event Neuron and Synapse Models for Learning Spiking Neural Networks" and filed May 30, 2012, herein incorporated by reference. Such neuron models may be implemented using the piecewise linear approximation described herein.

Introduction

One place to begin is with the description of the differential equations modeling neuron dynamics. Although the description focuses on two-dimensional neuron models, the approach can be extended to higher dimensional models or applied to one-dimensional models, as well.

$$C \frac{d}{dt} v = F(v) - u + I \quad (15)$$

$$\frac{d}{dt} u = a(b \cdot (v - v_r) - u) \quad (16)$$

The above equations qualitatively describe the dynamics of an artificial neuron (for notational simplicity, the time dependency in the variables is omitted). These equations are the result of simplifications of the Hodgkin-Huxley four dimensional model to two dimensions, represented by the variables v and u. The variable v captures the behavior of the neuron membrane voltage and sodium activation, while u represents an "accommodation" or "recovery" variable attempting to capture the slower behavior of the potassium activation and sodium inactivation, thus reducing the four variables of the Hodgkin-Huxley model to two. The variable I in Eq. (15) represents the input current. A more generic two-dimensional model may be of the form $$C\frac{d}{dt}v = F(v, u) + I$$
$$\frac{d}{dt}u = G(v, u)$$

where both differential equations may contain nonlinear terms. Here, the focus is on models such as those described by Eqs. (15) and (16), but the same methodology developed throughout can be applied to the above description, as well.

Fundamentally, the most popular neuron models that have been suggested in the literature differ by the choice of the function F(v) in Eq. (15). Some examples include a quadratic function, as suggested by Izhikevich (also referred as the simple model):

$$F(v) = k(v-v_r)(v-v_t) \quad (17)$$

a linear-plus-exponential function, per Brette and Gerstner:

$$F(v) = g_L \cdot \Delta \cdot e^{\frac{v-v_t}{\Delta}} + g_L \cdot (E_L - v) \quad (18)$$

a linear-plus-cubic function representing the FitzHugh-Nagumo model:

$$F(v) = v - \frac{1}{3}v^3 \quad (19)$$

a linear-plus-quartic term, referred to as the quartic model, per Touboul and Gerstner $$F(v) = 2a \cdot v + v^4 \quad (20)$$

and finally what may be referred to as "intrinsic conductance" models, defined as $$F(v) = G(v) \cdot v + p(v) \quad (21)$$

where G(v) is a piecewise constant function (in units of conductance) and p(v) is also a piecewise constant function (in units of current). The simplest form of an intrinsic conductance model is obtained when G(v) and p(v) are piecewise constant over just two intervals, as in the Hunzinger Cold model described above, for which F(v) takes on the following form:

$$F(v) = \begin{cases} \frac{C}{\tau_-}(v-v_r) \text{ if } v \leq v_t \Rightarrow G(v) = \frac{C}{\tau_-} \text{ and } p(v) = -\frac{C}{\tau_-}v_r \\ \frac{C}{\tau_+}(v-v_t) \text{ if } v > v_t \Rightarrow G(v) = \frac{C}{\tau_+} \text{ and } p(v) = -\frac{C}{\tau_+}v_t \end{cases} \quad (22)$$

All models above, with the exception of the FitzHugh-Nagumo model, are referred to as two-dimensional hybrid models because, in addition to the description given by Eqs. (15) and (16), reset conditions are given. These are provided in such models, for example, because the variable v will grow to infinity once a voltage threshold is crossed. Therefore the following reset conditions may be used:

If $v > v_{peak}$, then $v \to v_r$ and $u \to u+d$ \quad (23)

In other words, when the voltage v crosses a spiking threshold $v_{peak}$ (or, for certain aspects, a determination is made that the voltage will cross $v_{peak}$), the voltage is reset to a resting value $v_r$, and the recovery variable u is reset to a value equal to the present value plus a constant d. For certain aspects, u may be reset to a predetermined constant value ($u_{reset}$), instead of u+d. According to certain aspects, a reset condition may occur in response to activation or reception of a control signal. The reset condition in the hybrid models enriches the possible behaviors of two-dimensional dynamical systems.

Most generally, the input current I(t) is modeled by a combination of synaptic currents $I_{SYN}(t)$ and a generic current $I_{ext}(t)$. The synaptic current takes on the form $$I_{SYN}(t) = \sum_i g_i(t) \cdot [E_i - v(t)] \quad (24)$$

In Eq. (24), $g_i(t)$ indicates the time-dependent conductance for a particular channel (the $i^{th}$ channel), and $E_i$ indicates the reversal potential for that channel. Although a synaptic current of the form above is sufficient to describe substantially linear current-voltage relationships, in some cases (e.g., the N-methyl-D-aspartate (NMDA) channel), the conductance is also a function of the post-synaptic membrane voltage. In this case Eq. (24) takes on a more complex form, namely $$I_{NMDA}(t) = g_{NMDA}(t) \cdot h(v)[E_{NMDA} - v(t)] \quad (25)$$

with the function h(v) capturing the dependence on the post-synaptic voltage. The function h(v) is modeled as $$h(v) = 1/(1 + \beta e^{-\alpha \cdot v}) \quad (26)$$

with the parameters α and β taking on the following values, for example: α=0.062 and β=1/3.57.

Therefore, most generally, up to L different synaptic channels may be modeled as follows:

$$I_{SYN}(t) = \sum_{i=1}^{L} g_i(t) h_i(v(t))(E_i - v(t)) \quad (27)$$

where $$h_i(v(t)) = \frac{1}{1 + \beta_i e^{-\alpha \cdot v(t)}} \quad (28)$$

with $$\begin{cases} \beta_i = \beta & \text{if } i = NMDA \\ \beta_i = 0 & \text{otherwise} \end{cases}$$

Additionally, the time-dependent conductance $g_i(t)$ can be modeled by a simple exponential function, an alpha function, or by a difference-of-exponentials function. In the case of a simple decaying exponential with time constant τ where θ(t) is the Heaviside step function, one has $$g_i(t) = g_i e^{-\frac{t}{\tau_i}} \theta(t) \quad (29)$$

In the case of an alpha function, one has $$g_i(t) = g_i \frac{t}{\tau_i} e^{1-\frac{t}{\tau_i}} \theta(t) \quad (30)$$

In the case of a difference-of-exponentials function, the exponentials having differing rise and decay time constants, one has $$g_i(t) = \bar{g}_i \left( e^{-\frac{t}{\tau_{decay}}} - e^{-\frac{t}{\tau_{rise}}} \right) \theta(t) \tag{31}$$

The constant $\bar{g}_i$ contains a normalization factor such that the peak is equal to $g_i$ as follows:

$$\bar{g}_i = \frac{g_i}{e^{-\frac{t_{peak}}{\tau_{decay}}} - e^{-\frac{t_{peak}}{\tau_{rise}}}} \tag{32}$$

where $$t_{peak} = \frac{\tau_{decay} \cdot \tau_{rise}}{\tau_{decay} - \tau_{rise}} \cdot \ln\left(\frac{\tau_{decay}}{\tau_{rise}}\right) \tag{33}$$

In the next sections, approximations to the solution of the dynamical system are explored. Since the system is nonlinear, exact solutions cannot be found. Therefore when referring to or comparing to the "exact" solution (as in Example 1), what is meant is a solution obtained numerically (e.g., Runge-Kutta), but with great precision.

Formulation and Derivation

Before proceeding with the derivation, some definitions and notation conventions are introduced. Henceforth, boldface capital letters denote matrices, whereas boldface lowercase letters denote vectors. A two-dimensional state vector x may be defined as $$x \equiv \begin{bmatrix} v \\ u \end{bmatrix} \tag{34}$$

The first state variable is the membrane voltage v, and the second state variable is the recovery variable u. Eqs. (15) and (16) are now rewritten explicitly for the most general case as follows:

$$C\frac{d}{dt}v(t) = F(v(t)) - u(t) + \sum_{i=1}^{L} g_i(t)h_i(v(t))(E_i - v(t)) + I_{ext}(t) \tag{35}$$

$$\frac{d}{dt}u(t) = abv(t) - au(t) - abv_r \tag{36}$$

Figure 7:
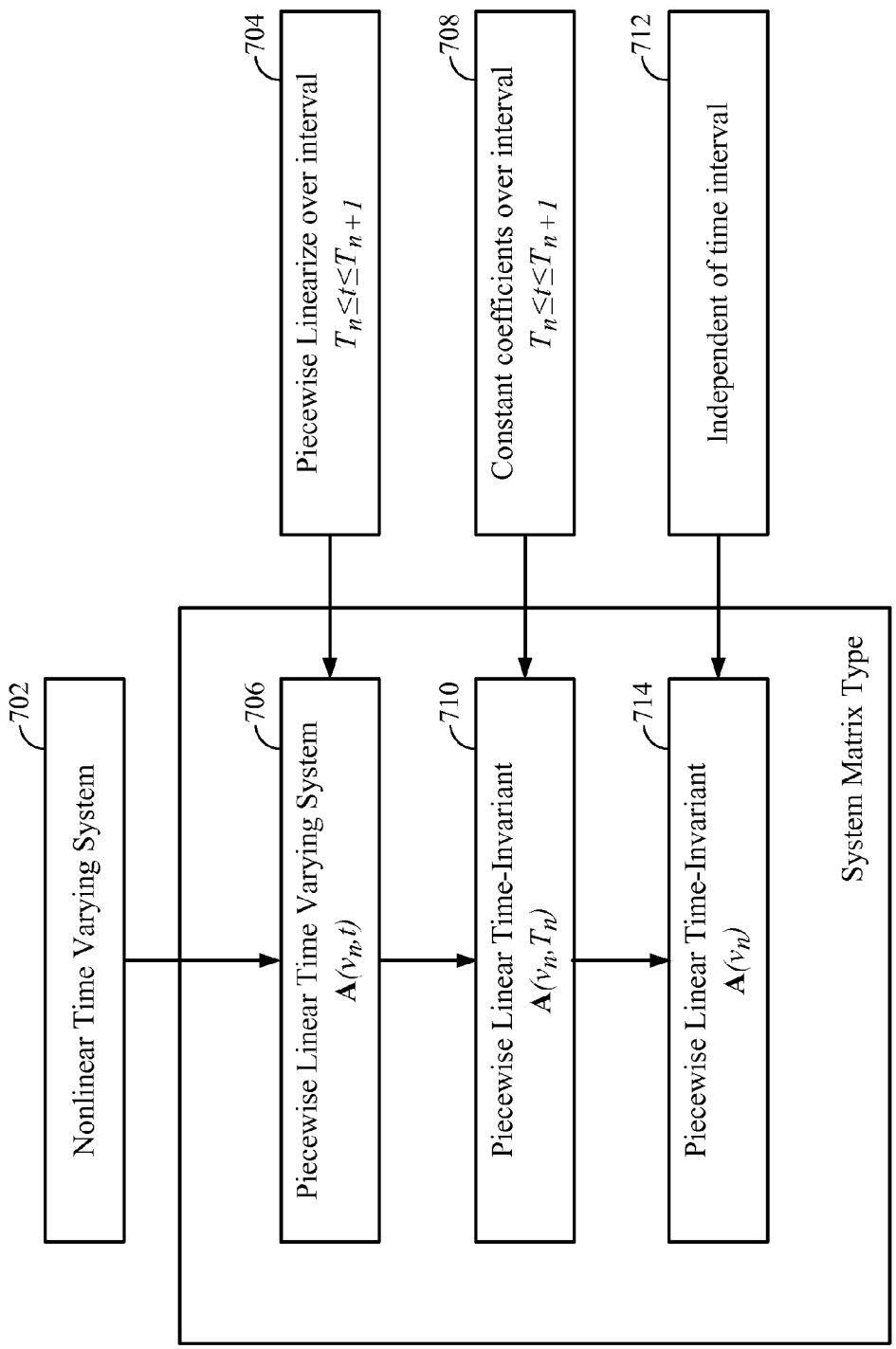
FIG. 7 illustrates a summary of various approaches to piecewise linear neuron modeling, in accordance with certain aspects of the present disclosure.

Therefore, in the most general case, one is dealing with a nonlinear time-varying (NLTV) two-dimensional dynamical system, as illustrated at 702 in FIG. 7. In the following, such a system is first approximated by a piecewise linear time-varying (pLTV) system at 706 and is successively further approximated as either: (1) a piecewise linear time-invariant system (pLTI) with constant coefficients that are time-interval dependent at 710 or (2) a pLTI with constant coefficients that are time-interval independent at 714.

Piecewise Linear Time-Varying System

First the time axis t∈[0,∞] is divided into arbitrary non-overlapping time intervals, namely $$\{t \in [T_n, T_{n+1}], n=0,1,2,3,\ldots\} \tag{37}$$

Within each time interval (e.g., the $n^{th}$ interval), the neuron behavior is approximated by a linear time-varying (LTV) system whose parameters are obtained from the state of the artificial neuron at the start of the interval (e.g., at time $t=T_n$). In order to develop such an approximation, first define $$\Gamma(v,t) \equiv \frac{1}{C}\left\{F(v(t)) + \sum_{i=1}^{L} g_i(t)h_i(v(t))(E_i - v(t)) + I_{ext}(t)\right\} \tag{38}$$

and the system of Eqs. (35) and (36) becomes $$\frac{d}{dt}v(t) = \Gamma(v,t) + a_{12}u(t) \tag{39}$$

$$\frac{d}{dt}u(t) = a_{21}v(t) + a_{22}u(t) + b_2 \tag{40}$$

Next, the function $\Gamma(v,t)$ is approximated with an approximate, affine-linear expression over the interval $t \in [T_n, T_{n+1}]$. The coefficients in the approximation are a function of the voltage at time $T_n$. To simplify notations when unequivocal, denote $v(T_n) \leftrightarrow v_n$ such that $$\Gamma(v,t) \cong a_{11}[v_n,t]v(t) + b_1[v_n,t] \tag{41}$$

Some examples of such approximations include the Taylor expansion method, the average slope method, the first order linear interpolation method, and the optimal linear interpolation method minimizing the $L_p$ approximation error. For the Taylor expansion method:

$$\Gamma(v,t) \cong \Gamma(v(T_n),t) + \left.\frac{\partial \Gamma(v,t)}{\partial v}\right|_{v(T_n)}(v(t) - v(T_n)) \tag{41a}$$

$$a_{11}[v_n,t] \equiv \left.\frac{\partial \Gamma(v,t)}{\partial v}\right|_{v_n} \text{ and}$$

$$b_1[v_n,t] \equiv \Gamma(v_n,t) - a_{11}[v_n,t]v_n$$

For a given voltage step $\Delta v_n$ in the average slope method, the average slope is computed as follows:

$$a_{11}[v(T_n),t] \equiv \frac{\Gamma(v(T_n) + \Delta v_n,t) - \Gamma(v(T_n),t)}{\Delta v_n} \text{ and} \tag{41b}$$

$$b_1[v_n,t] \equiv \Gamma(v_n,t) - a_{11}[v_n,t]v_n$$

In the first-order linear interpolation method, the voltage axis is partitioned into intervals, $v \in [V_k, V_{k+1}]$, $k=0, 1, 2, \ldots$ with $V_k \leq v(T_n) \leq V_{k+1}$. Then $$a_{11}[v(T_n),t] \equiv \frac{\Gamma(V_{k+1},t) - \Gamma(V_k,t)}{V_{k+1} - V_k} \text{ and} \tag{41c}$$

$$b_1[v_n,t] \equiv \Gamma(v_n,t) - a_{11}[v_n,t]v_n$$

In the optimal linear interpolation method minimizing the $L_p$ approximation error, the voltage axis is, as before, partitioned into intervals, $v \in [V_k, V_{k+1}]$, $k=0, 1, 2, \ldots$. However, the linear approximation $$\hat{\Gamma}(v,t) = a_{11}[v_n,t]v(t) + b_1[v_n,t]$$

is designed to minimize a linear approximation error with respect to the original function based on an $L_p$ norm. The approximation error over the interval $v \in [V_k, V_{k+1}]$ may be defined as $$\varepsilon_{p,n,t}(a_{11}[v_n, t], b_1[v_n, t]) = \left[\int_{V_k}^{V_{k+1}} |\Gamma(v, t) - \hat{\Gamma}(v, t)|^p dv\right]^{\frac{1}{p}}$$

where $$\hat{\Gamma}(v, t) = a_{11}[v_n, t]v(t) + b_1[v_n, t]$$

Based on Eq. (41), the LTV system described by Eqs. (39) and (40) may now be expressed as follows:

$$\frac{d}{dt}v(t) = a_{11}[v_n, t]v(t) + a_{12}u(t) + b_1[v_n, t] \quad (42)$$

$$\frac{d}{dt}u(t) = a_{21}v(t) + a_{22}u(t) + b_2 \quad (43)$$

More compactly, one has the matrix equation $$\dot{x}(t) = A(v_n, t)x(t) + b(v_n, t) \quad (44)$$

$$\dot{x}(t) = \begin{bmatrix} a_{11}[v_n, t] & a_{12} \\ a_{21} & a_{22} \end{bmatrix} x(t) + \begin{bmatrix} b_1[v_n, t] \\ b_2 \end{bmatrix} \quad (45)$$

where $a_{12}=1/C$, $a_{21}=ab$, $a_{22}=-a$, and $b_2=-abv_r$.

The solution of the LTV system above, for $t \in [T_n, T_{n+1}]$, may be expressed as $$x(t) = \Phi(t, T_n)x(T_n) + \int_{T_n}^{t} \Phi(\tau, T_n)b(v_n, \tau)d\tau \quad (46)$$

where the transition matrix $\Phi(t, T_n)$ is given by the Peano-Baker formula, namely $$\Phi(t, T_n) = I + \int_{T_n}^{t} A(v_n, t_0) dt_0 + \int_{T_n}^{t} A(v_n, t_0) \left[\int_{T_n}^{t_0} A(v_n, t_1) dt_1\right] dt_0 + \quad (47)$$

$$\int_{T_n}^{t} A(v_n, t_0) \left[\int_{T_n}^{t_0} A(v_n, t_1) \left[\int_{T_n}^{t_1} A(v_n, t_2) dt_2\right] dt_1\right] dt_0 + \ldots$$

The series given in Eq. (47) simplifies for some specific cases, for example:

(i) $A(v_n, t)$ is constant and equal to $A_n$. Then $\Phi(t, T_n)$ takes on the familiar form of a matrix exponential, namely $$\Phi(t, T_n) = e^{A_n(t-t_n)}$$

where the matrix exponential of a matrix A is defined as $$e^A = I + A + \frac{A^2}{2!} + \frac{A^3}{3!} + \ldots$$

(ii) A more general case is when $A(v_n, t)$ and $$\int_{T_n}^{t} A(v_n, \tau) d\tau$$

commute for any t. Then $$\Phi(t, T_n) = \exp\left[\int_{T_n}^{t} A(v_n, \tau) d\tau\right]$$

Any of the following conditions guarantees that the above commutative property is satisfied: (a) $A(v_n,t)$ is constant; (b) $A(v_n,t)=a(t)M$, where $a(t)$ is a scalar function and M is a constant matrix; or (c) $A(v_n,t)=\Sigma a_i(t)M_i$ where $a_i(t)$ is a scalar function and $M_iM_j=M_jM_i$ are constant matrices that commute for any i,j.

(iii) A somewhat more general case is when for all $t \in [T_n, T_{n+1}]$, the matrix $A(v_n,t)$ can be expressed as a sum of two components:

$$A(v_n, t) = A_k(v_n, \tau, t_c)(t - t_c)^k + A_{k+s}(v_n, \tau, t_c)\left[\frac{(t-t_c)^{k+1} - (\tau - t_c)^{k+1}}{k+1}\right]^s$$

for some integers $k \geq 0$ and $s \geq 1$, some fixed time-instants $t_c \leq \tau \leq t$, and some fixed matrices $A_k(v_n,\tau,t_c)$ and $A_{k+s}(v_n,\tau,t_c)$. The time-instants and matrices are "fixed" in the sense that they are independent of the time parameter $t \in [T_n,T_{n+1}]$. Perhaps the most useful example is when $k=0$ and $s=1$ or 2. In any case, if the second term in the above expression (i.e., the term involving the matrix $A_{k+s}(v_n,\tau,t_c)$) is much smaller than the first term for all $t \in [T_n,T_{n+1}]$, then it turns out that the matrix $\Phi(t,T_n)$ may be approximated by the following infinite series:

$$\Phi(t, T_n) = \exp\left[A_k(v_n, \tau, t_c)\frac{(t-t_c)^{k+1} - (\tau - t_c)^{k+1}}{k+1}\right] +$$

$$\sum_{m=0}^{\infty} A_k^m(v_n, \tau, t_c)A_{k+s}(v_n, \tau, t_c)G_{m,k,s}(A_k(v_n, \tau, t_c), (t-t_c), (\tau - t_c))$$

where a function $G_{m,k,s}(z,t,\tau)$ of a complex variable z and real-valued parameters t and $\tau$ is defined. The function $G_{m,k,s}(z,t,\tau)$ is analytic at $z=0$ and is given by $$G_{m,k,s}(z, t, \tau) \equiv \left\langle \frac{\partial^{k+s}}{\partial z^{k+s}}\left(z^{-(m+1)}\exp\left[z\frac{t^{k+1} - \tau^{k+1}}{k+1}\right]\right)\right\rangle$$

where the notation $\langle f(z) \rangle$ denotes the analytical component of $f(z)$. In the above equation, the analytical component is obtained by replacing the exponential term with its power series representation, computing the product and derivative, and then dropping terms associated with negative powers of z.

For all other cases of time-varying matrix $A(v_n,t)$, approximations to the transition matrix of Eq. (47) can be found, and then approximate solutions to Eq. (46) may be obtained.

Piecewise Linear Time-Invariant System

Further simplifications may be achieved by transforming the linear time varying (LTV) system described by Eq. (44)

into a linear time-invariant (LTI) system. In order to do so, the coefficient $a_{11}[v_n,t]$ is held constant over the interval $t \in [T_n, T_{n+1}]$. This result may be achieved in several ways, a few of which are described below. For each of the affine-linear approximations described above, the constant coefficient may be defined as follows:

$$a_{11}[v_n,t] \equiv a_{11}[v_n,T_n]$$

for any interval $t \in [T_n, T_{n+1}]$.

Alternatively, if the value of the next time step $T_{n+1}$ is known at time $t=T_n$, the average value of the coefficient $a_{11}[v_n,t]$ may be calculated as follows:

$$a_{11}[v_n, t] \equiv \frac{1}{T_{n+1} - T_n} \int_{T_n}^{T_{n+1}} a_{11}[v_n, \tau] d\tau$$

for any interval $t \in [T_n, T_{n+1}]$.

To clarify with an example for the Taylor expansion method, an LTI system is obtained by using $$a_{11}[v_n, T_n] \equiv \left. \frac{\partial \Gamma(v, T_n)}{\partial v} \right|_{v_n}$$

or $$a_{11}[v_n, T_n] \equiv \frac{1}{T_{n+1} - T_n} \int_{T_n}^{T_{n+1}} \left. \frac{\partial \Gamma(v, t)}{\partial v} \right|_{v_n} dt$$

The same averaging approach may be applied to any of the methods described above. The LTI system is now described by the following matrix equation:

$$\dot{x}(t) = \begin{bmatrix} a_{11}[v_n, T_n] & a_{12} \\ a_{21} & a_{22} \end{bmatrix} x(t) + \begin{bmatrix} b_1[v_n, t] \\ b_2 \end{bmatrix} \quad (48)$$

The solution may be expressed as $$x(t) = \Phi(t, T_n)x(T_n) + \int_{T_n}^{t} \Phi(T_n + t - \tau, T_n)b(v_n, \tau) d\tau \quad (49)$$

where the transition matrix $\Phi(t,T_n)$ is now the matrix exponential $$\Phi(t,T_n) = e^{A(v_n,T_n)(t-T_n)} \quad (50)$$

For the case in which $T_n=nT$ (i.e., fixed and uniform time intervals of length $T$), Eq. (49) becomes $$x(nT + T) = e^{A(v_n,nT)T}x(nT) + \int_{nT}^{nT+T} e^{A(v_n,nT)(nT+T+\tau)} b(v_n, \tau) d\tau \quad (51)$$

In summary, the initial general model is a nonlinear time-varying two-dimensional system. This nonlinear system was first transformed into a linear time-varying system by applying linear approximations to the nonlinear functional $\Gamma(v,t)$ over a given time interval. The time-varying system was further transformed into a linear time-invariant (LTI) system by taking the time-varying system matrix $A(v_n,t)$ and approximating it with a constant matrix $A_n$ over the same given interval.

Solutions

Now that the problem has been formulated and a number of possible affine linear approximations to the nonlinear functional have been proposed, the focus now is on the solution to the LTI system over the interval $t \in [T_n, T_{n+1}]$ given by Eqs. (49) and (51) and their implementation. Further simplifying the notations in Eq. (49) and denoting $A(v_n, T_n) = A_n$, $$x(t) = e^{A_n(t-T_n)}x(T_n) + \int_{T_n}^{t} e^{A_n(t-\tau)} b(v_n, \tau) d\tau \quad (52)$$

and the matrix $A(v_n, T_n)$ and vector $b(v_n, t)$ are given by $$A_n = \begin{bmatrix} a_{11}[v_n, T_n] & a_{12} \\ a_{21} & a_{22} \end{bmatrix}, b(v_n, t) \begin{bmatrix} b_1[v_n, t] \\ b_2 \end{bmatrix}$$

where the coefficients $a_{11}[v_n,T_n]$ and $b_1[v_n,t]$ are calculated by any of the methods described above.

Next, the solution for the Taylor expansion method is derived (the solutions for any of the other methods follow accordingly). In this case, one has $$a_{11}[v_n, T_n] \equiv \left. \frac{\partial \Gamma(v, T_n)}{\partial v} \right|_{v_n} \text{ and} \quad (53)$$

$$b_1[v_n, t] \equiv \Gamma(v_n, t) - a_{11}[v_n, T_n]v_n$$

and $$\Gamma(v_n, t) \equiv \frac{1}{C}\left\{ F(v_n) + \sum_{i=1}^{L} g_i(t)h_i(v_n)(E_i - v_n) + I_{ext}(t) \right\} \quad (54)$$

$$a_{11}[v_n, T_n] \equiv \left. \frac{\partial \Gamma(v, T_n)}{\partial v} \right|_{v_n} \quad (55)$$

$$= \frac{1}{C} \left. \frac{\partial F(v)}{\partial v} \right|_{v_n} +$$

$$\frac{1}{C} \sum_{i=1}^{L} g_i(T_n) \left[ \left. \frac{\partial h_i(v)}{\partial v} \right|_{v_n} (E_i - v_n) - h_i(v_n) \right]$$

Simplifying notations, $$a_{11}[v_n, T_n] = \frac{1}{C}F'(v_n) + \frac{1}{C}\sum_{i=1}^{L} g_i(T_n)[h_i'(v_n)(E_i - v_n) - h_i(v_n)] \quad (56)$$

It is convenient to express the vector $b(v_n,t)$ as follows:

$$b(v_n, t) = \begin{bmatrix} b_1[v_n, t] \\ b_2 \end{bmatrix}$$

$$= \begin{bmatrix} b_0 \\ b_2 \end{bmatrix} + \begin{bmatrix} b_1(t) \\ 0 \end{bmatrix} + \begin{bmatrix} \frac{1}{C}I_{ext}(t) \\ 0 \end{bmatrix}$$

$$\begin{bmatrix} b_0 \\ b_2 \end{bmatrix} = \begin{bmatrix} \frac{1}{C}\{F(v_n) - a_{11}[v_n, T_n]v_n\} \\ b_2 \end{bmatrix}$$

and

-continued $$\begin{bmatrix} b_1(t) \\ 0 \end{bmatrix} = \begin{bmatrix} \left\{ \frac{1}{C} \sum_{i=1}^{L} g_i(t) h_i(v_n)(E_i - v_n) \right\} \\ 0 \end{bmatrix}$$

Eq. (52) may then be expressed as $$x(t) = e^{A_n(t-T_n)} x(T_n) + \int_{T_n}^{t} e^{A_n(t-\tau)} d\tau \begin{bmatrix} b_0 \\ b_2 \end{bmatrix} + \tag{57}$$

$$\int_{T_n}^{t} e^{A_n(t-\tau)} \begin{bmatrix} b_1(\tau) \\ 0 \end{bmatrix} d\tau + \int_{T_n}^{t} e^{A_n(t-\tau)} \begin{bmatrix} \frac{1}{C} I_{ext}(\tau) \\ 0 \end{bmatrix} d\tau$$

The first integral of Eq. (57) may be solved in closed form, such that one obtains $$\int_{T_n}^{t} e^{A_n(t-\tau)} d\tau \begin{bmatrix} b_0 \\ b_2 \end{bmatrix} = A_n^{-1}(e^{A_n(t-T_n)} - I) \begin{bmatrix} b_0 \\ b_2 \end{bmatrix} \tag{58}$$

where I is the 2×2 identity matrix.

Eq. (52) may now be expressed as follows:

$$x(t) = e^{A_n(t-T_n)} x(T_n) + A_n^{-1}(e^{A_n(t-T_n)} - I) \begin{bmatrix} b_0 \\ b_2 \end{bmatrix} + \tag{59}$$

$$\int_{T_n}^{t} e^{A_n(t-\tau)} b_1(\tau) d\tau \begin{bmatrix} 1 \\ 0 \end{bmatrix} + \int_{T_n}^{t} e^{A_n(t-\tau)} \frac{1}{C} I_{ext}(\tau) d\tau \begin{bmatrix} 1 \\ 0 \end{bmatrix}$$

If the external current is such that closed-form expression for the last integral of Eq. (59) cannot be obtained, it may have to be approximated. One example of an approximation is the zero-hold, namely $$\int_{T_n}^{t} e^{A_n(t-\tau)} \frac{1}{C} I_{ext}(\tau) d\tau \begin{bmatrix} 1 \\ 0 \end{bmatrix} \cong \frac{1}{C} I_{ext}(T_n) \int_{T_n}^{t} e^{A_n(t-\tau)} d\tau \begin{bmatrix} 1 \\ 0 \end{bmatrix} = \tag{60}$$

$$\frac{1}{C} I_{ext}(T_n) A_n^{-1}(e^{A_n(t-T_n)} - I) \begin{bmatrix} 1 \\ 0 \end{bmatrix}$$

In this case, the closed-form solution for any interval $t \in [T_n, T_{n+1}]$ takes on the following form:

$$x(t) = e^{A_n(t-T_n)} x(T_n) + \tag{61}$$

$$A_n^{-1}(e^{A_n(t-T_n)} - I) \begin{bmatrix} b_0 + \frac{1}{C} I_{ext}(T_n) \\ b_2 \end{bmatrix} + \int_{T_n}^{t} e^{A_n(t-\tau)} b_1(\tau) d\tau \begin{bmatrix} 1 \\ 0 \end{bmatrix}$$

A key ingredient in Eq. (61) is the matrix exponential $e^{A_n t}$, which can be expressed as follows. Let $\lambda_{n1}$ and $\lambda_{n2}$ be the eigenvalues of the 2×2 matrix $A_n$. Then $$e^{A_n t} = e^{\lambda_{n1} t} I + \frac{e^{\lambda_{n1} t} - e^{\lambda_{n2} t}}{\lambda_{n1} - \lambda_{n2}} (A_n - \lambda_{n1} I) \tag{62}$$

for $\lambda_{n1} \neq \lambda_{n2}$ real $$e^{A_n t} = e^{\lambda_{n1} t} I + t e^{\lambda_{n1} t} (A_n - \lambda_{n1} I) \tag{63}$$

for $\lambda_{n1} = \lambda_{n2}$ real $$e^{A_n t} = e^{\alpha t} \cos \beta t I + \frac{e^{\alpha t} \sin \beta t}{\beta} (A_n - \alpha I) \tag{64}$$

for $\lambda_{n1} = \lambda_{n2}^*$ $= \alpha + i\beta$ $\beta > 0$ where $\lambda_{n1}$ and $\lambda_{n2}$ are the solutions of the characteristic equation $\det(A_n - \lambda I) = 0$.

Eqs. (62)-(64) give explicit expressions for the matrix exponential. Alternatively, a large number of efficient numerical algorithms are available to compute the matrix exponential. Therefore, it is feasible to determine the state of the system at time $t = T_{n+1}$ through either method. But in a hardware implementation, it may be beneficial to use a different approach, as described next.

First, notice that in the matrix $A_n$, only one coefficient $a_{11}[v_n, T_n]$ changes as the system evolves; the remaining three coefficients remain constant throughout. The coefficient is given, for example, by Eq. (56). An example efficient procedure is as follows: (1) quantize the first state variable (i.e., the membrane voltage $v_n$) at each time to step to a finite number of values and (2) index lookup tables with pre-calculated values of the functions $F'(v_n)$, $h'_i(v_n)$, and $h_i(v_n)$. Similarly, time instants may be quantized, as well, and pre-calculated values of $g_i(T_n)$ may be stored in lookup tables. The retrieved values may now be used to evaluate $a_{11}[v_n, T_n]$ via Eq. (56) and to quantize the result to a finite number of values $Q(a_{11}[v_n, T_n])$.

Similarly, a number of choices for $\Delta T_n$ may be pre-selected, and the matrix exponential and the matrix inverse of the matrices appearing in Eq. (62) may be pre-calculated and addressed by $Q(a_{11}[v_n, T_n])$ and $\Delta T_n$.

Adaptive and Fixed Time Steps

In the previous section, the expressions for the state of the LTI system were derived at arbitrary time instants. The following describes in more detail the case where the time steps are chosen adaptively and the simpler case of a synchronous system where the time instants are uniform with a fixed and predetermined step size $\Delta T_n = T$.

An adaptive strategy may be beneficial both with respect to complexity and precision. For example, time steps may be chosen farther apart (i.e., larger $\Delta T_n$) when the state is evolving slowly, thus increasing the speed of computations. In contrast, the time steps may be made small when, for example, the neuron model is near a spiking event, thereby increasing the precision with which the spike time is calculated. Next, a possible algorithm for the choice of the time steps is described.

As Eq. (63) shows, the time constants of the system evolution are inversely proportional to the eigenvalues of the matrices $A_n$. In particular, if the eigenvalues are close to zero, then the time constants are large, and the system evolves slowly. If, on the contrary, at least one of the eigenvalues becomes large (and possibly positive), the system evolves very rapidly. One example algorithm for the choice of the time steps that accomplishes the above task is the following:

$$T_{n+1} = T + \min\left(\frac{\ln \mu_n}{\lambda_{n,max}}, \Delta T_{max}\right) \quad (65)$$

In Eq. (65), $\lambda_{n,max}$ denotes the maximum eigenvalue (in magnitude) of the matrix $A_n$, while $\Delta T_{max}$ and $\mu_n$ are configurable parameters. This ensures that the following relationships hold:

$$\lambda_{n,max} \leq |a_{11}[v(T_n),T_n]| + |a_{22}|, T_{n+1} - T_n \leq \Delta T_{max} \quad (66)$$

and for any interval $t \in [T_n, T_{n+1}]$ $$\|x(t)\| \leq \mu_n \|x(T_n)\| \quad (67)$$

Next, the general solutions of the previous section are specialized for the important case of fixed and uniform time steps of size T. Starting with Eq. (61), one obtains $$x(nT+T) = e^{A_n T} x(nT) + \quad (68)$$

$$A_n^{-1}(e^{A_n T} - I)\begin{bmatrix} b_0 + \frac{1}{C} I_{ext}(nT) \\ b_2 \end{bmatrix} + \int_0^T e^{A_n t} b_1(nT+T-t)dt \begin{bmatrix} 1 \\ 0 \end{bmatrix}$$

Example 1

Taylor Expansion for the Izhikevich (Simple) Model

In this example, Eq. (68) is evaluated for the simple model and linearization based on the Taylor expansion method. To simplify the formulas somewhat, it is assumed that the external current is not present.

First, the coefficients of the Taylor expansion for the simple model, i.e., $F(v)=k(v-v_r)(v-v_t)$, are derived starting from Eq. (56). Provided that $$\frac{1}{C}\frac{\partial F(v)}{\partial v}\bigg|_{v_n} = \frac{2k}{C}v_n - \frac{k}{C}(v_r + v_t) \quad (69)$$

one obtains $$a_{11}[v_n, nT] = \quad (70)$$

$$\frac{2k}{C}v_n - \frac{k}{C}(v_r + v_t) + \frac{1}{C}\sum_{i=1}^{L} g_i(nT)[h_i'(v_n)(E_i - v_n) - h_i(v_n)]$$

$$b_1[v_n, t] = \Gamma(v_n, t) - a_{11}[v_n, nT]v_n \quad (71)$$

$$= \frac{1}{C}\left\{k(v_n - v_r)(v_n - v_t) + \sum_{i=1}^{L} g_i(t)h_i(v_n)(E_i - v_n)\right\} -$$

$$\left\{\frac{2k}{C}v_n^2 - \frac{k}{C}(v_r + v_t)v_n + \frac{1}{C}\sum_{i=1}^{L} g_i(nT)\right.$$

$$[h_i'(v_n)(E_i - v_n) - h_i(v_n)]v_n\}$$

For non-NMDA synaptic channels, Eqs. (70) and (71) simplify to $$a_{11}[v_n, nT] = \frac{2k}{C}v_n - \frac{k}{C}(v_r + v_t) - \frac{1}{C}\sum_{i=1}^{L} g_i(nT) \quad (72)$$

$$b_1[v_n, nT] = \frac{1}{C}\left\{-kv_n^2 + kv_r v_t + \sum_{i=1}^{L} g_i(nT)v_n\right\} + \frac{1}{C}\sum_{i=1}^{L} g_i(t)(E_i - v_n) \quad (73)$$

Taking $$b_0 = \frac{1}{C}\left\{-kv_n^2 + kv_r v_t + \sum_{i=1}^{L} g_i(nT)[h_i'(v_n)(E_i - v_n) - h_i(v_n)]v_n\right\}$$

Eq. (68) now becomes $$x(nT+T) = e^{A_n T} x(nT) + A_n^{-1}(e^{A_n T} - I)\begin{bmatrix} b_0 \\ b_2 \end{bmatrix} + \quad (74)$$

$$\sum_{i=1}^{L}[h_i(v_n)(E_i - v_n)]\int_0^T e^{A_n \tau} g_i(nT+T-\tau)d\tau \begin{bmatrix} 1 \\ 0 \end{bmatrix}$$

with $$A_n = \begin{bmatrix} \frac{2k}{C}v_n - \frac{k}{C}(v_r + v_t) + \frac{1}{C}\sum_{i=1}^{L} g_i(nT) & -\frac{1}{C} \\ [h_i'(v_n)(E_i - v_n) - h_i(v_n)] & \\ ab & -a \end{bmatrix}$$

$$\begin{bmatrix} b_0 \\ b_2 \end{bmatrix} = \begin{bmatrix} \frac{1}{C}\{-kv_n^2 + kv_r v_t + \sum_{i=1}^{L} g_i(nT)[h_i'(v_n)(E_i - v_n) \\ -h_i(v_n)]v_n\} \\ -abv_r \end{bmatrix}$$

Once again for non-NMDA synaptic currents, Eq. (74) simplifies to $$x(nT+T) = e^{A_n T} x(nT) + A_n^{-1}(e^{A_n T} - I)\begin{bmatrix} b_0 \\ b_2 \end{bmatrix} + \quad (75)$$

$$\sum_{i=1}^{L} E_i \int_0^T e^{A_n \tau} g_i(nT+T-\tau)d\tau \begin{bmatrix} 1 \\ 0 \end{bmatrix}$$

with $$A_n = \begin{bmatrix} \frac{2k}{C}v_n - \frac{k}{C}(v_r + v_t) - \frac{1}{C}\sum_{i=1}^{L} g_i(nT) & -\frac{1}{C} \\ ab & -a \end{bmatrix}$$

$$\begin{bmatrix} b_0 \\ b_2 \end{bmatrix} = \begin{bmatrix} \frac{1}{C}\{-kv_n^2 + kv_r v_t + \sum_{i=1}^{L} g_i(nT)v_n\} \\ -abv_r \end{bmatrix}$$

Furthermore, the integrals in Eqs. (74) and (75) can be solved in closed form. For example, if $$g_i(t) = g_i e^{-t/\tau_i} \Theta(t)$$

then $$\int_0^T e^{A_n \tau} g_i(nT + T - \tau) d\tau = g_i(nT + T)(e^{A_n} + \tau_i^{-1} I)^{-1} \left(e^{(A_n + \tau_i^{-1})T} I\right) \quad (76)$$

Figure 5A:
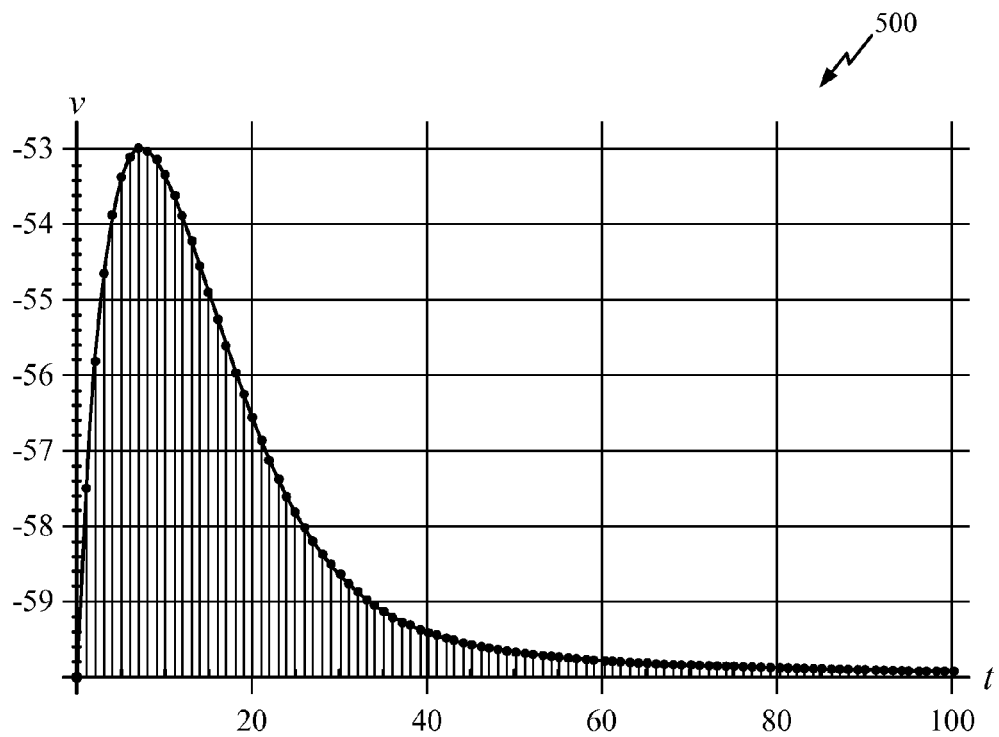
FIGS. 5A and 5B illustrate example graphs of membrane voltage v and recovery current u, respectively, versus time for comparing the nonlinear time-varying simple model to an example linearization based on a Taylor expansion method, in accordance with certain aspects of the present disclosure.
Figure 5B:
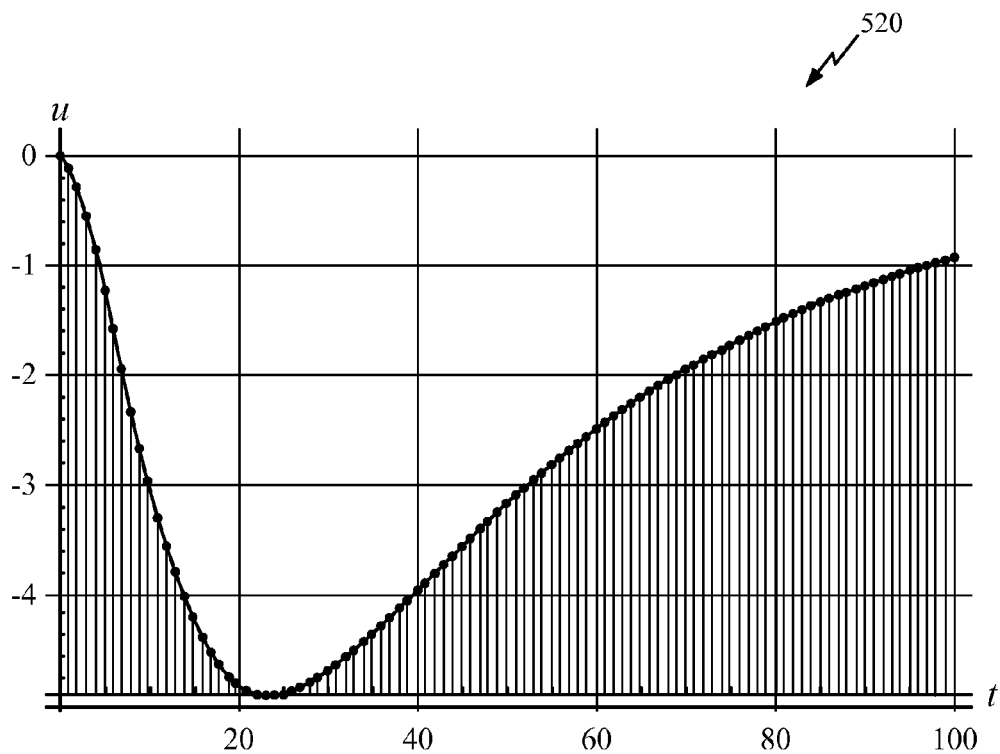

To complete the example, the accuracy of Eq. (75) is tested with T=1 ms for a slow excitatory neuron model with parameters k=0.7, C=100, a=0.03, b=−2, $v_r$=−60 mV, and $v_t$=−40 mV and a single exponential AMPA channel with parameters $\tau_{AMPA}$=5 ms, $E_{AMPA}$=0 mV, and $g_{AMPA}$=5. As illustrated in the membrane potential plot 500 and the recovery current plot 520 of FIGS. 5A and 5B, respectively, the linearization based on Eq. (75) accurately tracks the plots based on the nonlinear time-varying model.

Example 2

Subthreshold Dynamics of the Hunzinger Cold Model

Another example is developed in an effort to examine the subthreshold dynamics of the simple intrinsic conductance model known as the Hunzinger Cold model. In this example, no synaptic currents and the simple, but interesting case of impulsive external current are assumed.

In the Hunzinger Cold model (see Eq. (22) above) when the membrane voltage is below threshold, the matrix, $A_n$ is constant and equal to $A_-$:

$$A_- \equiv \begin{bmatrix} -1/\tau_- & -1/C \\ ab & -a \end{bmatrix}$$

The derivation can be further simplified if the first state variable is defined as the membrane voltage minus the reference voltage. With such a definition, all the constant terms are equal to zero, and Eq. (61) simplifies to $$x(t) = e^{A_-(t-T_n)} x(T_n) + \frac{1}{C} \int_{T_n}^t e^{A_-(t-\tau)} I_{ext}(\tau) d\tau \begin{bmatrix} 1 \\ 0 \end{bmatrix} \quad (77)$$

Furthermore, if the external current is assumed to be a Dirac delta function at time $T_n$ with amplitude I, i.e., $I_{ext}(t)=I\delta(t-T_n)$, then $$x(t) = e^{A_-(t-T_n)} \left( x(T_n) + \frac{1}{C} \begin{bmatrix} 1 \\ 0 \end{bmatrix} \right) \quad (78)$$

Note that impulsive inputs have the same effect on the system as that of an initial condition. If the eigenvalues are real and $\lambda_1 \neq \lambda_2$, Eq. (62) may be substituted in Eq. (78) to obtain the following continuous time solution for $v < v_t$:

$$x(t) = \left[ e^{\lambda_1(t-T_n)} I + \frac{e^{\lambda_1(t-T_n)} - e^{\lambda_2(t-T_n)}}{\lambda_1 - \lambda_2} (A_- - \lambda_1 I) \right] \left( x(T_n) + \frac{I}{C} \begin{bmatrix} 1 \\ 0 \end{bmatrix} \right) \quad (79)$$

By defining a new matrix $$\overline{A}_- = \frac{(A_- - \lambda_1 I)}{\lambda_1 - \lambda_2}$$

and denoting $$x(T_n) + \frac{I}{C} \begin{bmatrix} 1 \\ 0 \end{bmatrix} = \begin{bmatrix} v_n \\ u_n \end{bmatrix}$$

Eq. (72) may be written as $$x(t) = [e^{\lambda_1(t-T_n)}(I + \overline{A}_-) - e^{\lambda_2(t-T_n)} \overline{A}_-] \begin{bmatrix} v_n \\ u_n \end{bmatrix} \quad (80)$$

In particular for $T_2$=0, one obtains $$x(t) = [e^{\lambda_1 t}(I + \overline{A}_-) - e^{\lambda_2 t} \overline{A}_-] \begin{bmatrix} v_0 + I/C \\ u_0 \end{bmatrix} \quad (81)$$

Figure 6A:
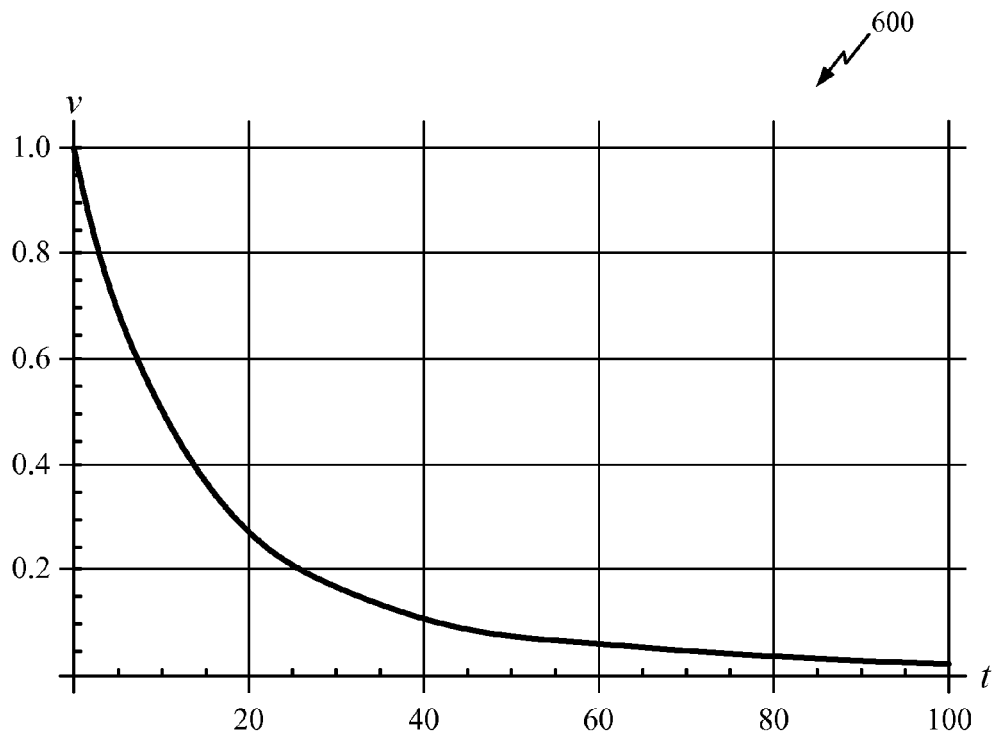
FIGS. 6A and 6B illustrate example graphs of membrane voltage v and recovery current u, respectively, versus time for the subthreshold dynamics of the Hunzinger Cold model, in accordance with certain aspects of the present disclosure.
Figure 6B:
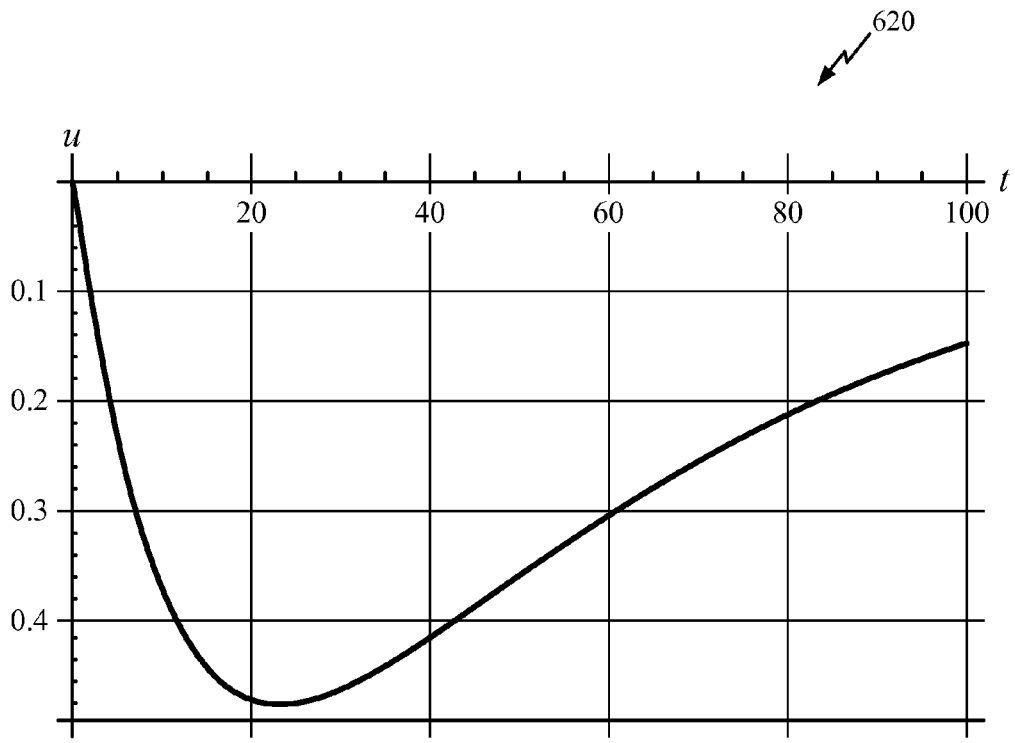

The membrane potential plot 600 and the recovery current plot 620 of FIGS. 6A and 6B, respectively, show the time evolution of Eq. (81) for the following values of the parameters: $\tau_-$=14 ms, C=100, a=0.03, b=−2, $I_{ext}(t)$=100δ(t), and $v_0$=$u_0$=0. The membrane voltage and recovery current are given by the following functions:

$$v(t) - v_r = 0.8228 e^{-0.0827 t} + 0.1771 e^{-0.0186 t} \quad (82)$$

$$u(t) = 0.9351 e^{-0.08277 t} - 0.9351 e^{-0.0186 t} \quad (83)$$

Since the matrices and eigenvalues involved in the computation of Eq. (80) are known a priori, the time course of the system may be calculated very easily and with the desired precision by pre-calculating and storing (e.g., in a look-up table) the two exponential functions with a given time resolution. Alternatively, fast algorithms for the computation (approximation) of the exponential function may be employed, and Eq. (80) may be computed in real time.

The above formulation is particularly relevant in an event-based implementation where it is of interest to compute the state vector at the time of an event. For instance given Eq. (80) and the occurrence of an event at time $T_{n+1}$, one may wish to compute $T_{n+1}^-$. With $\Delta_n \equiv T_{n+1} - T_n$, one has $$x(T_{n+1}^-) = [e^{\lambda_1 \Delta_n}(I + \overline{A}_-) - e^{\lambda_2 \Delta_n} \overline{A}_-] \begin{bmatrix} v_n \\ u_n \end{bmatrix} \quad (84)$$

One important event is the spike time (i.e. the time at which the artificial neuron's membrane voltage crosses a peak threshold, as described above). When the model for the artificial neuron is close to the spike time, at least one of the eigenvalues is positive and dominant. Therefore, a good approximation may be achieved by retaining only the dominant term in the expression of the voltage. In other words, since the function v(t) is of the form shown in Eq. (82), i.e., $$v(t) = c_1 e^{\lambda_1 t} + c_2 e^{\lambda_2 t} \quad (85)$$

v(t) may be approximated by its dominant term, i.e., $$v(t) \cong c_1 e^{\lambda_1 t} + c_2 \quad (86)$$

The spiking time may be easily obtained from $$t_{spike} \cong \frac{1}{\lambda_1} \ln((v_{peak} - c_2)/c_1) \qquad (87)$$

Additional Simplifications

The end of the subsection entitled "Solutions" mentions that in order to pre-calculate the matrix exponential and matrix inverse, the first element $a_{11}[v_n,T_n]$ of the matrix $A_n$ should be quantized to a finite number of values that cover the dynamic range. As seen from the derivations of the previous subsection and specifically from Example 1, the coefficient $a_{11}[v_n,T_n]$ is a function of $v_n$ and of the conductance at time $T_n$. Although the dynamic range of the membrane voltage is fairly limited, the dynamic range of the conductance can be very large. Therefore, a large number of pre-calculated matrices may most likely have to be stored in this case. Next, further simplifications are explored in order to reduce the memory demands. One approach is that of pre-computing and storing the desired matrices over a limited range and performing calculations to approximate the desired matrices for values beyond that range.

For example, when the coefficient $a_{11}[v_n,T_n]$ becomes much larger (in magnitude) than the other three fixed coefficients of the matrix $A_n$, the following approximation may be used:

$$\psi(A) \cong \frac{1}{(a_{11}-a_{22})^2 + a_{12}a_{21}} \begin{bmatrix} a_{11}-a_{22} & -a_{12} \\ a_{21} & a_{11}-a_{22} \end{bmatrix} \qquad (88)$$

$$\begin{bmatrix} \psi(\gamma_1) & 0 \\ 0 & \psi(\gamma_2) \end{bmatrix} \begin{bmatrix} a_{11}-a_{22} & a_{12} \\ -a_{21} & a_{11}-a_{22} \end{bmatrix}$$

$$\gamma_1 = a_{11} + \frac{a_{12}a_{21}}{a_{11}-a_{22}}$$

and $$\gamma_2 = a_{22} - \frac{a_{12}a_{21}}{a_{11}-a_{22}}$$

for any complex-valued function $\psi(\cdot)$, such as $\psi(x)=e^x$ and $\psi(x)=x^{-1}$. With this approach, memory demands and computational complexity can be traded off.

Further reduction of the memory demands may be accomplished via certain approximations. For example, an affine linear approximation may be applied to a revised functional $$\Gamma(v,t) = \Gamma(v) \equiv \frac{1}{C} F(v(t))$$

rather than that defined by Eq. (38). Additionally, the synaptic current may be treated as an external current, and the resulting integral may be approximated by a backward rectangular rule. In this case, the dynamic range involved for pre-calculating and storing the matrix exponential and matrix inverse is that of the membrane voltage alone and is, therefore, quite small. The tradeoff is one of memory demands versus accuracy of the solutions.

Next, the paragraph above is explained in more detail by re-deriving the solution under this additional simplification. One may begin as before with Eqs. (35) and (36), repeated here for convenience:

$$C\frac{d}{dt}v(t) = F(v(t)) - u(t) + \sum_{i=1}^{L} g_i(t)h_i(v(t))(E_i - v(t)) + I_{ext}(t) \qquad (89)$$

$$\frac{d}{dt}u(t) = abv(t) - au(t) - abv_r \qquad (90)$$

Now, however, the functional in Eq. (38) is modified as follows:

$$\Gamma(v,t) = \Gamma(v) \equiv \frac{1}{C} F(v(t)) \qquad (91)$$

and the system of equations is reformulated as $$\frac{d}{dt}v(t) = \Gamma(v) + a_{12}u(t) + \frac{1}{C}\left\{\sum_{i=1}^{L} g_i(t)h_i(v(t))(E_i - v(t)) + I_{ext}(t)\right\} \qquad (92)$$

$$\frac{d}{dt}u(t) = a_{21}v(t) + a_{22}u(t) + b_2 \qquad (93)$$

The system matrix $A_n$ now simplifies to $$A_n \equiv \begin{bmatrix} a_{11}[v_n] & a_{12} \\ a_{21} & a_{22} \end{bmatrix} \qquad (94)$$

with the vector $b(v_n,t)$ is now defined as $$b(v_n,t) = \begin{bmatrix} b_1[v_n,t] \\ b_2 \end{bmatrix} = \begin{bmatrix} \frac{1}{C}\left\{\sum_{i=1}^{L} g_i(t)h_i(v_n)(E_i - v_n) + I_{ext}(t)\right\} \\ b_2 \end{bmatrix} \qquad (95)$$

With the above approximation, the system matrix (coefficient $a_{11}$) dependence on the conductance values is avoided, thus considerably reducing the dynamic range to be covered in computing the matrix exponential. The synaptic current may be treated as an external current by holding the membrane voltage to a constant value for the time period. In a fixed-time-step implementation, the solution would then be $$x(nT+T) = e^{A_nT}x(nT) + \int_{nT}^{nT+T} e^{A_n(nT+T-\tau)} b(v_n,\tau) d\tau \qquad (96)$$

The first component of the vector integral in Eq. (96) is $$\int_{nT}^{nT+T} e^{A_n(nT+T-\tau)} \frac{1}{C}\left\{\sum_{i=1}^{L} g_i(\tau)h_i(v_n)(E_i - v_n) + I_{ext}(\tau)\right\} d\tau \qquad (97)$$

which can be solved in most cases of interest. The best results for the above approximation have been obtained by using a backward rectangular rule, namely using the value $v_n=v(nT+T)$ in Eq. (97).

Example 3

Approximation with a Backward Rectangular Rule

To simplify the exposition and notations, this example assumes that the synaptic current does not contain voltage-dependent conductance channels (e.g., NMDA channels) and that there is no external current $I_{ext}(t)$. The derivation is obtained for fixed step sizes of length T. To begin, Eq. (68) may be simplified as follows:

$$x(nT+T) = e^{A_n T} x(nT) + q + \frac{1}{C} \int_0^T e^{A_n \tau} \sum_{i=1}^L g_i(nT+T-\tau)(E_i - v(nT+T)) d\tau \begin{bmatrix} 1 \\ 0 \end{bmatrix} \quad (98)$$

where the vector q contains constant terms, namely $$q = A_n^{-1}(e^{A_n T} - I)\begin{bmatrix} b_0 \\ b_2 \end{bmatrix} \quad (99)$$

For notational convenience, the following vector and matrix may also be defined:

$$b \equiv \begin{bmatrix} 1 \\ 0 \end{bmatrix} \quad B \equiv \begin{bmatrix} 1 & 0 \\ 0 & 0 \end{bmatrix} \quad (100)$$

such that Eq. (98) may be rewritten as $$x(nT+T) = e^{A_n T} x(nT) + \frac{1}{C} \int_0^T e^{A_n \tau} \sum_{i=1}^L g_i(nT+T-\tau) E_i d\tau b - \frac{1}{C} \int_0^T e^{A_n \tau} \sum_{i=1}^L g_i(nT+T-\tau) d\tau B \cdot x(nT+T) + q \quad (101)$$

Now, the solution is derived for $g_i(t)$ modeled as simple exponentials per Eq. (29). In this case, one has $$x(nT+T) = e^{A_n T} x(nT) + \frac{1}{C} \sum_{i=1}^L g_i(nT) E_i \int_0^T e^{A_n \tau} e^{-(T-\tau)/\tau_i} d\tau \cdot b - \frac{1}{C} \sum_{i=1}^L g_i(nT) \int_0^T e^{A_n \tau} e^{-(T-\tau)/\tau_i} d\tau B \cdot x(nT+T) + q \quad (102)$$

The integrals can be readily solved, and if one further defines $$H_i \equiv \int_0^T e^{A \cdot \sigma} e^{\frac{\sigma - T}{\tau_i}} d\sigma = \begin{bmatrix} h_{11}^i & h_{12}^i \\ h_{21}^i & h_{22}^i \end{bmatrix}, \quad (103)$$

$$h_i \equiv H_i \cdot b = \begin{bmatrix} h_{11}^i \\ h_{21}^i \end{bmatrix}$$

then Eq. (102) may be written as $$x(nT+T) = \quad (104)$$
$$e^{A \cdot T} x(nT) + \sum_i \frac{E_i g_i(nT)}{C} \cdot h_i - \sum_i \frac{g_i(nT)}{C} \cdot H_i \cdot B \cdot x(nT+T) + q$$

Collecting terms containing the state at time nT+T on the left-hand side leads to $$\left[ I + \sum_i \frac{g_i(nT)}{C} \cdot H_i \cdot B \right] \cdot x(nT+T) = \quad (105)$$
$$e^{A \cdot T} x(nT) + \sum_i \frac{E_i g_i(nT)}{C} \cdot h_i + q$$

and finally $$\cdot x(nT+T) = \quad (106)$$
$$\left[ I + \sum_i \frac{g_i(nT)}{C} \cdot H_i \cdot B \right]^{-1} \cdot \left\{ e^{A \cdot T} x(nT) + \sum_i \frac{E_i g_i(nT)}{C} \cdot h_i + q \right\}$$

Notice that the matrix to be inverted is $$\left[ I + \sum_i \frac{g_i(nT)}{C} \cdot H_i \cdot B \right] = \begin{bmatrix} 1 & 0 \\ 0 & 1 \end{bmatrix} + \sum_i \frac{g_i(nT)}{C} \cdot \begin{bmatrix} h_{11}^i & 0 \\ h_{21}^i & 0 \end{bmatrix} = \quad (107)$$
$$\begin{bmatrix} 1 + \sum_i h_{11}^i \frac{g_i(nT)}{C} & 0 \\ \sum_i h_{21}^i \frac{g_i(nT)}{C} & 1 \end{bmatrix}$$

and that its inverse is $$\left[ I + \sum_i \frac{g_i(nT)}{C} \cdot H_i \cdot B \right]^{-1} = \frac{1}{\Delta} \begin{bmatrix} 1 & 0 \\ -\sum_i h_{21}^i \frac{g_i(nT)}{C} & \Delta \end{bmatrix}, \quad (108)$$

where $\Delta = 1 + \sum_i h_{11}^i \frac{g_i(nT)}{C}$

The computation of the state update may proceed as follows (where $e^{A \cdot T} \equiv G$):

I. Pre-calculate with the desired quantization and store all coefficients (G, $h_i$, and q).
II. For each channel, calculate $h_{11}{}^i g_i(nT)/C$ and $h_{21}{}^i g_i(nT)/C$.
III. Calculate the sums and scaled-by-$E_i$ sums $$\sum_i \frac{E_i h_{11}^i g_i(nT)}{C}, \sum_i \frac{h_{11}^i g_i(nT)}{C}, \sum_i \frac{E_i h_{21}^i g_i(nT)}{C}, \sum_i \frac{h_{21}^i g_i(nT)}{C}$$

IV. Evaluate the right-hand side of Eq. (105) and store in auxiliary variables, i.e., $$\begin{bmatrix} g_{11} & g_{12} \\ g_{21} & g_{22} \end{bmatrix} \begin{bmatrix} v(nT) \\ u(nT) \end{bmatrix} + \begin{bmatrix} \sum_i \frac{E_i h_{11}^i g_i(nT)}{C} \\ \sum_i \frac{E_i h_{21}^i g_i(nT)}{C} \end{bmatrix} + \begin{bmatrix} q_1 \\ q_2 \end{bmatrix}$$

-continued $$auxv = g_{11}v(nT) + g_{12}u(nT) + \sum_i \frac{E_i h_{11}^i g_i(nT)}{C} + q_1$$

$$auxu = g_{21}v(nT) + g_{22}u(nT) + \sum_i \frac{E_i h_{21}^i g_i(nT)}{C} + q_2$$

V. Perform the multiplication by the inverse matrix:

$$v(nT+T) = \frac{auxv}{\Delta} = \frac{auxv}{1 + \sum_i \frac{h_{11}^i g_i(nT)}{C}}$$

$$u(nT+T) =$$

$$-\frac{auxv}{\Delta} \sum_i \frac{h_{21}^i g_i(nT)}{C} + auxu = -v(nT+T) \sum_i \frac{h_{21}^i g_i(nT)}{C} + auxu$$

Note that for the NMDA case with a double exponential, each exponential may most likely be dealt with individually. This leads to pre-calculating and storing two vectors, one for the decaying exponential term and one for the rising exponential term.

Figure 21:
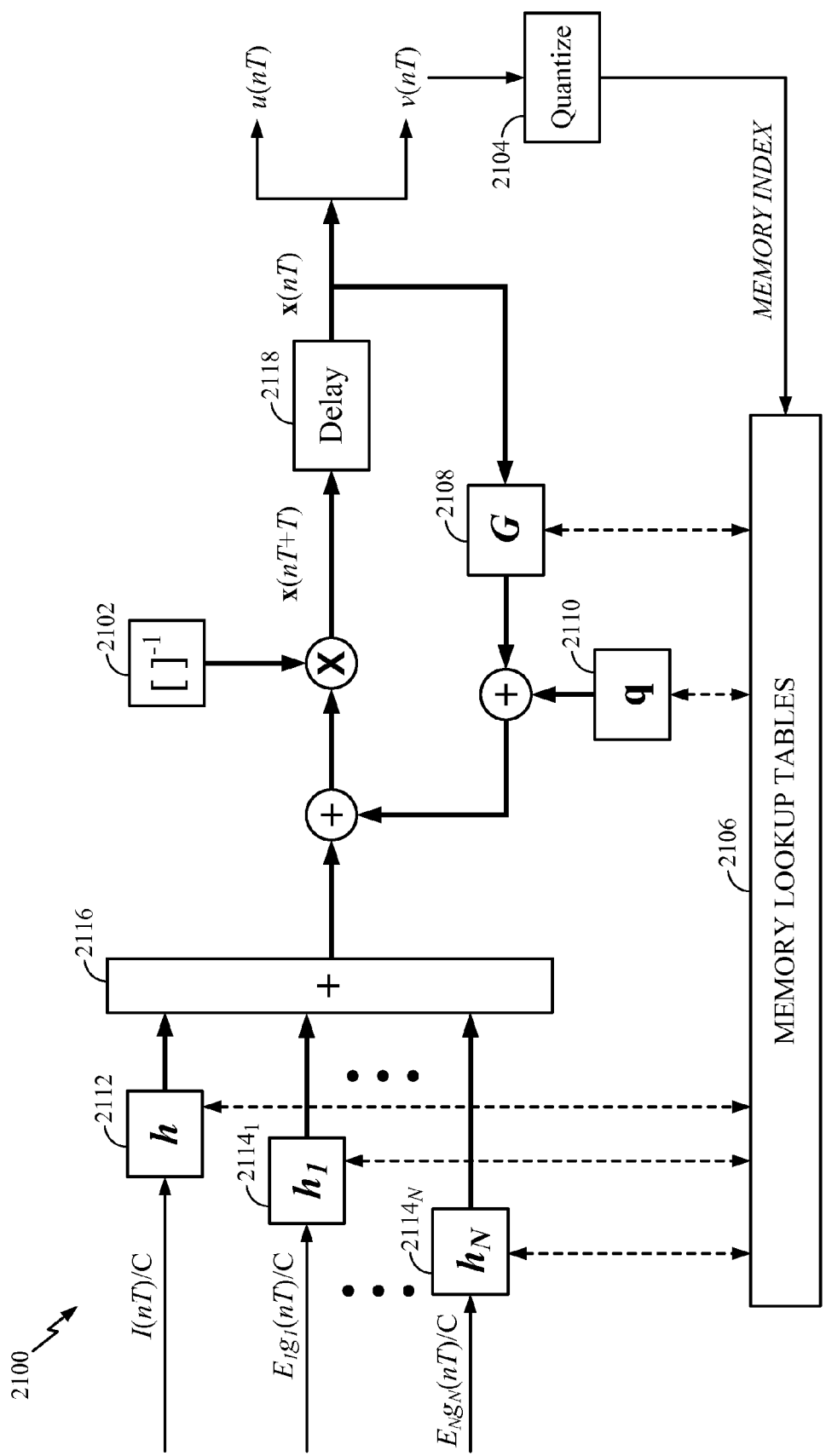
FIG. 21 is a block diagram of an example implementation of piecewise linear neuron modeling in which parameters used to update states of an artificial neuron are fetched from memory according to the quantization of the current state, in accordance with certain aspects of the present disclosure.

FIG. 21 is a block diagram 2100 illustrating the realization of Eq. (106). For simplicity, the matrix inversion block 2102 representing the first portion of Eq. (106) is not expanded. From the current state vector x(nT), the membrane potential v(nT) from the state vector is quantized in the quantization block 2104 to determine the memory index. The memory index is used to select the predetermined parameters (e.g., coefficients) for the piecewise linear approximation of the neuron model corresponding to the quantization interval of the membrane potential and stored in the memory lookup table(s) 2106. Based on the memory index, the parameters associated with the quantization interval are loaded, including the coefficients for the exponential matrix G 2108 and the defined vector q 2110 from Eq. (99) above. The parameters also include the coefficients for input current vector h 2112 and N synaptic current input vectors $h_i$ 2114. Summation block 2116 sums the input current I(nT)/C applied to the vector h 2112 and conductance values scaled by the reverse potentials $E_i g_i$(nT)/C applied to the N synaptic current input vectors $h_i$ 2114. The result is processed according to Eq. (106) with the matrix inversion block 2102 to generate the updated state vector x(nT+T). A delay block 2118 may be added so that the states are updated at each step size T in time, rather than continuously.

Other approximations to the integrals in Eq. (101) could be used. For example, rather than calculating the exact values and storing them in the $h_i$ vectors, a trapezoidal rule applied to g(t) can be used, thus avoiding storage of the $h_i$ vectors and further reducing the memory demands at the expense of a slightly worse approximation.

Summary

In the subsections above, a general approach to piecewise linearization of neuron models was described. FIG. 7 summarizes the various steps and linearization methods. Starting with a nonlinear time varying system at 702, piecewise linearization may be performed over the interval $T_n \le t \le T_{n+1}$ at 704 to generate a piecewise linear time-varying system in terms of the matrix A($v_n$,t) at 706. If constant coefficients (i.e., a piecewise constant function) are used for each interval $T_n \le t \le T_{n+1}$ at 708, then a piecewise LTI system is formed at 710 in terms of the matrix A($v_n$,$T_n$). If this linearization is performed independent of the time interval at 712, then a piecewise LTI system is created at 714 in terms of the matrix A($v_n$).

Example State-Space Region-Dependent Linear Neuron Modeling

Certain aspects of the present disclosure described above mainly cover the partitioning of a two-dimensional state-space limited to one of the state variables (e.g., the membrane potential v). As described above, the (v,u) state-space is partitioned into vertical blocks using a single state, and each block, representing a voltage interval, is associated with a distinct set of linear differential equations.

Certain aspects of the present disclosure as described below extend this concept. The state space may be partitioned into different regions (not limited to vertical blocks), where each region is associated with a distinct set of linear differential equations. The regions may be non-overlapping. The description below is primarily focused on the two-state (or, equivalently, two-dimensional) model with the understanding that the two-state model may be readily extended to three or more states where the partitions may be volumes and multi-dimensional regions, respectively.

Review of the Piecewise Linear Formulation as a Function of v

Figure 8:
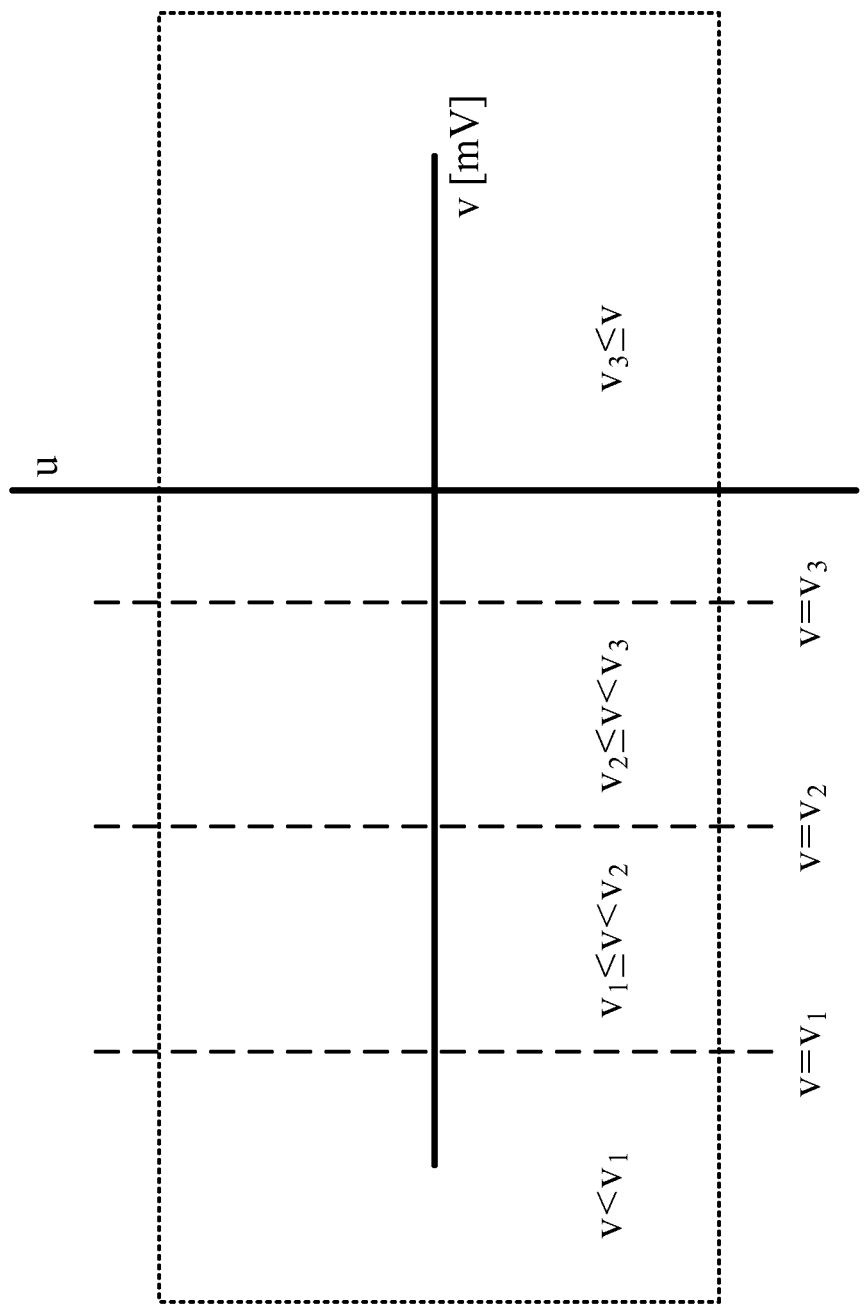
FIG. 8 illustrates an example of piecewise linear neuron modeling with partitioning in terms of a single dimension, in accordance with certain aspects of the present disclosure.

The two-dimensional piecewise linear differential equations may be expressed as a set of K pairs of differential equations where the $n^{th}$ pair is defined by $$C\frac{d}{dt}v = m_k v + d_k - u + I, \; v_k \le v < v_{k+1} \qquad (109)$$

$$\frac{d}{dt}u = abv - au - abv_r \qquad (110)$$

where $k \in [1,K]$ and $F(v) = m_k v + d_k$. In this approach, the voltage space is partitioned into K distinct regions, and the $k^{th}$ region is associated with the $k^{th}$ pair of differential equations. The union of the K regions covers the space of (v,u) values. FIG. 8 illustrates the partitioning given K=4, where the voltage space is divided into four regions: $v < v_1$, $v_1 \le v < v_2$, $v_2 \le v < v_3$, and $v_3 \le v$. For K=2, this reduces to the Hunzinger Cold neuron model (with the closed and open intervals switched such that $v_k < v \le v_{k+1}$).

Generalized Formulation

The basic idea is to extend the piecewise linear concept beyond regions defined solely in terms of v (i.e., allow Eq. (110) to vary with each interval, as well as Eq. (109)). This can be accomplished by defining K two-dimensional regions $\Omega_k$ in the (v,u) space where $k \in [1,K]$ and where the union of the K regions covers the entire space of (v,u) values. Furthermore, the parameters a and b, in addition to $m_k$ and $d_k$, are allowed to be distinct for each region such that these parameters become a function of k. The parameter C may also be made distinct per region as $C_k$, but is left as fixed per region henceforth, with the understanding that C can be made region-specific. These extensions may not necessarily have biological equivalents. However, from an engineering and computational perspective, such extensions enable the design of richer neuron models and a simpler platform to develop neuron models.

The two aforementioned extensions yield:

$$C\frac{d}{dt}v = m_k v + d_k - u + I, (v, u) \in \Omega_k \qquad (111)$$

$$\frac{d}{dt}u = a_k b_k v - a_k u - a_k b_k v_r, (v, u) \in \Omega_k \qquad (112)$$

The above expressions may be expressed more compactly, using the state-space notation described above, as $$\dot{x} = A_k x + b\left(\frac{I}{C}\right) + p_k, x \in \Omega_k \qquad (113)$$

where $$x \equiv \begin{bmatrix} v \\ u \end{bmatrix} \qquad (114)$$

$$A_k \equiv \begin{bmatrix} \frac{m_k}{C} & -\frac{1}{C} \\ a_k b_k & -a_k \end{bmatrix} \qquad (115)$$

$$p_k \equiv \begin{bmatrix} d_k/C \\ -a_k b_k v_r \end{bmatrix} \qquad (116)$$

$$b \equiv \begin{bmatrix} 1 \\ 0 \end{bmatrix} \qquad (117)$$

Next, the M-dimensional state-space region-dependent case and the state-space solution are described.

M-Dimensional State-Space Case

In the M-dimensional case where there are M state variables, the state-space equations become $$\dot{x} = A_k x + b\left(\frac{I}{C}\right) + p_k, x \in \Omega_k \qquad (118)$$

where $$x \equiv \begin{bmatrix} x_1 \\ \vdots \\ x_M \end{bmatrix} \qquad (119)$$

$$A_k \equiv \begin{bmatrix} a_{11}^{(k)} & \cdots & a_{1M}^{(k)} \\ \vdots & \ddots & \vdots \\ a_{M1}^{(k)} & \cdots & a_{MM}^{(k)} \end{bmatrix} \qquad (120)$$

$$p_k \equiv \begin{bmatrix} d_1^{(k)} \\ \vdots \\ d_M^{(k)} \end{bmatrix} \qquad (121)$$

$$b \equiv \begin{bmatrix} 1 \\ 0 \\ \vdots \\ 0 \end{bmatrix} \qquad (122)$$

Region-Dependent State-Space Solutions

The state-space solutions of Eq. (113) in the continuous-time domain and discrete-time domain are presented. Their derivations follow naturally using the same approach as that described above. The continuous-time solution may be expressed as $$x(t) = e^{A_k t}x(0) + \int_0^t e^{A_k(t-\tau)} \cdot b \cdot I(\tau)/C d\tau + q_k, x(0) \in \Omega_k \qquad (123)$$

where x(0) represents the initial value of x(t), $$q_k = A_k^{-1}(e^{A_k t} - I) \cdot p_k \qquad (124)$$

and $e^x$ represents the matrix exponential of a matrix X.

The corresponding discrete-time solution, with a sampling period of T, may be expressed as:

$$x(nT+T) = e^{A_k t} \cdot x(nT) + h_k \cdot I(nT)/C + q_k, x(nT) \in \Omega_k \qquad (125)$$

where $$h_k \equiv \int_0^T e^{A_k \tau}d\tau b \qquad (126a)$$

$$= A_k^{-1}(e^{A_k t} - I) \qquad (126b)$$

The present state-space vector x(nT) identifies the region $\Omega_k$ and which set of $\{e^{A_k t}, h_k, q_k\}$ matrix and vectors to use to compute x(nT+T) according to Eq. (120).

Furthermore, the same solutions for non-synaptic and synaptic current types described above readily apply. This includes the linear-time varying (LTV) solutions. This would involve replacing the voltage-dependent regions (vertical partitions) with these more general state-space regions.

ILLUSTRATIVE EXAMPLES

Figure 9:
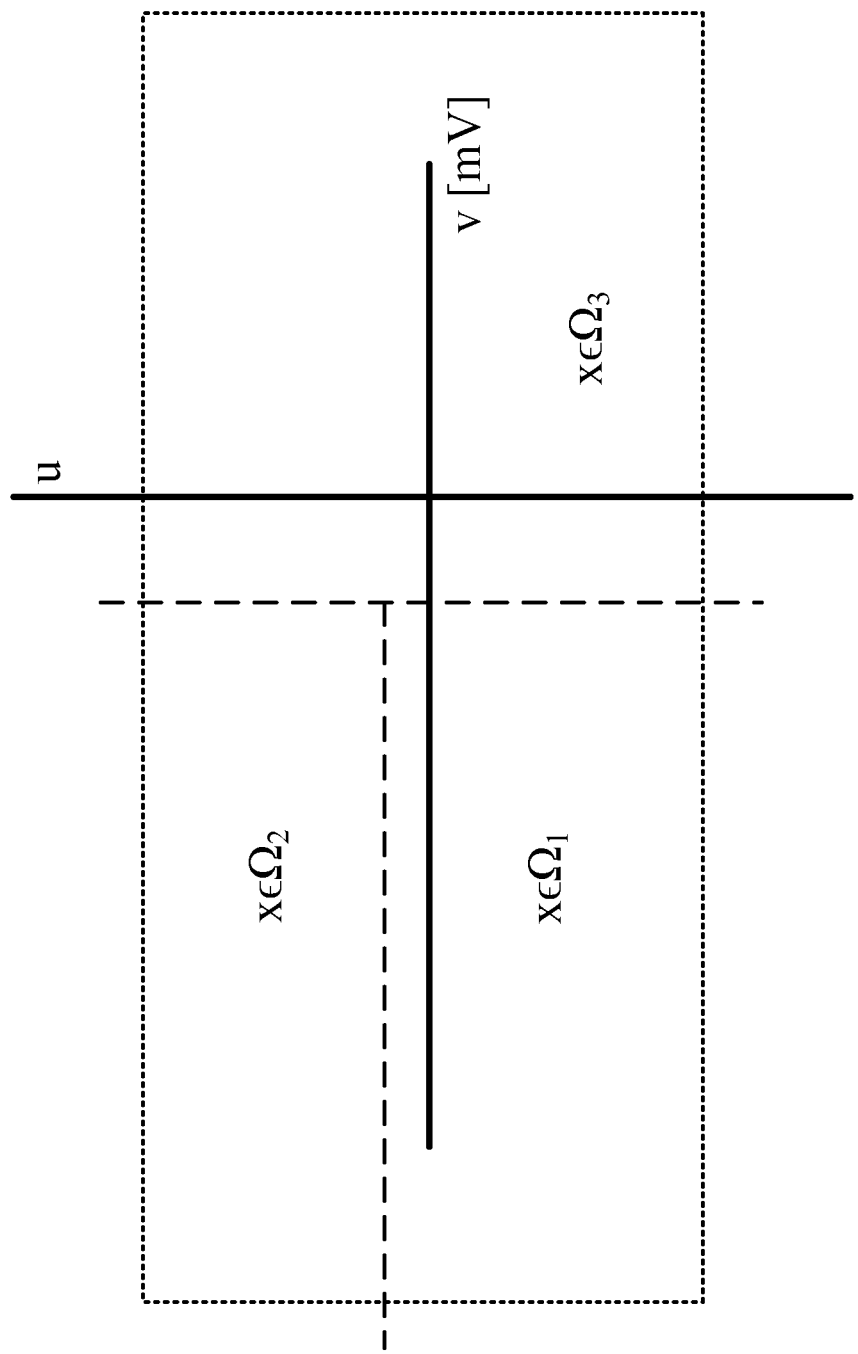
FIG. 9 illustrates an example of generalized linear neuron modeling with three rectangular regions defined by two dimensions, in accordance with certain aspects of the present disclosure.

FIG. 9 illustrates an example with three regions (i.e., $\Omega_k$ where k∈[1,3]). All three regions in FIG. 9 are rectangular regions.

Figure 10:
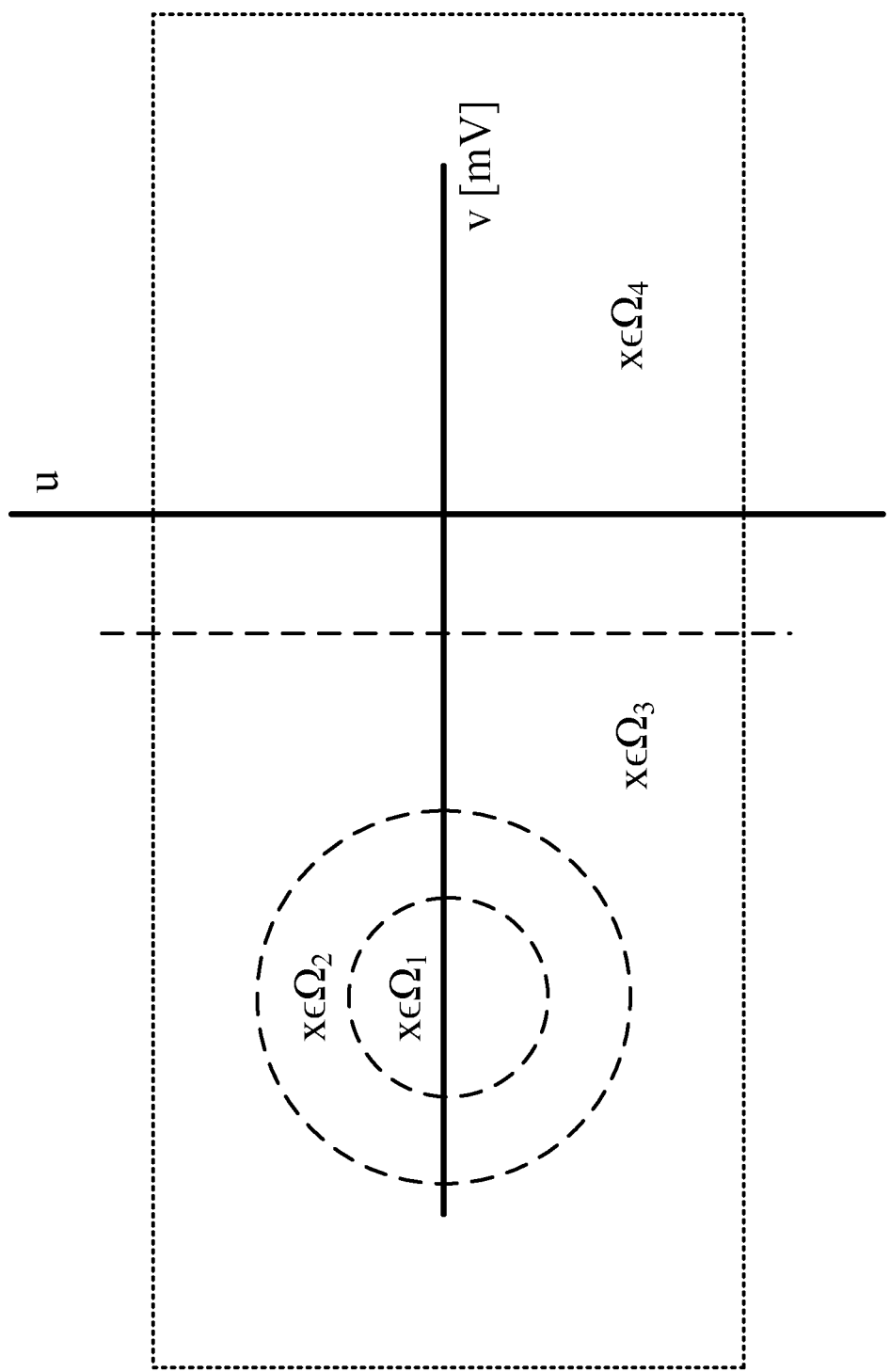
FIG. 10 illustrates an example of generalized linear neuron modeling with four regions defined by two dimensions, which may be used to exhibit decaying, sustained, and growing subthreshold oscillation behavior, in accordance with certain aspects of the present disclosure.

FIG. 10 illustrates an example with four regions illustrating how the regions need not be rectangular. This particular design may be used to create a subthreshold oscillation neuron where $\Omega_1$, $\Omega_2$, $\Omega_3$, and $\Omega_4$ represent regions where (v,u), respectively, spirals outward with a growing radius, spirals in a circular fashion (with no decay or no growth), spirals inward with a decaying radius, and tends to spike (equivalent to the ALIF region of the Hunzinger Cold model). This design is described in more detail below.

Figure 11:
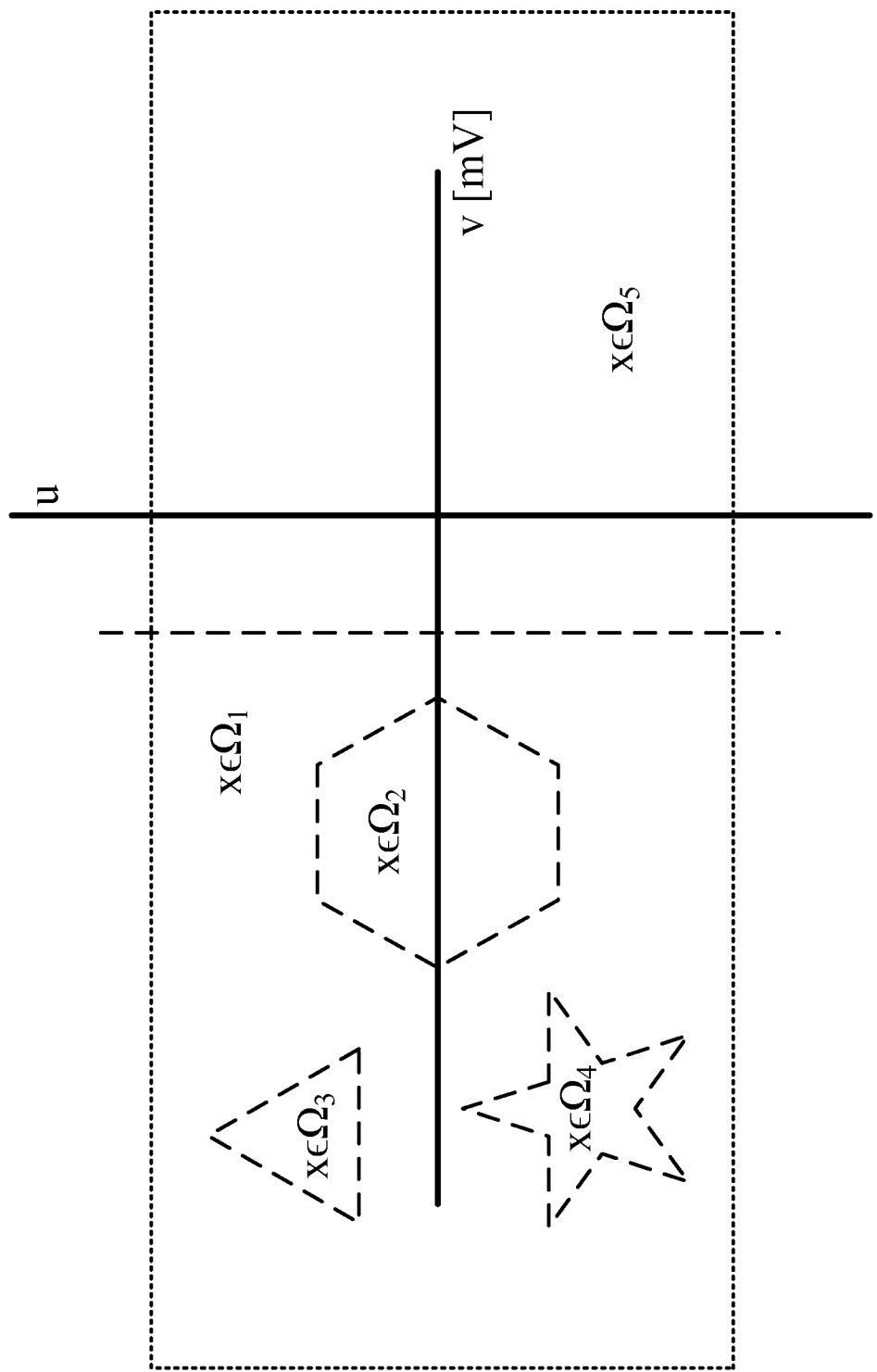
FIG. 11 illustrates an example of generalized linear neuron modeling with five regions having varying shapes, in accordance with certain aspects of the present disclosure.

FIG. 11 illustrates a more academic example with five regions to illustrate that a region with any shape (e.g., a hexagonal, triangular, or star-shaped region) could be created in theory.

Realization of the State-Space Region-Dependent Linear Neuron Modeling

Presently, the regions are defined by $$\Omega_k = \{(v,u) | v_k \leq v < v_{k+1}\}$$

where $v_k$ and $v_{k+1}$ represent the left and right boundaries for voltage. So, at each time step, the index k is determined by taking the present state (v(nT),u(nT)) and checking it against each of the K regions: $\Omega_k$, k∈[1,K]. The index k, represented by $k_F$, may be computed directly via a function of only v as well as the quantization interval, the minimum possible voltage, and number of intervals:

$$k = \left\lfloor \frac{v(nT) - v_{min,F}}{\Delta v_F} \right\rfloor + 1$$

For certain aspects, the regions (or at least a portion thereof) may be slightly overlapping. In this case, hysteresis may be used in identifying which of the K regions ($\Omega_k$, k∈[1, K]) contains the present state (v(nT), u(nT)).

Two examples of generalized regions are provided below. Other regions may also be developed.

For Rectangular Regions Dependent on Both v and u

For generalized rectangular regions, the $k^{th}$ region may be defined by $$\Omega_k = \{(v,u) | v_k \leq v < v_{k+1}, u_k \leq u < u_{k+1}\}$$

where $v_k$ and $v_{k+1}$ represent the left and right boundaries for voltage, respectively, and where $u_k$ and $u_{k+1}$ represent the lower and upper boundaries for the recovery variable, respectively. So, at each time-step, the index k may be determined by identifying which of the K regions ($\Omega_k$,k∈[1,K]) contains the present state (v(nT),u(nT)).

For Elliptical Regions

For ease of explanation, assume only elliptical regions each centered about the rest state ($v_r$,0). Then the $k^{th}$ region may be defined by $$\Omega_k = \{(v,u) | \rho_k \leq \rho(v,u) < \rho_{k+1}\}$$

where $\rho_k$ is the "radial distance" to the inner elliptical boundary along the v-axis, $\rho_k$ is the "radial distance" to the outer elliptical boundary along the v-axis, the "radial distance" may be defined as $$\rho(v,u) = \sqrt{(v-v_r)^2 + (u/\beta)^2}$$

and β is a parameter associated with the ellipse (β=1 leads to concentric regions). As before, at each time-step, the index k is determined by taking the present state (v(nT), u(nT)) and checking it against each of the K regions: $\Omega_k$, k∈[1,K].

Advantages of State-Space Region-Dependent Linear Neuron Modeling

Such generalized partitioning of the state-space for neuron modeling can help support the synthesis of neurons and do so in a systematic manner. Two examples of this are in implementing: (1) onset detection and event counting and (2) subthreshold oscillation behavior, the latter of which is described in the next section.

An artificial neuron based on the Hunzinger Cold model (which has two partitions) may be developed for onset detection and event counting. This artificial neuron, initially at rest, is designed to fire immediately if it receives a spike for onset detection. Thereafter, the neuron is designed to start counting incoming spikes and fire after a certain number of spikes. This continues to repeat itself as spikes arrive. A potential drawback of this design occurs after there are no more spike arrivals since the neuron can take about 500 ms before reaching the equilibrium rest state. This may be too long a time before the neuron can perform onset detection. Part of the constraint in this design is how shortening the time to the rest state impacts the spike-counting ability by making it behave more as a LIF neuron.

According to certain aspects of the present disclosure, the constraint can be removed by separating the two behaviors via partitioning, analogous to how the LIF and ALIF behavior of the Izhikevich neuron model may be broken by partitioning the two regions with the Hunzinger Cold model. The time to reset the neuron to perform onset detection may be reduced by noticing how the u state variable behaves above and below a threshold of roughly 0.3 in the LIF region. Below that value, it takes a long time for the system to reach the rest state. This can be expedited by partitioning the state-space in terms of u as well as v as illustrated in the three-region state-space of FIG. 9 to realize an improved onset and event counting neuron. In the LIF region where v<$v_r$, the artificial neuron now behaves as an integrate and fire (IF) neuron for event counting if u>$u_0$ (i.e., region $\Omega_2$) and a LIF neuron which goes to $v_r$, otherwise (i.e., region $\Omega_1$). Once the state enters region $\Omega_1$, the system may be designed to move to the rest state as quickly as desired with shorter time constants. By partitioning the LIF region as a function of u into the two desired regions ($\Omega_2$ for IF and $\Omega_1$ for LIF) with two pairs of differential equations per region, the large delay may be eliminated.

Figure 12A:
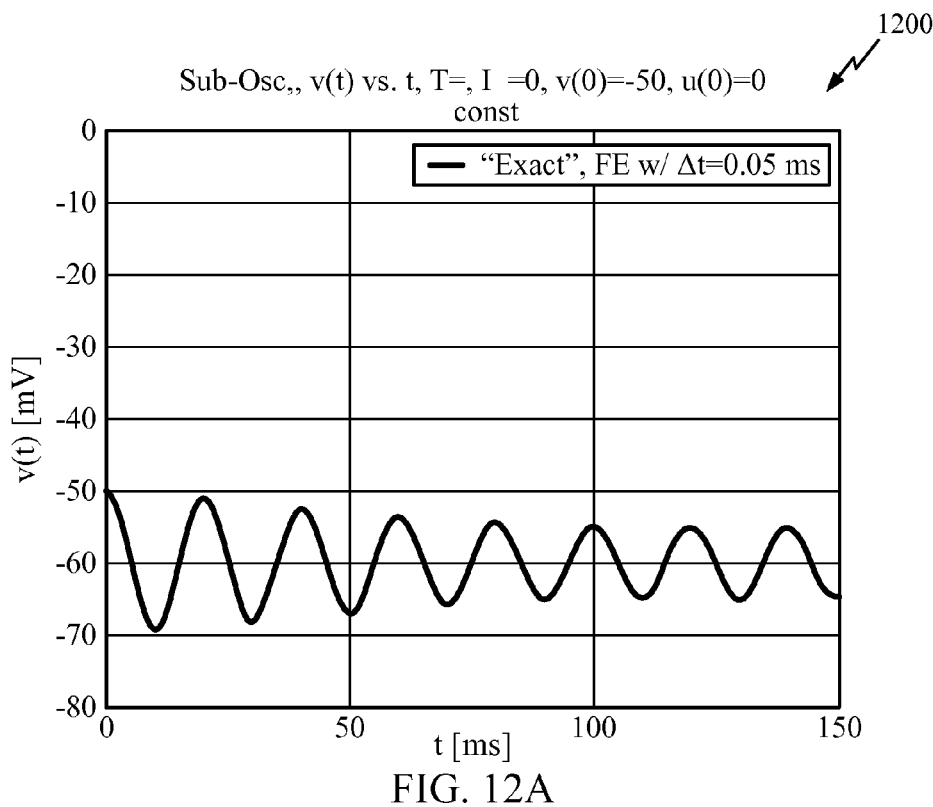
FIGS. 12A-C illustrate example plots of decaying, sustained, and growing subthreshold oscillations, respectively, in accordance with certain aspects of the present disclosure.
Figure 12B:
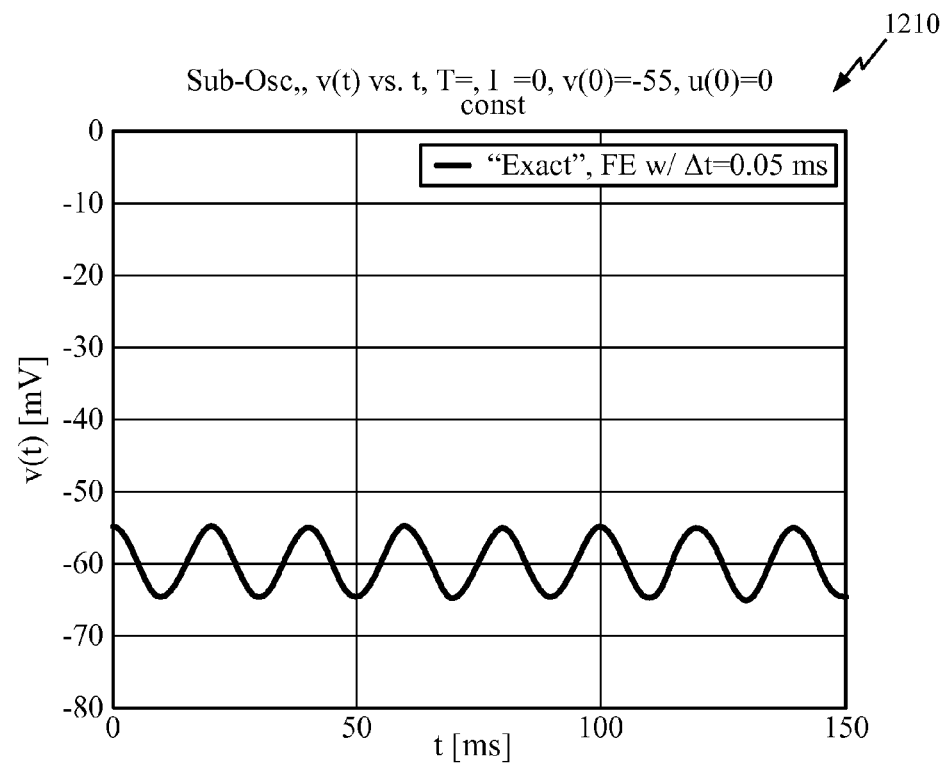
Figure 12C:
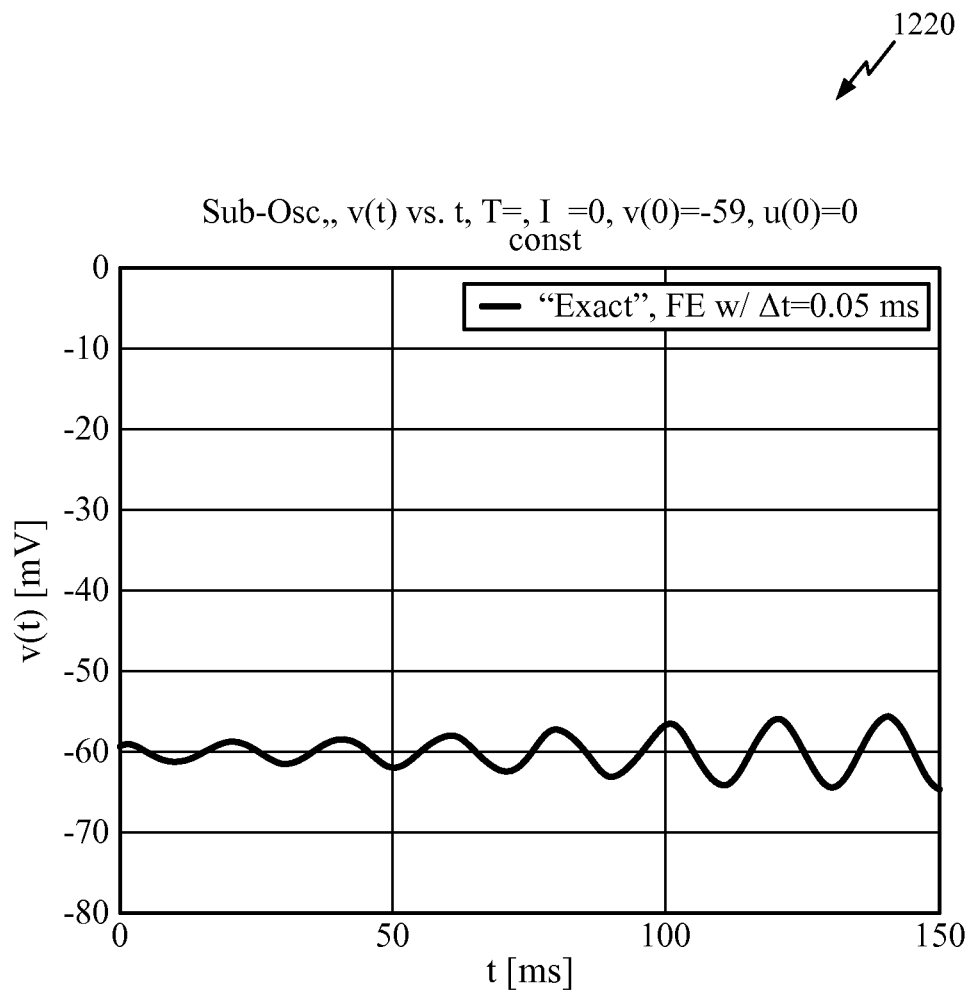

Example Subthreshold Oscillation Neuron Design Based on State-Space Region-Dependent Linear Neuron Models Subthreshold oscillations may be used in an artificial nervous system to increase the likelihood of spiking in the upswing of the membrane potential from the resting potential (i.e., "priming" the artificial neuron to spike) and to decrease the likelihood in the downswing. The previous section describes an extension to the piecewise linear neuron modeling by allowing partitioning of a two-dimensional (or multi-dimensional) state-space based not only on one of the state variables (e.g., the voltage), but also a combination and regions (or functions) of state variables. This section addresses the shortcomings of existing subthreshold oscillation neuron designs. For example, existing neuron models can support the design of a subthreshold oscillation neuron exhibiting at most one of three oscillation types (e.g., decaying oscillations as illustrated in the graph 1200 of FIG. 12A, sustained oscillations as illustrated in the graph 1210 of FIG. 12B, or growing oscillations as illustrated in the graph 1220 of FIG. 12C), but these models cannot enable the design of an artificial neuron exhibiting two or more of the three types. Moreover, existing neuron models cannot support the systematic design of subthreshold oscillation neurons with a particular oscillation frequency, a rate of decay for decaying oscillation, a rate of growth for growing oscillations, and/or a magnitude for sustained oscillations.

Accordingly, what is needed are artificial neurons with an improved neuron model capable of exhibiting all three types of oscillations and supporting the systematic realization of desired oscillation behaviors.

Comparison Between Subthreshold-Oscillation-Capable Neuron Models

There are four existing neuron models that can produce subthreshold oscillations: the Izhikevich (simple) model, the Adaptive Exponential (AdEx) neuron model (which is the linear-plus-exponential function of Brette and Gerstner described above), the quartic model, and the Hunzinger Cold model. These neuron models may characterized in four ways: (1) which of the three possible subthreshold oscillation behaviors (damped oscillation, sustained oscillation, or growing oscillations) they can produce; (2) how many of the three behaviors can be exhibited by a single neuron; (3) how easy it is to design a neuron with a desired oscillation frequency; and (4). how easy it is to fine tune the oscillation design (e.g., defining the magnitude of the sustained oscillation or defining multiple rates of decays or growths). The following table summarizes how each neuron model fares for the first measure (where these neuron models can possibly support from one to all of the three oscillation types):

| Neuron Model | Damped Oscillations | Sustained Oscillations | Growing Oscillations |
|---|---|---|---|
| Izhikevich model and AdEx model | Y | | |
| Quartic model | Y | Y | Y |
| Hunzinger Cold model | Y | Y | Y |
| State-space region-dependent model | Y | Y | Y |

The next table summarizes how each neuron model fares for the remaining characterization measures:

| Model | One type of oscillation | Two types of oscillation | Three types of oscillation | Systematic, simple design | Fine tuning capability |
|---|---|---|---|---|---|
| Izhikevich and AdEx models | Y | | | | |
| Quartic model | Y | | | | |
| Hunzinger Cold model | Y | | | Y | |
| State-space region-dependent model | Y | Y | Y | Y | Y |

Each neuron model (besides the state-space region-dependent approach described below) can reproduce a neuron capable of exhibiting only a single oscillation type. And only the Hunzinger Cold model, due to its linear design, is capable of offering a systematic way of designing a target. None of them (besides the state-space region-dependent approach described below), however, offers the capability of fine tuning.

Subthreshold Oscillation Based on State-Space Region-Dependent Linear Neuron Modeling Certain aspects of the present disclosure, as indicated in the tables above and in contrast with existing neuron models, can: (1) produce an artificial neuron that can exhibit in the subthreshold regime all or any subset of the three oscillation types and (2) be designed not only systematically like the Hunzinger Cold model, but can also support fine tuning of the design.

Design

Exhibition of all three oscillation types may be created by using the state-space region dependent approach described above. For example, a four-region, two-dimensional neuron model may be defined as illustrated in FIG. 10.

Each state-space region $\Omega_k$ is associated with a set of linear differential equations such that $$C \frac{d}{dt} v = m_k v + d_k - u + I, \quad (v, u) \in \Omega_k \quad (127)$$

$$\frac{d}{dt} u = a_k b_k v - a_k u - a_k b_k v_r, \quad (v, u) \in \Omega_k \quad (128)$$

or, in state-space vector notation, $$\dot{x} = A_k x + b\left(\frac{I}{C}\right) + p_k, \quad x \in \Omega_k \quad (129)$$

$$A_k \equiv \begin{bmatrix} \frac{m_k}{C} & -\frac{1}{C} \\ a_k b_k & -a_k \end{bmatrix} \quad (130)$$

$$p_k \equiv \begin{bmatrix} d_k/C \\ -a_k b_k v_r \end{bmatrix} \quad (131)$$

Regions $\Omega_1$ (appearing circular, but is generally elliptical), $\Omega_2$ (also generally elliptical), $\Omega_3$, and $\Omega_4$ may be designed to reproduce growing oscillations, sustained oscillations, decaying oscillations, and ALIF behavior, respectively.

According to certain aspects, the state-space may be defined by more than two dimensions. In this case, the following alternate forms may be used instead:

$$A_k \equiv \begin{bmatrix} a_{11}^{(k)} & \cdots & a_{1M}^{(k)} \\ \vdots & \ddots & \vdots \\ a_{M1}^{(k)} & \cdots & a_{MM}^{(k)} \end{bmatrix} \quad (132)$$

$$p_k \equiv \begin{bmatrix} d_1^{(k)} \\ \vdots \\ d_M^{(k)} \end{bmatrix} \quad (133)$$

If sustained oscillations are desired, some thickness may be warranted in case of time-stepped approaches to handle the scenario where v(nT+T) could inadvertently bypass the sustained oscillation region.

Reset Modification

As described above, the reset mechanism may involve resetting u to u+d, which amounts to incrementing u after a spike event or after a control signal is activated, for example. For certain aspects, to ensure that the u+d value is not so large that it can cause the neuron to immediately spike or enter sustained oscillation right from the start, it may be desirable to have the option of resetting u to a target constant (i.e., to something other than u+d). This way, the designer has control of where in the state-space the neuron resets.

Defining the State-Space Regions

In general, the (v,u) trace in sustained oscillations may take on the form of an ellipse whose major and minor axes may not be aligned with the v, u Cartesian axes (i.e., the ellipse may have a tilt). The solutions may take on the following form:

$$v(t) = A_c^{(v)} \cos(wt) + A_s^{(v)} \sin(wt) \quad (134a)$$

$$u(t) = A_c^{(u)} \cos(wt) + A_s^{(u)} \sin(wt) \quad (134b)$$

where the four coefficients are functions of the matrix elements in A (where the index k has been dropped) and the initial conditions: (v(0),u(0)).

For ease in exposition and design, the description here focuses on circular traces whose major and minor axes are equal. These call for the matrix elements to satisfy the following constraints:

$$a_{11} = a_{22} = \lambda_R = \frac{1}{\tau} \quad (135)$$

$$a_{12} = -a_{21} = \lambda_I = 2\pi f_c \quad (136)$$

where $\lambda_R$ and $\lambda_I$ represent the real and imaginary parts, respectively, of the complex eigenvalues: $\lambda_{1,2}=\lambda_R+\lambda_I$, $\tau$ represents the (decay or rise) time constant, $f_c$ represents the oscillation frequency, and the index k has been dropped. This results in circular regions and a straightforward form of the matrix:

$$A \equiv \begin{bmatrix} \frac{1}{\tau} & 2\pi f_c \\ -2\pi f_c & \frac{1}{\tau} \end{bmatrix} \qquad (137)$$

Using this simpler form with circular regions, the radius of the circle centered about the equilibrium point $(v_r, 0)$ is $$\rho(v,u) = \sqrt{(v-v_r)^2 + u^2} \qquad (138)$$

representing the distance from (v,u) to the equilibrium point. For example, $\rho(v_r+2\text{ mV}, 0)=2$. So, the $k^{th}$ region may be defined by $$\Omega_k = \{(v,u) | \rho_{k,in} < \rho(v,u) \le \rho_{k,out} \text{ and } v \le v_t\} \qquad (139)$$

where $\rho_{k,in}$ represents the radius of the inner circular boundary of $\Omega_k$ and $\rho_{k,out}$ represents the outer circular boundary of $\Omega_k$.

For the K=4 example in FIG. 10, the sustained oscillation region $\Omega_2$ would be defined by $$\Omega_2 = \{(v,u) | \rho_g < \rho(v,u) \le \rho_d \text{ and } v \le v_t\} \qquad (140)$$

where $\rho_g$ represents the radius of the circular boundary separating $\Omega_1$ and $\Omega_2$ and where $\rho_d$ represents that between $\Omega_2$ and $\Omega_3$.

For the growing oscillation region $\Omega_1$:

$$\Omega_1 = \{(v,u) | \rho(v,u) \le \rho_g \text{ and } v \le v_t\} \qquad (141)$$

For the decaying oscillation region $\Omega_3$ $$\Omega_3 = \{(v,u) | \rho_d < \rho(v,u) \text{ and } v \le v_t\} \qquad (142)$$

The ALIF region $\Omega_4$ in FIG. 10 is defined by $$\Omega_4 = \{(v,u) | v > v_t\} \qquad (143)$$

Additional Regions for Multi-Stage Decay and Growth Regions

Figure 13:
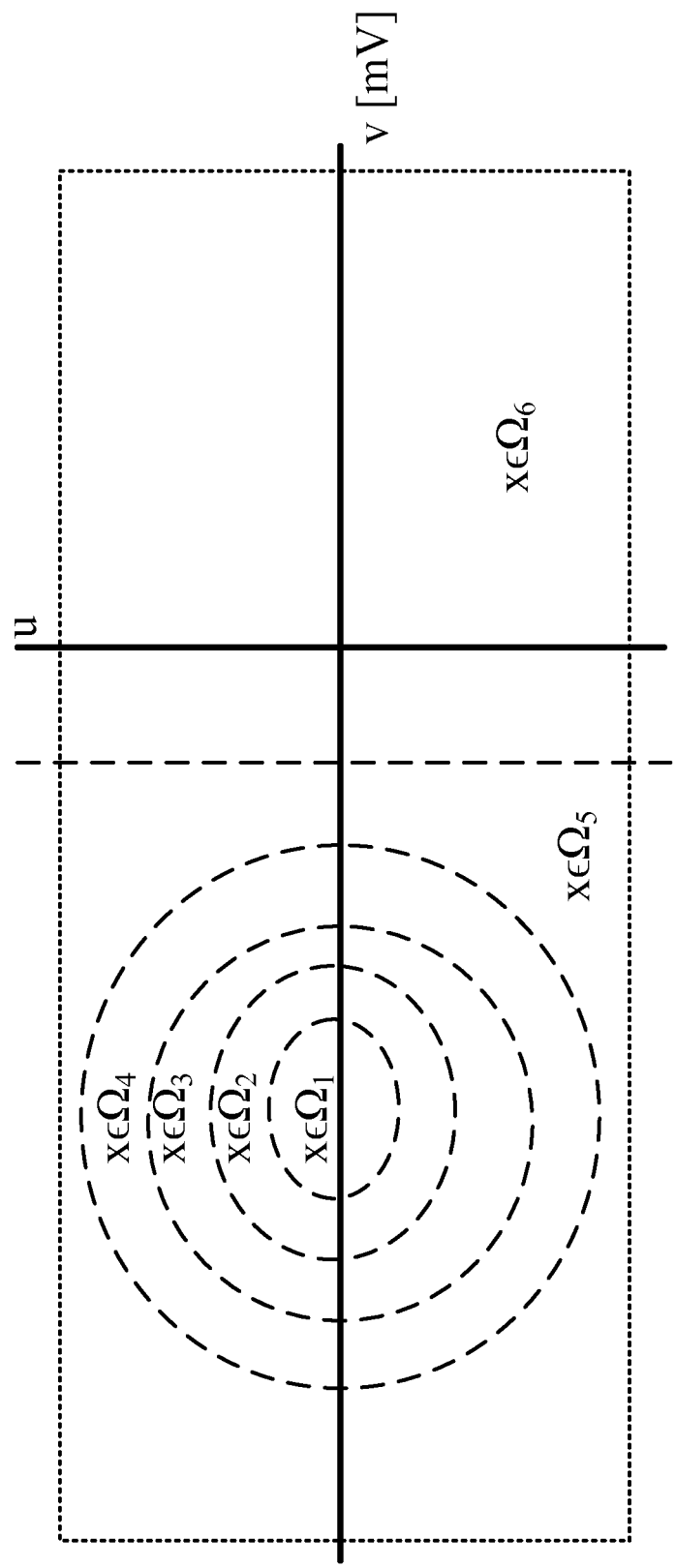
FIG. 13 illustrates an example of generalized linear neuron modeling with six regions defined by two dimensions, which may be used for multi-stage decay, multi-stage sustained, and/or multi-stage growth regions to support gradual decaying, multiple sustained oscillations, and/or gradual growing of subthreshold oscillations, in accordance with certain aspects of the present disclosure.

The above idea may be extended to support more gradual decaying or gradual growing of the oscillations. For example, to have varying rates of decaying orbits and varying rates of growing orbits, multiple rings may be used as shown in FIG. 13 with six regions. In this example, $\Omega_3$ may be considered as the sustained oscillation region. The region $\Omega_5$ may have a faster decaying orbit, and $\Omega_4$ may have a slower decaying orbit. This would allow for a graded and more gentle decay to the sustained oscillation region $\Omega_3$. Similarly, $\Omega_1$ may have a faster growing orbit, and $\Omega_2$ may have a slower growing orbit. This concept may be extended to more rings for even more gradual changes. Furthermore, multi-stage sustained oscillation regions may be used if different sustained oscillation parameters (e.g., different frequencies) are desired.

Example Operations for Implementing an Artificial Neuron

Figure 14:
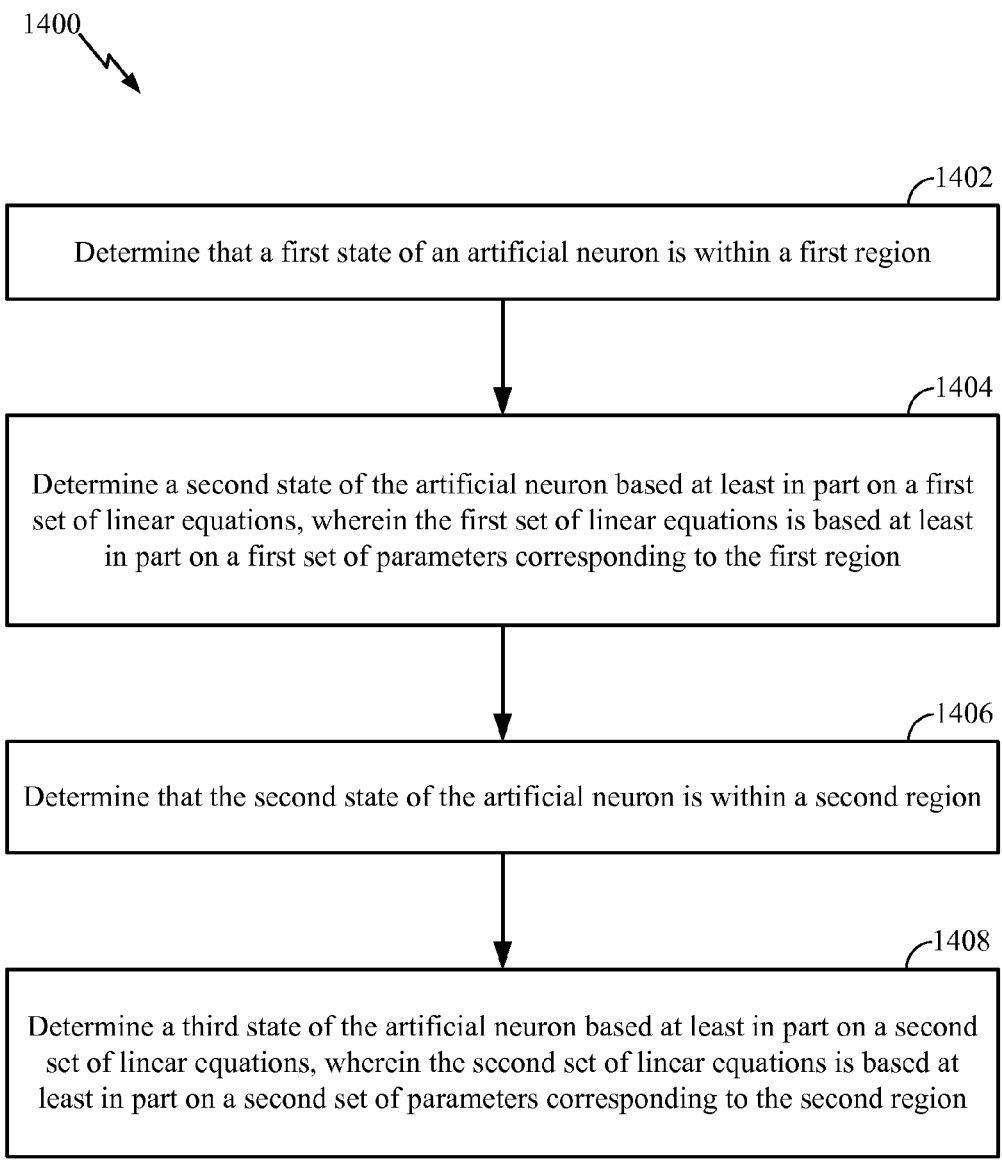
FIG. 14 is a flow diagram of example operations for operating an artificial neuron, in accordance with certain aspects of the present disclosure.

FIG. 14 is a flow diagram of example operations 1400 for updating a state of an artificial neuron in an artificial nervous system, in accordance with certain aspects of the present disclosure. The operations 1400 may be performed in hardware (e.g., by one or more neural processing units (e.g., artificial neurons), such as a neuromorphic processor), in software, or in firmware. The artificial nervous system may be modeled on any of various biological or imaginary nervous systems, such as a visual nervous system, an auditory nervous system, the hippocampus, etc.

The operations 1400 may begin, at 1402, by determining that a first state of the artificial neuron is within a first region. At 1404, a second state of the artificial neuron is determined based at least in part on a first set of linear dynamical equations, wherein the first set of linear dynamical equations is based, at least in part, on a first set of parameters (e.g., coefficients) corresponding to the first region. At 1406, it is determined that the second state of the artificial neuron is within a second region. At 1408, a third state of the artificial neuron is determined based, at least in part, on a second set of linear dynamical equations. The second set of linear dynamical equations may be based, at least in part, on a second set of parameters corresponding to the second region.

According to certain aspects, the first and second sets of linear equations include discrete time solutions of linear time-invariant (LTI) state-space equations. For other aspects, the discrete time solutions may be based at least in part on closed-form solutions for continuous-time state-space equations.

According to certain aspects, the operations 1400 further include fetching at least one of the first or second set of parameters from memory. As used herein, memory may refer to any of various suitable means for storing data, whether permanently or temporarily, locally or remotely to a processing unit, on-chip or off-chip, including random access memory (RAM), cache memory, registers, latches, flip-flops, and the like. Such fetching may include fetching the at least one of the first or second set of parameters from a memory local to the artificial neuron. For certain aspects, the operations 1400 further include calculating at least a portion of at least one of the first or second set of parameters. At least the portion of the at least one of the first or second set of parameters may be calculated using one or more values fetched from memory.

According to certain aspects, at least one of the first or second set of parameters may be obtained by approximating, with a piecewise linear function, at least a portion of a nonlinear function in a neuron model associated with the artificial neuron. For certain aspects, the nonlinear function includes a membrane potential (v) multiplied with a voltage-dependent conductance (g(v)). The voltage-dependent conductance may be approximated with a piecewise constant function. For other aspects, the nonlinear function includes a voltage-dependent function (F(v)), where v is a membrane potential of the artificial neuron. The piecewise linear function may have a slope (m) and an intercept (d) for each of the first and second regions. For certain aspects, the first region has a different width in the piecewise linear function than the second region. A width of the first or the second region in the piecewise linear function may be dependent on the nonlinear function. For certain aspects, the piecewise linear approximation is based at least in part on at least one of a Taylor expansion method, a first order linear interpolation method, an optimal linear interpolation method, or an average slope method.

According to certain aspects, at least one of the first or second set of parameters may be designed at least in part to achieve a particular behavior in the artificial neuron. For example, the first and/or second set of parameters may be generated (e.g., manually selected by a neuron model designer) to effectively create a particular function (e.g., a tunable curve), which approximates the desired behavior. In this manner, the artificial neuron may operate based on an entirely new neuron model or a modification to an existing neuron model.

The first, second, and third states of the artificial neuron may be defined by a membrane potential (v) and a recovery current (u). These are two examples of artificial neuron state variables. According to certain aspects, the operations 1400 may further include resetting at least one of the membrane potential or the recovery current of the artificial neuron based at least in part on a determination that a spike event has occurred or will occur. The membrane potential may be reset to a resting potential (v(t)→$v_r$). The recovery current may be reset to a sum of a present value of the recovery current and an offset (u(t)→u(t)+d).

According to certain aspects, at least one of the first set or second set of linear equations is based at least in part on a neuron model for the artificial neuron. For certain aspects, the neuron model is based at least in part on at least one of an Izhikevich simple model, an exponential-integrate-and-fire (EIF) model, a FitzHugh-Nagumo model, a quartic model, or an intrinsic conductance model (e.g., a neuron model expressed as a membrane potential v multiplied with a voltage-dependent conductance g(v)). For certain aspects, the neuron model comprises at least two dimensions (i.e., at least two state variables). The neuron model may be based at least in part on one or more first-order ordinary differential equations (ODEs), which may be linear.

According to certain aspects, a step size in time of the neuron model is based at least in part on a type of the artificial neuron being modeled. A step size in time of the neuron model may be non-uniform. For certain aspects, the step size in time of a particular time step is determined based at least in part on at least one of a current or past state of the artificial neuron or on a particular set of parameters (which may be associated with the current or past state). For certain aspects, a first step size in time between determining the first and second states is different than a second step size in time between determining the second and third states. According to certain aspects, determination of the second state of the artificial neuron at 1404 may be performed for a first time step, and determination of the third state of the artificial neuron at 1408 may be performed for a second time step subsequent to the first time step.

According to certain aspects, determining at least one of the second or third state of the artificial neuron is based at least in part on currents input to the artificial neuron. For certain aspects, the input currents comprise at least one of a synaptic current or a general, external current. The synaptic current may be based at least in part on a time-dependent conductance for each of one or more channels and a reversal potential for each of the one or more channels. For certain aspects, the synaptic current is based at least in part on a post-synaptic membrane potential of the artificial neuron for an N-methyl-D-aspartate (NMDA) channel. The time-dependent conductance may be modeled by an exponential function, an alpha function, or a difference-of-exponentials function.

For certain aspects, the first and second regions are the same region.

According to certain aspects, the operations 1400 may further include outputting an indication of at least one of the first state, the second state, or the third state to a display.

According to certain aspects, at least one of the first region or the second region is defined by two or more dimensions. The at least one of the first region or the second region is an M-dimensional subspace, where M≥2. The M-dimensional subspace may have any shape or be defined by any boundary (e.g., v>10 mV). For certain aspects, the two or more dimensions are two dimensions, and the M-dimensional subspace has a two-dimensional shape, such as an ellipse, a circle, a polygon, a rectangle, or a square. For other aspects, the two or more dimensions are three dimensions, and the M-dimensional subspace has a three-dimensional shape, such as a sphere, an ellipsoid, a polygonal prism, a rectangular prism, or a cube. For certain aspects, the first region is associated with a different set of linear equations than the second region. The first and second regions may be partially overlapping or non-overlapping regions. The first and second regions may have at least one of different shapes or different sizes. For certain aspects, the first region is associated with a first behavior of the artificial neuron, and the second region is associated with a second behavior of the artificial neuron, different from the first behavior. For certain aspects, the first and second regions have layered shapes, such as concentric rings, tubes, rectangular frames, and the like.

According to certain aspects, the two or more dimensions are composed of two dimensions defined by a membrane potential (v) and a recovery current (u). For certain aspects, the operations 1400 may further include resetting at least one of the membrane potential or the recovery current of the artificial neuron based at least in part on at least one of receipt of a control signal or a determination that a spike event has occurred or will occur. In this case, the membrane potential may be reset to a resting potential, and the recovery current may be reset to a constant.

According to certain aspects, at least a portion of the second region overlaps the first region. In this case, determining that the second state of the artificial neuron is within the second region at 1406 may be based at least in part on hysteresis.

According to certain aspects, the artificial neuron is configured for onset detection and event counting. In this case, the first region may be associated with an integrate-and-fire (IF) behavior for the event counting, and the second region may be associated with a leaky integrate-and-fire (LIF) behavior.

According to certain aspects, the artificial neuron is configured for subthreshold oscillation behavior. The subthreshold oscillation behavior may include at least one of a damped oscillation behavior, a sustained oscillation behavior, or a growing oscillation behavior. For certain aspects, the first region may be associated with the growing oscillation behavior, the second region may be associated with the sustained oscillation behavior, and a third region may be associated with the decaying oscillation behavior. Furthermore, a fourth region is associated with an ALIF behavior. For certain aspects, the first region may have an elliptical shape, whereas the second region may have a ring shape.

Example Common and Flexible Neural Architecture

Certain aspects of the present disclosure generally relate to developing a common and flexible architecture supporting dynamical neuron models. The design goals include low complexity, accurate modeling of the neuron dynamics, and the ability to implement any neuron model. With this flexible architecture, any of various suitable neuron models may be executed and substituted as desired. For example, the neuron model may include at least one of an Izhikevich simple model, an exponential-integrate-and-fire (EIF) model, a FitzHugh-Nagumo model, a quartic model, or a Hunzinger Cold model. Such neuron models may be implemented using the piecewise linear approximations and parameters (e.g., coefficients) associated therewith, as described above. Furthermore, this flexible architecture allows different artificial neurons in an artificial nervous system to operate with different neuron models simultaneously.

Figure 15A:
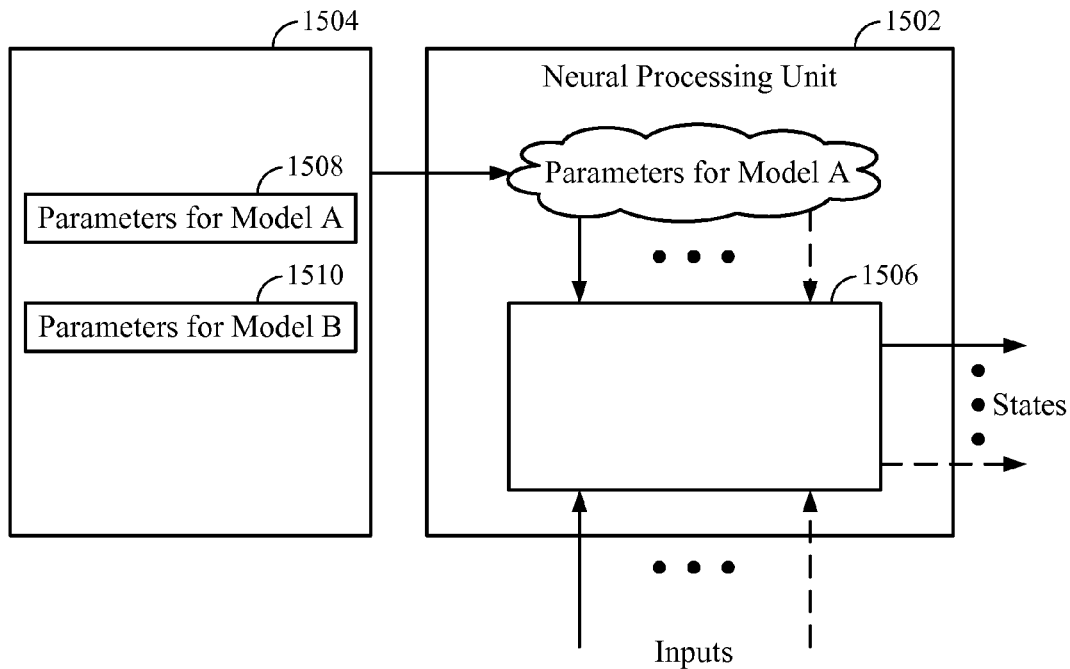
FIGS. 15A-D illustrate implementation of a common and flexible neural architecture for a single neural processing unit, where parameters for neuron models can be selected, loaded, accessed, added, deleted, and/or updated, in accordance with certain aspects of the present disclosure.

FIG. 15A illustrates implementation of such a common and flexible neural architecture for a single neural processing unit 1502, where parameters for neuron models can be selected, loaded, accessed, added, deleted, adjusted, and/or updated, in accordance with certain aspects of the present disclosure. The concepts described herein may easily be expanded to a system of neural processing units 1502 (e.g., an artificial nervous system), but for ease of description, only a single neural processing unit is shown in FIG. 15A. The neural processing unit 1502 may implement a state machine 1506 that receives one or more inputs and a set of parameters for a neuron model and outputs one or more state variables as shown. The state machine 1506 may implement any suitable processing algorithm for an artificial neuron.

The parameters for a given neuron model may be selected from a set of parameters 1504 for a plurality of neuron models. For certain aspects, for example, an operator may wish to use a certain neuron model in a given neural processing unit and select this model from a list of available neuron models. For other aspects, a certain neuron model may be selected by the system of neural processing units based on learning or training operations. The parameters for a given neuron model may be parameters based on the piecewise linear approximations described above. The set of parameters 1504 may be stored in a memory associated with and/or local to the neural processing unit 1502 for certain aspects. For other aspects, the set of parameters 1504 may be stored in a memory globally accessible by multiple neural processing units or a cache memory internal to the neural processing unit 1502. The parameters for neuron model A may be stored in a first memory location 1508 (e.g., an addressable memory block), while the parameters for neuron model B may be stored in a second memory location 1510.

In FIG. 15A, the parameters for neuron model A have been loaded into the neural processing unit 1502. As used herein, the term "loading" may be defined broadly and may include fetching the parameters for a given neuron model from a memory accessible by the neural processing unit (or by the system of neural processing units); storing the parameters in a memory local to the neural processing unit; or accessing, in a memory, one or more memory areas associated with (e.g., designated for) the neural processing unit. According to certain aspects, loading the parameters for a certain neuron model into a particular neural processing unit may occur in response to a configuration event. For example, the configuration event may include powering up the particular neural processing unit, powering up one or more regions of neural processing units (which may or may not include the particular processing unit), or powering up the entire system of neural processing units.

Figure 15B:
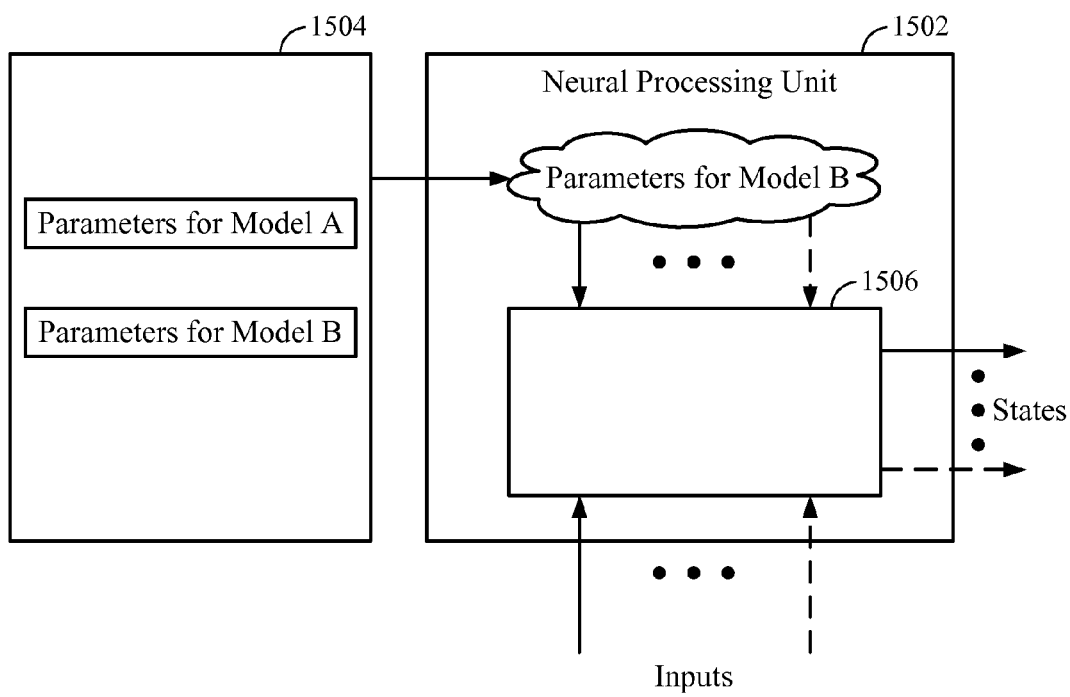

In FIG. 15B, the parameters for neuron model B have been loaded into the neural processing unit 1502. From then on, the state machine 1506 may operate based at least in part on these most recently loaded parameters. In this manner, the neural processing unit 1502 may function according to a different neuron model, simply by loading different parameters. Furthermore, the parameters for a particular neuron model may be updated or deleted at any time.

Figure 15C:
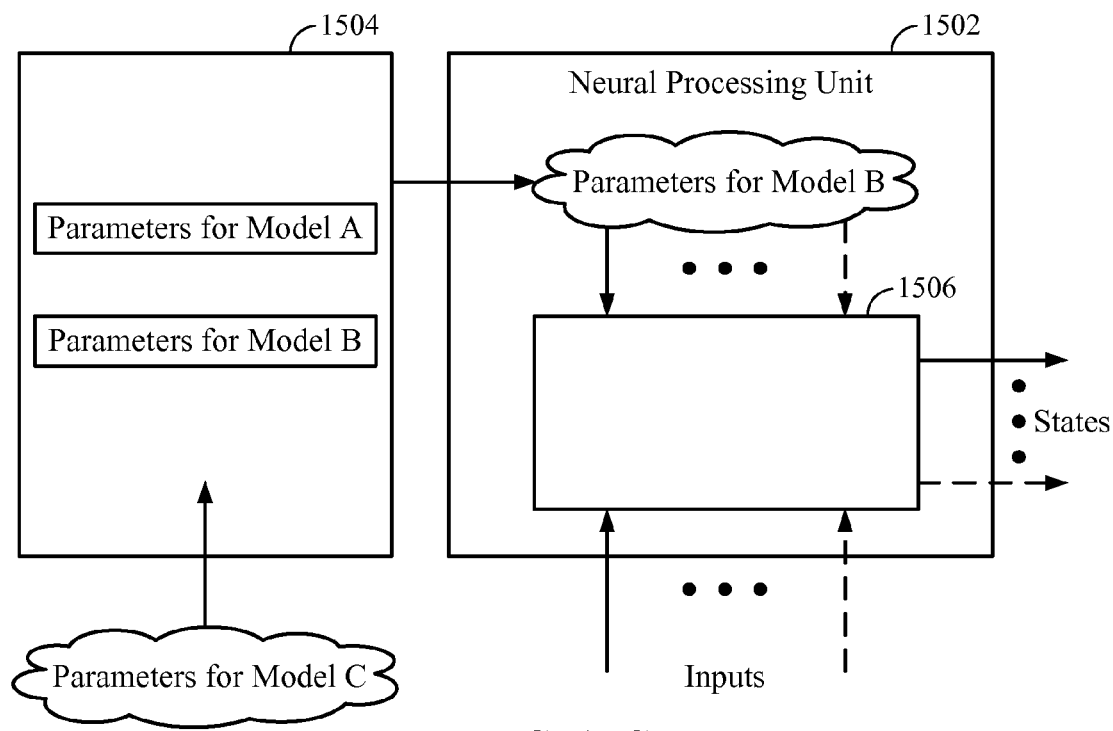

In FIG. 15C, parameters for neuron model C may be added to the set of parameters 1504. For example, neuron model C may be a recently developed, purchased, or licensed neuron model that was not available when the neural processing unit 1502 became operational. In other example scenarios, the architect or system designer may have not considered neuron model C or may have originally thought this model did not fit the desired application, but now desires to add this model.

Figure 15D:
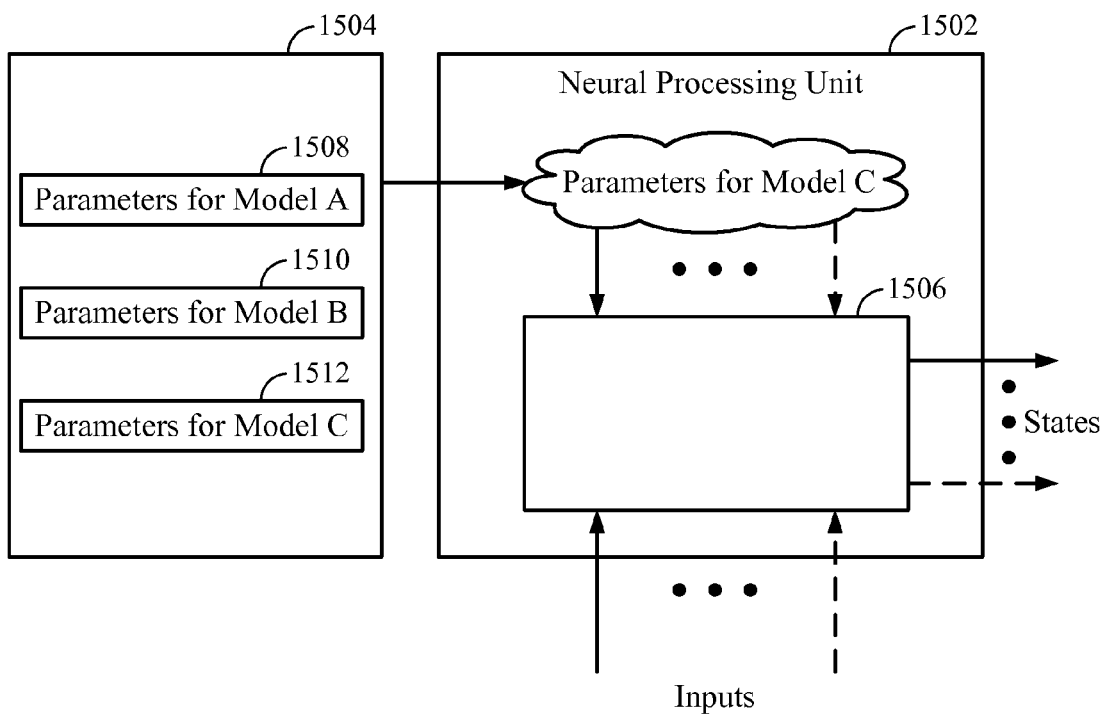

In FIG. 15D, the parameters for neuron model C may be stored in a third memory location 1512. The parameters for neuron model C may be loaded into the neural processing unit 1502, such that the state machine 1506 may operate based at least in part on these most recently loaded parameters. The ability to effectively change neuron models for a neural processing unit by simply loading different parameters therein provides a very flexible architecture that can be updated and changed as desired.

Figure 16:
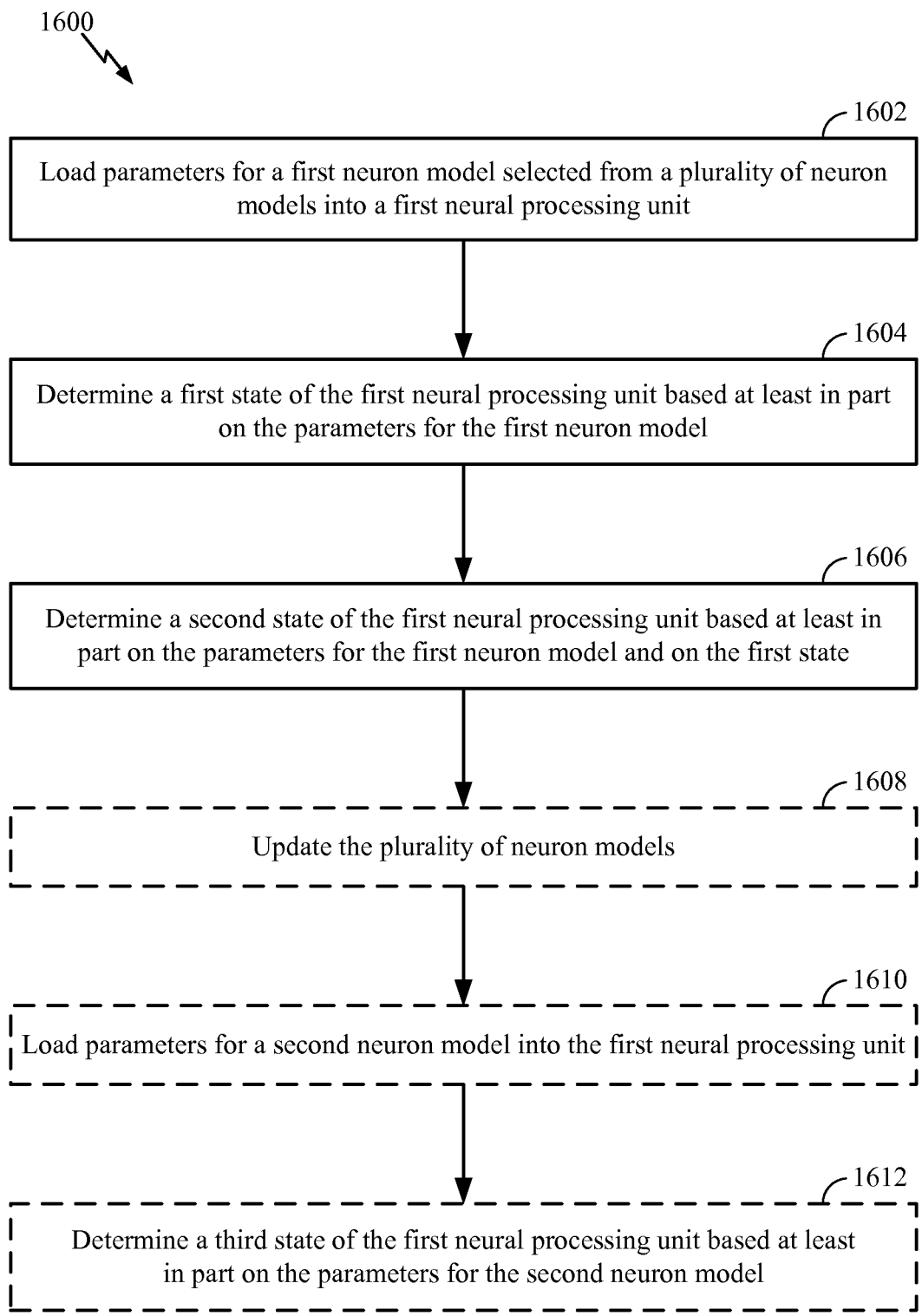
FIG. 16 is a flow diagram of example operations for implementing a combination of a plurality of neuron models in a system of neural processing units, in accordance with certain aspects of the present disclosure.
Figure 16A:
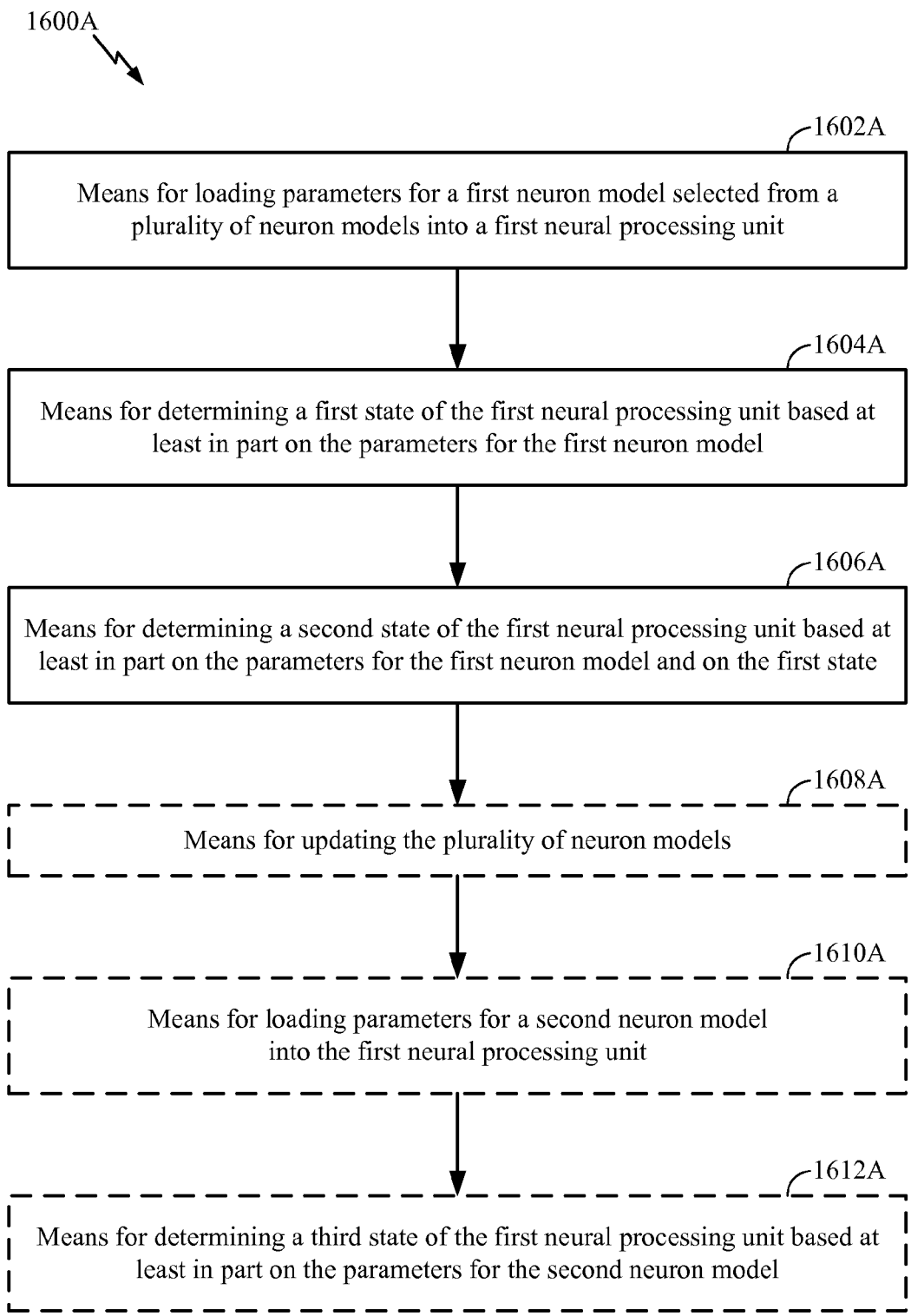
FIG. 16A illustrates example means capable of performing the operations shown in FIG. 16.

FIG. 16 is a flow diagram of example operations 1600 for implementing a combination of a plurality of neuron models in a system of neural processing units (e.g., an artificial nervous system), in accordance with certain aspects of the present disclosure. The operations 1600 may be performed in hardware (e.g., by one or more processing units, such as a neuromorphic processor), in software, or in firmware. The artificial nervous system may be modeled on any of various biological or imaginary nervous systems, such as a visual nervous system, an auditory nervous system, the hippocampus, etc.

The plurality of neuron models may include any combination of the neuron models described above, as well as any suitable neuron models in existence or as yet undeveloped or undisclosed. For example, the plurality of neuron models may include at least one of an Izhikevich simple model, an exponential-integrate-and-fire (EIF) model, a FitzHugh-Nagumo model, a quartic model, a Hunzinger Cold model, or an intrinsic conductance model. As used herein, the phrase "combination of the neuron models" generally refers to a set of the plurality of neuron models, where the set may include a single member. In other words, the combination of the plurality of neuron models includes one of the plurality and any combination of any subset of the plurality.

The operations 1600 may begin, at 1602, by loading parameters for a first neuron model selected from the plurality of neuron models into a first neural processing unit (e.g., an artificial neuron). The parameters for a given neuron model may be parameters derived from the piecewise linear approximations of the neuron models as described above. At 1604, a first state of the first neural processing unit may be determined based, at least in part, on the loaded parameters for the first neuron model. At 1606, a second state of the first neural processing unit may be determined based, at least in part, on the parameters for the first neuron model and on the first state.

According to certain aspects, the plurality of neuron models may be updated, at 1608. As described above, updating the plurality of neuron models may include deleting or adjusting certain parameters for the existing neuron models or adding parameters for another neuron model (e.g., a new neuron model that was not available at the time the plurality of neuron models were made available to the system or a desired modification to an existing neuron model to effectively create a new neuron model). For certain aspects, updating the plurality of neuron models may occur before loading (or re-loading) the parameters for the first neuron model and determining the next state of the first neural processing unit.

At 1610, parameters for a second neuron model may optionally be loaded into the first neural processing unit. These parameters for the second neuron model may replace the parameters loaded at 1602 for the first neuron model. The plurality of neuron models need not be updated at 1608 before the parameters for the second neuron model are loaded at 1610. At 1612, a third state of the first neural processing unit (e.g., subsequent to the second state) may be determined based, at least in part, on the parameters for the second neuron model.

According to certain aspects, loading the parameters for the first model at 1602 (or for the second neuron model at 1610) is in response to a configuration event. For certain aspects, the configuration event is a power up for at least one of the system of neural processing units or the first neural processing unit.

According to certain aspects, determining the third state at 1612 is further based, at least in part, on the second state. If a determination of a subsequent state based on parameters for a subsequent neuron model is based on a previous state determined under parameters for a previous neuron model (different from the subsequent neuron model), this may be referred to as a "hot swap." For certain aspects, the second neuron model is configured, at least in part, to generate a subthreshold oscillation under this "hot swap" condition. This oscillation may start from the second state or at another time. For certain aspects, the loading of the parameters for the second neuron model at 1610 is based, at least in part, on at least one of a state condition (e.g., the state entering a particular region or exhibiting a certain behavior, such as a rate of change, etc.), a time condition (e.g., based on a timer), or a trigger. The trigger may be external to the first neural processing unit, for example.

According to certain aspects, the operations 1600 may further include loading parameters for a second neuron model selected from the plurality of neuron models into a second neural processing unit. Then, a state of the second neural processing unit may be determined based, at least in part, on the parameters for the second neuron model. For certain aspects, the first and second neural processing units are located in different areas of the system. For certain aspects, the first and second neuron models represent different types of neurons. In other words, the different neuron models in the system of neural processing units may be used to emulate neurons that are in different regions of a neural system. For example, neurons in the visual, auditory, or motor control system may be represented by different neuron models.

Loading the parameters for the first, the second, or any other neuron model may involve any of various suitable operations. The description below includes loading the parameters for the first neuron model for ease of description, but such loading applies to the parameters for any other neuron model, as well. According to certain aspects, loading the parameters for the first neuron model includes loading the parameters for the first neuron model into a plurality of neural processing units including the first neural processing unit. For certain aspects, loading the parameters for the first neuron model includes fetching at least a portion of the parameters for the first neuron model from a memory. This memory may be accessible by the system of neural processing units for certain aspects. For certain aspects, at least a portion of the memory may be local to the first neural processing unit. At least portion of the memory may be cache memory. For certain aspects, loading the parameters for the first neuron model further includes accessing, in the memory, a memory block associated with the first neuron model. In this case, the memory block may be designated by a pointer to a memory address in the memory block.

Figure 17:
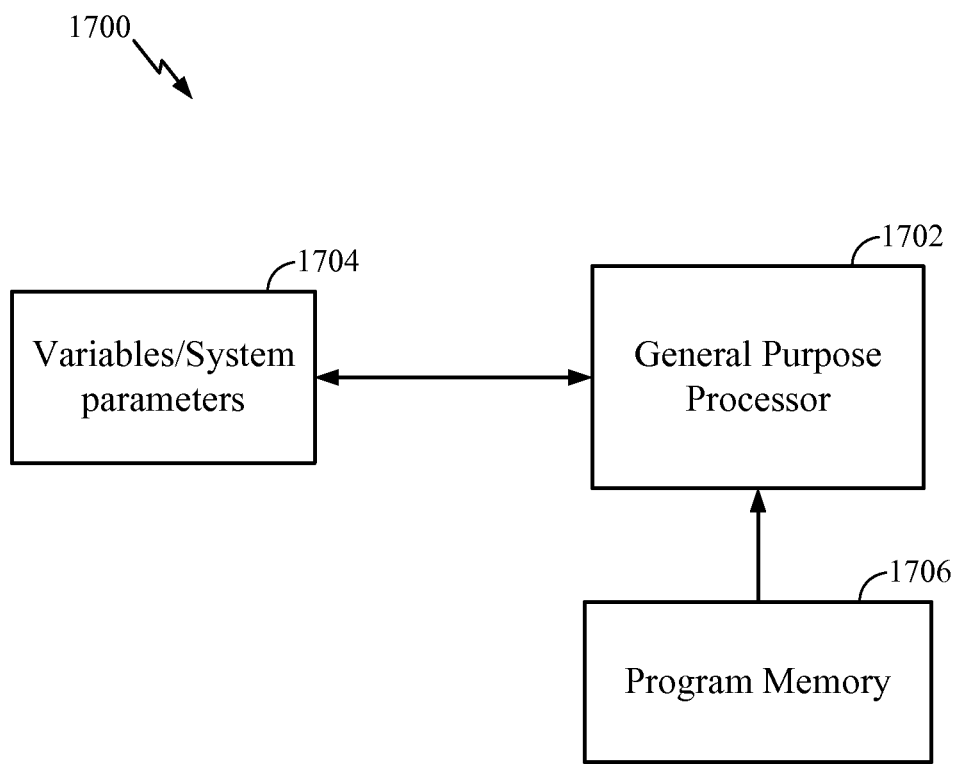
FIG. 17 illustrates an example implementation for determining states of an artificial neuron using a general-purpose processor, in accordance with certain aspects of the present disclosure.

FIG. 17 illustrates an example block diagram 1700 of components for implementing the aforementioned methods for operating an artificial neuron using a general-purpose processor 1702 in accordance with certain aspects of the present disclosure. Variables (neural signals), synaptic weights, and/or system parameters associated with a computational network (neural network) may be stored in a memory block 1704, while instructions related executed at the general-purpose processor 1702 may be loaded from a program memory 1706. In an aspect of the present disclosure, the instructions loaded into the general-purpose processor 1702 may comprise code for determining that a first state of an artificial neuron is within a first region; code for determining a second state of the artificial neuron based at least in part on a first set of linear equations, wherein the first set of linear equations is based at least in part on a first set of parameters corresponding to the first region; code for determining that the second state of the artificial neuron is within a second region; and code for determining a third state of the artificial neuron based at least in part on a second set of linear equations, wherein the second set of linear equations is based at least in part on a second set of parameters corresponding to the second region. For certain aspects, at least one of the first or second region is defined by two or more dimensions.

In another aspect of the present disclosure, the instructions loaded into the general-purpose processor 1702 may comprise code for loading parameters for a first neuron model selected from a plurality of neuron models into a first neural processing unit (in a system of neural processing units) and code for determining a first state of the first neural processing unit based at least in part on the parameters for the first neuron model.

Figure 18:
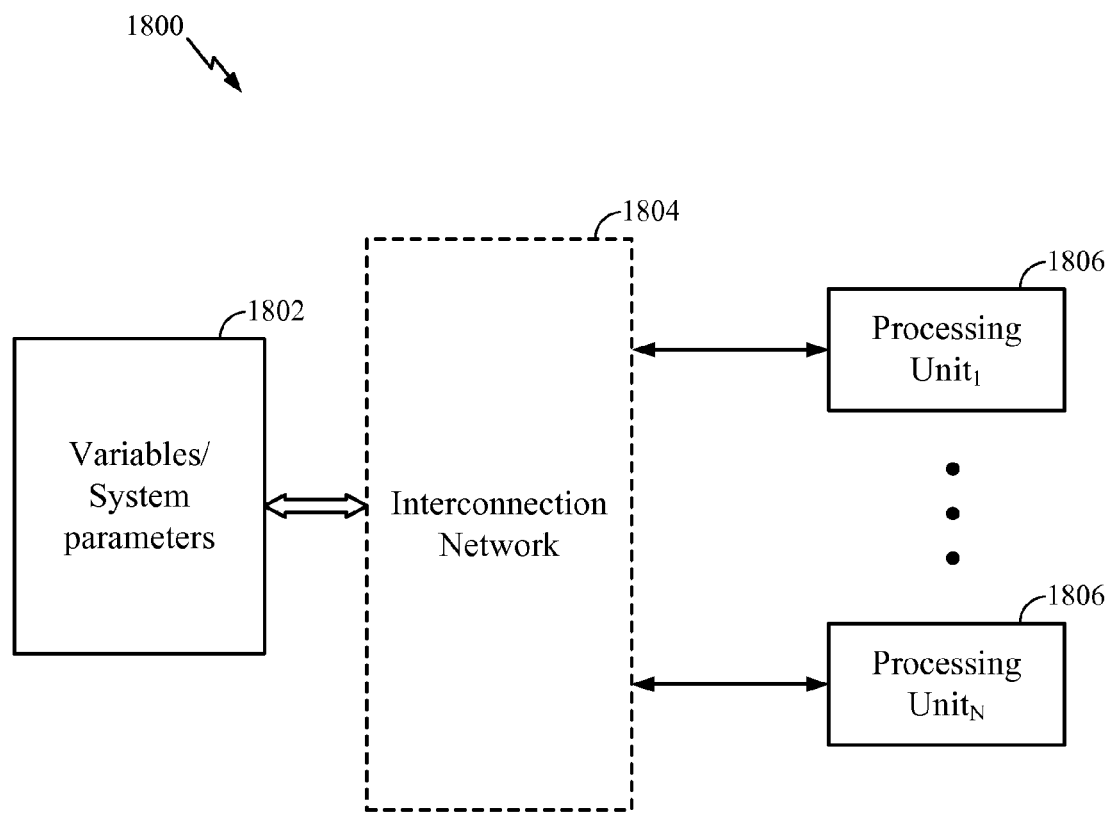
FIG. 18 illustrates an example implementation for determining states of an artificial neuron where a memory may be interfaced with individual distributed processing units, in accordance with certain aspects of the present disclosure.

FIG. 18 illustrates an example block diagram 1800 of components for implementing the aforementioned method for operating an artificial neuron where a memory 1802 can be interfaced via an interconnection network 1804 with individual (distributed) processing units (neural processors) 1806 of a computational network (neural network) in accordance with certain aspects of the present disclosure. Variables (neural signals), synaptic weights, and/or system parameters associated with the computational network (neural network) may be stored in the memory 1802, and may be loaded from the memory 1802 via connection(s) of the interconnection network 1804 into each processing unit (neural processor) 1806. In an aspect of the present disclosure, the processing unit 1806 may be configured to determine that a first state of an artificial neuron is within a first region; to determine a second state of the artificial neuron based at least in part on a first set of linear equations, wherein the first set of linear equations is based at least in part on a first set of parameters corresponding to the first region; to determine that the second state of the artificial neuron is within a second region; and to determine a third state of the artificial neuron based at least in part on a second set of linear equations, wherein the second set of linear equations is based at least in part on a second set of parameters corresponding to the second region. For certain aspects, at least one of the first or second region is defined by two or more dimensions.

In another aspect of the present disclosure, the processing unit 1806 may be configured to load parameters for a first neuron model selected from a plurality of neuron models into a first neural processing unit (in a system of neural processing units) and to determine a first state of the first neural processing unit based at least in part on the parameters for the first neuron model.

Figure 19:
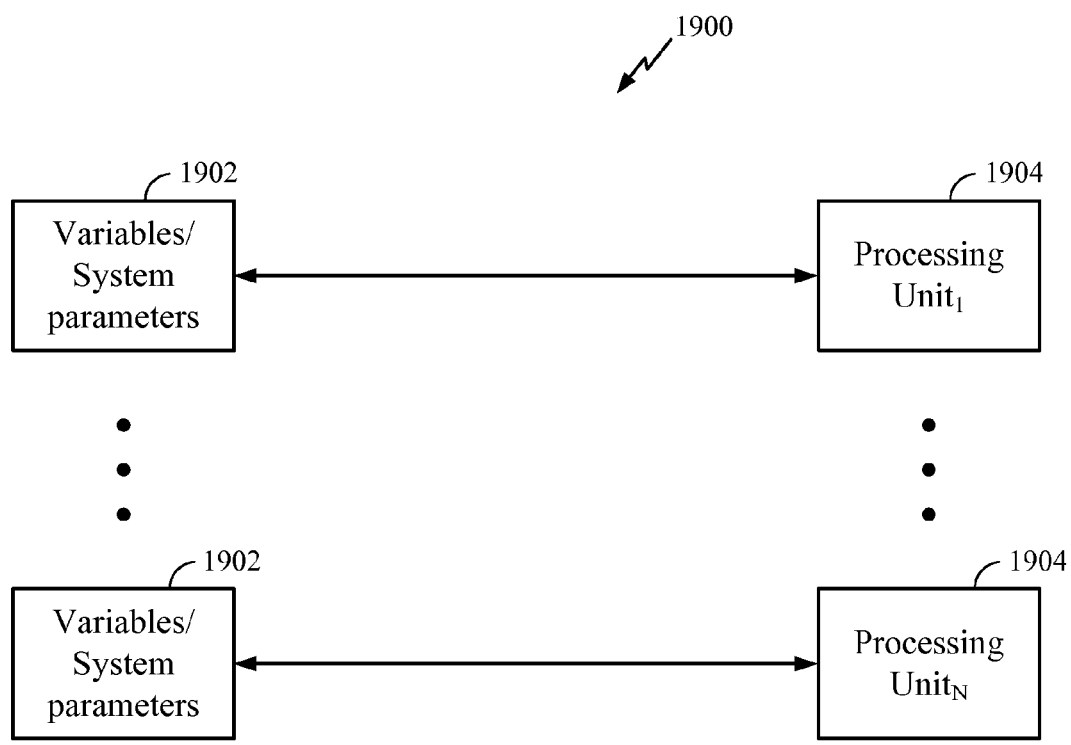
FIG. 19 illustrates an example implementation for determining states of an artificial neuron based on distributed memories and distributed processing units, in accordance with certain aspects of the present disclosure.

FIG. 19 illustrates an example block diagram 1900 of components for implementing the aforementioned method for operating an artificial neuron based on distributed weight memories 1902 and distributed processing units (neural processors) 1904 in accordance with certain aspects of the present disclosure. As illustrated in FIG. 19, one memory bank 1902 may be directly interfaced with one processing unit 1904 of a computational network (neural network), wherein that memory bank 1902 may store variables (neural signals), synaptic weights, and/or system parameters associated with that processing unit (neural processor) 1904. In an aspect of the present disclosure, the processing unit(s) 1904 may be configured to determine that a first state of an artificial neuron is within a first region; determine a second state of the artificial neuron based at least in part on a first set of linear equations, wherein the first set of linear equations is based at least in part on a first set of parameters corresponding to the first region; determine that the second state of the artificial neuron is within a second region; and determine a third state of the artificial neuron based at least in part on a second set of linear equations, wherein the second set of linear equations is based at least in part on a second set of parameters corresponding to the second region. For certain aspects, at least one of the first or second region is defined by two or more dimensions.

In another aspect of the present disclosure, the processing unit(s) 1904 may be configured to load parameters for a first neuron model selected from a plurality of neuron models into a first neural processing unit (in a system of neural processing units) and to determine a first state of the first neural processing unit based at least in part on the parameters for the first neuron model.

Figure 20:
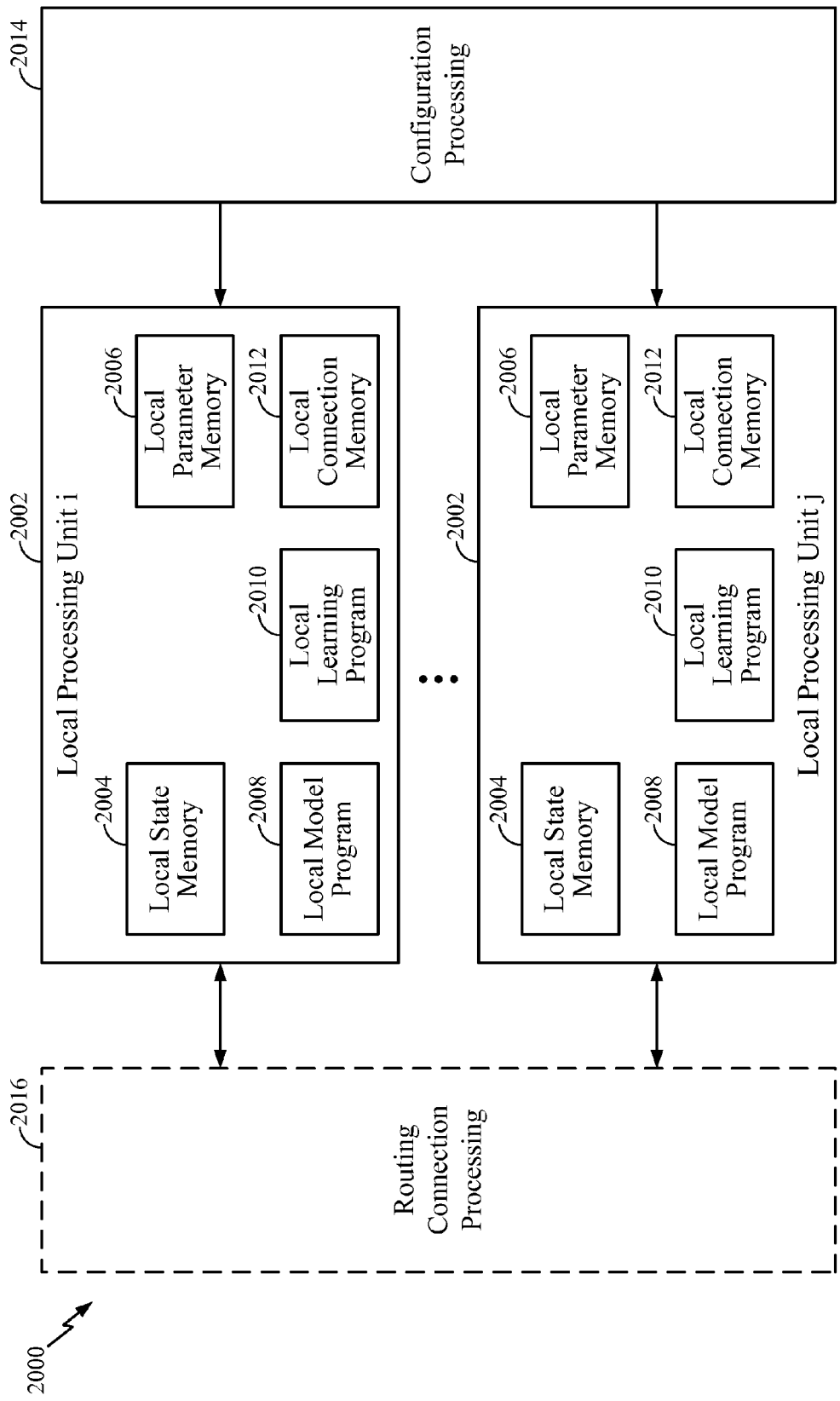
FIG. 20 illustrates an example implementation of a neural network in accordance with certain aspects of the present disclosure.

FIG. 20 illustrates an example implementation of a neural network 2000 in accordance with certain aspects of the present disclosure. As illustrated in FIG. 20, the neural network 2000 may comprise a plurality of local processing units 2002 that may perform various operations of methods described above. Each processing unit 2002 may comprise a local state memory 2004 and a local parameter memory 2006 that store parameters of the neural network. In addition, the processing unit 2002 may comprise a memory 2008 with a local (neuron) model program, a memory 2010 with a local learning program, and a local connection memory 2012. Furthermore, as illustrated in FIG. 20, each local processing unit 2002 may be interfaced with a unit 2014 for configuration processing that may provide configuration for local memories of the local processing unit, and with routing connection processing elements 2016 that provide routing between the local processing units 2002.

According to certain aspects of the present disclosure, each local processing unit 2002 may be configured to determine parameters of the neural network based upon desired one or more functional features of the neural network, and develop the one or more functional features towards the desired functional features as the determined parameters are further adapted, tuned and updated.

Figure 14A:
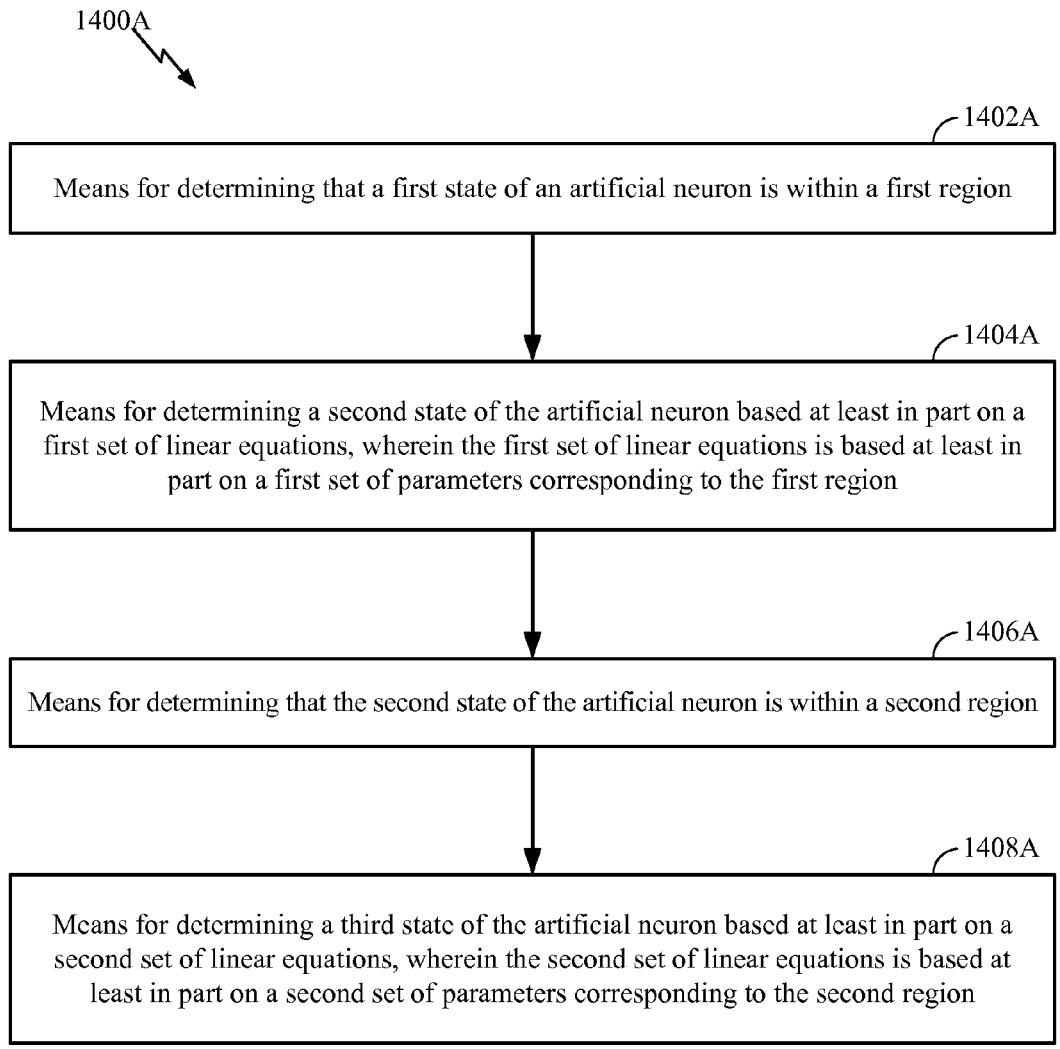
FIG. 14A illustrates example means capable of performing the operations shown in FIG. 14.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 17-20. Generally, where there are operations illustrated in figures, those operations may have corresponding counterpart means-plus-function components with similar numbering. For example, operations 1400 illustrated in FIG. 14 correspond to means 1400A illustrated in FIG. 14A.

For example, means for displaying may comprise a display (e.g., a monitor, flat screen, touch screen, and the like), a printer, or any other suitable means for outputting data for visual depiction (e.g., a table, chart, or graph). Means for processing, means for generating, means for loading, means for resetting, means for fetching, means for updating, means for calculating, means for computing, means for outputting, or means for determining may comprise a processing system, which may include one or more processors or processing units. Means for storing may comprise a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for updating a state of an artificial neuron, comprising:
   determining that a first state of the artificial neuron is within a first region;
   determining a second state of the artificial neuron based at least in part on a first set of linear equations, wherein the first set of linear equations is based at least in part on a first set of parameters corresponding to the first region;
   determining that the second state of the artificial neuron is within a second region; and
   determining a third state of the artificial neuron based at least in part on a second set of linear equations, wherein the second set of linear equations is based at least in part on a second set of parameters corresponding to the second region.

2. The method of claim 1, wherein the first and second sets of linear equations comprise discrete time solutions of linear time-invariant (LTI) state-space equations.

3. The method of claim 1, further comprising fetching at least one of the first or second set of parameters from memory.

4. The method of claim 3, wherein the fetching comprises fetching the at least one of the first or second set of parameters from a memory local to the artificial neuron.

5. The method of claim 1, further comprising calculating at least a portion of at least one of the first or second set of parameters.

6. The method of claim 5, wherein the at least the portion of the at least one of the first or second set of parameters is calculated using one or more values fetched from memory.

7. The method of claim 1, wherein at least one of the first or second set of parameters is obtained by approximating, with a piecewise linear function, at least a portion of a nonlinear function in a neuron model associated with the artificial neuron.

8. The method of claim 7, wherein the nonlinear function comprises a membrane potential (v) multiplied with a voltage-dependent conductance (g(v)).

9. The method of claim 8, wherein the voltage-dependent conductance is approximated with a piecewise constant function.

10. The method of claim 7, wherein the nonlinear function comprises a voltage-dependent function (F(v)), wherein v is a membrane potential of the artificial neuron.

11. The method of claim 7, wherein the first region has a different width in the piecewise linear function than the second region.

12. The method of claim 7, wherein a width of the first or the second region in the piecewise linear function is dependent on the nonlinear function.

13. The method of claim 7, wherein the piecewise linear function approximation is based at least in part on at least one of a Taylor expansion method, a first order linear interpolation method, an optimal linear interpolation method, or an average slope method.

14. The method of claim 1, wherein at least one of the first or second set of parameters is designed at least in part to achieve a particular behavior in the artificial neuron.

15. The method of claim 1, wherein the first, second, and third states of the artificial neuron are defined by a membrane potential (v) and a recovery current (u).

16. The method of claim 15, further comprising resetting at least one of the membrane potential or the recovery current of the artificial neuron based at least in part on a determination that a spike event has occurred or will occur.

17. The method of claim 16, wherein the membrane potential is reset to a resting potential and wherein the recovery current is reset to a sum of a present value of the recovery current and an offset.

18. The method of claim 1, wherein at least one of the first set or second set of linear equations is based at least in part on a neuron model for the artificial neuron.

19. The method of claim 18, wherein the neuron model is based at least in part on at least one of an Izhikevich simple model, an exponential-integrate-and-fire (EIF) model, a FitzHugh-Nagumo model, a quartic model, or an intrinsic conductance model.

20. The method of claim 19, wherein the intrinsic conductance model comprises the neuron model expressed as a membrane potential (v) multiplied with a voltage-dependent conductance (g(v)).

21. The method of claim 18, wherein the neuron model comprises at least two dimensions.

22. The method of claim 18, wherein a step size in time of the neuron model is based at least in part on a type of the artificial neuron being modeled.

23. The method of claim 18, wherein a step size in time of the neuron model is non-uniform.

24. The method of claim 23, wherein the step size in time of a particular time step is determined based at least in part on at least one of a current or past state of the artificial neuron or on a particular set of parameters.

25. The method of claim 18, wherein the neuron model is based at least in part on one or more first-order ordinary differential equations (ODEs).

26. The method of claim 1, wherein determining at least one of the second or third state of the artificial neuron is based at least in part on currents input to the artificial neuron.

27. The method of claim 26 wherein the input currents comprise a synaptic current based at least in part on a time-dependent conductance for each of one or more channels and a reversal potential for each of the one or more channels.

28. The method of claim 27, wherein the synaptic current is based at least in part on a post-synaptic membrane potential of the artificial neuron for an N-methyl-D-aspartate (NMDA) channel.

29. The method of claim 27, wherein the time-dependent conductance is modeled by an exponential function, an alpha function, or a difference-of-exponentials function.

30. The method of claim 1, wherein a first step size in time between determining the first and second states is different than a second step size in time between determining the second and third states.

31. The method of claim 1, wherein determining the second state of the artificial neuron is performed for a first time step and wherein determining the third state of the artificial neuron is performed for a second time step subsequent to the first time step.

32. An apparatus for operating an artificial neuron, comprising:
   a processing system configured to:
      determine that a first state of the artificial neuron is within a first region;
      determine a second state of the artificial neuron based at least in part on a first set of linear equations, wherein the first set of linear equations is based at least in part on a first set of parameters corresponding to the first region;
      determine that the second state of the artificial neuron is within a second region; and
      determine a third state of the artificial neuron based at least in part on a second set of linear equations, wherein the second set of linear equations is based at least in part on a second set of parameters corresponding to the second region; and
a memory coupled to the processing system.

33. The apparatus of claim 32, wherein the first and second sets of linear equations comprise discrete time solutions of linear time-invariant (LTI) state-space equations.

34. The apparatus of claim 32, wherein the processing system is further configured to fetch at least one of the first or second set of parameters from the memory.

35. The apparatus of claim 34, wherein memory is local to the artificial neuron.

36. The apparatus of claim 32, wherein the processing system is further configured to calculate at least a portion of at least one of the first or second set of parameters.

37. The apparatus of claim 36, wherein the at least the portion of the at least one of the first or second set of parameters is calculated using one or more values fetched from the memory.

38. The apparatus of claim 32, wherein at least one of the first or second set of parameters is obtained by approximating, with a piecewise linear function, at least a portion of a nonlinear function in a neuron model associated with the artificial neuron.

39. The apparatus of claim 38, wherein the nonlinear function comprises a membrane potential (v) multiplied with a voltage-dependent conductance (g(v)).

40. The apparatus of claim 39, wherein the voltage-dependent conductance is approximated with a piecewise constant function.

41. The apparatus of claim 38, wherein the nonlinear function comprises a voltage-dependent function (F(v)), wherein v is a membrane potential of the artificial neuron.

42. The apparatus of claim 38, wherein the first region has a different width in the piecewise linear function than the second region.

43. The apparatus of claim 38, wherein a width of the first or the second region in the piecewise linear function is dependent on the nonlinear function.

44. The apparatus of claim 38, wherein the piecewise linear function approximation is based at least in part on at least one of a Taylor expansion method, a first order linear interpolation method, an optimal linear interpolation method, or an average slope method.

45. The apparatus of claim 32, wherein at least one of the first or second set of parameters is designed at least in part to achieve a particular behavior in the artificial neuron.

46. The apparatus of claim 32, wherein the first, second, and third states of the artificial neuron are defined by a membrane potential (v) and a recovery current (u).

47. The apparatus of claim 46, wherein the processing system is further configured to reset at least one of the membrane potential or the recovery current of the artificial neuron based at least in part on a determination that a spike event has occurred or will occur.

48. The apparatus of claim 47, wherein the membrane potential is reset to a resting potential and wherein the recovery current is reset to a constant.

49. The apparatus of claim 32, wherein at least one of the first set or second set of linear equations is based at least in part on a neuron model for the artificial neuron.

50. The apparatus of claim 49, wherein the neuron model is based at least in part on at least one of an Izhikevich simple model, an exponential-integrate-and-fire (EIF) model, a FitzHugh-Nagumo model, a quartic model, or an intrinsic conductance model.

51. The apparatus of claim 50, wherein the intrinsic conductance model comprises the neuron model expressed as a membrane potential (v) multiplied with a voltage-dependent conductance (g(v)).

52. The apparatus of claim 49, wherein the neuron model comprises at least two dimensions.

53. The apparatus of claim 49, wherein a step size in time of the neuron model is based at least in part on a type of the artificial neuron being modeled.

54. The apparatus of claim 49, wherein a step size in time of the neuron model is non-uniform.

55. The apparatus of claim 54, wherein the step size in time of a particular time step is determined based at least in part on at least one of a current or past state of the artificial neuron or on a particular set of parameters.

56. The apparatus of claim 49, wherein the neuron model is based at least in part on one or more first-order ordinary differential equations (ODEs).

57. The apparatus of claim 32, wherein the processing system is configured to determine at least one of the second or third state of the artificial neuron based at least in part on currents input to the artificial neuron.

58. The apparatus of claim 57, wherein the input currents comprise a synaptic current based at least in part on a time-dependent conductance for each of one or more channels and a reversal potential for each of the one or more channels.

59. The apparatus of claim 58, wherein the synaptic current is based at least in part on a post-synaptic membrane potential of the artificial neuron for an N-methyl-D-aspartate (NMDA) channel.

60. The apparatus of claim 58, wherein the time-dependent conductance is modeled by an exponential function, an alpha function, or a difference-of-exponentials function.

61. The apparatus of claim 32, wherein a first step size in time between determining the first and second states is different than a second step size in time between determining the second and third states.

62. The apparatus of claim 32, wherein the processing system is configured to:
determine the second state of the artificial neuron for a first time step; and
determine the third state of the artificial neuron for a second time step subsequent to the first time step.

63. An apparatus for operating an artificial neuron, comprising:
means for determining that a first state of the artificial neuron is within a first region;
means for determining a second state of the artificial neuron based at least in part on a first set of linear equations, wherein the first set of linear equations is based at least in part on a first set of parameters corresponding to the first region;
means for determining that the second state of the artificial neuron is within a second region; and
means for determining a third state of the artificial neuron based at least in part on a second set of linear equations, wherein the second set of linear equations is based at least in part on a second set of parameters corresponding to the second region.

64. A non-transitory computer-readable storage device for operating an artificial neuron, the storage device encoded with instructions executable to:
determine that a first state of the artificial neuron is within a first region;
determine a second state of the artificial neuron based at least in part on a first set of linear equations, wherein the first set of linear equations is based at least in part on a first set of parameters corresponding to the first region;

determine that the second state of the artificial neuron is within a second region; and determine a third state of the artificial neuron based at least in part on a second set of linear equations, wherein the second set of linear equations is based at least in part on a second set of parameters corresponding to the second region.

* * * * *